(12) United States Patent
Baig et al.

(10) Patent No.: US 12,515,178 B1
(45) Date of Patent: Jan. 6, 2026

(54) GRAFTED POLYAMIDE MEMBRANE FOR NANOFILTRATION APPLICATIONS

(71) Applicant: KING FAHD UNIVERSITY OF PETROLEUM AND MINERALS, Dhahran (SA)

(72) Inventors: Nadeem Baig, Dhahran (SA); Zeeshan Arshad Javaid, Dhahran (SA); Ali Shaikh Asrof, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/300,934

(22) Filed: Aug. 15, 2025

(51) Int. Cl.
  *B01D 71/56* (2006.01)
  *B01D 61/02* (2006.01)
  *B01D 67/00* (2006.01)
  *B01D 69/10* (2006.01)

(52) U.S. Cl.
  CPC .......... *B01D 71/56* (2013.01); *B01D 61/027* (2013.01); *B01D 67/0006* (2013.01); *B01D 69/107* (2022.08); *B01D 2323/21825* (2022.08); *B01D 2323/21834* (2022.08)

(58) Field of Classification Search
  CPC .. B01D 71/56; B01D 61/027; B01D 67/0006; B01D 69/107; B01D 2323/21825; B01D 2323/21834
  See application file for complete search history.

(56) References Cited

U.S. PATENT DOCUMENTS

| | | |
|---|---|---|
| 2022/0016570 A1 | 1/2022 | Zheng et al. |
| 2023/0100894 A1 | 3/2023 | Chang et al. |
| 2025/0073845 A1 | 3/2025 | Waheed et al. |

(Continued)

FOREIGN PATENT DOCUMENTS

| | | |
|---|---|---|
| CN | 118526987 A | 8/2024 |
| KR | 10-1477851 B1 | 12/2014 |

OTHER PUBLICATIONS

Arshad, Z., et al., "Synthesis of a novel next-generation positively charged polymer and its in-situ grafting into thin film composite membranes to enhance the performance for desalination", Process Safety and Environmental Protection, 178, 34-45. (Year: 2023).*

(Continued)

*Primary Examiner* — Benjamin L Lebron
(74) *Attorney, Agent, or Firm* — Oblon, McClelland, Maier & Neustadt, L.L.P.

(57) ABSTRACT

A membrane made of a polymeric support, and an active layer with a polyamide grafted with a copolymer on the polymeric support. The copolymer is reacted units of a diallyldimethylammonium chloride (DADMAC), 3-(N,N-diallyl-N-methylammonio)propanesulfonate (DAMAPS), and N,N-diallyldodecane-1,12-diamine (DADA), and the copolymer is grafted to the polyamide with a linking molecule. Further, a method of making the membrane by dissolving an amine and the copolymer in water to form an aqueous solution, dissolving TMC in an organic solvent to form an organic mixture, pouring the aqueous solution onto a polymeric support and then pouring the organic mixture onto the same support for form a coated support, and heating the coated support to form a membrane.

20 Claims, 45 Drawing Sheets

(56) References Cited

U.S. PATENT DOCUMENTS

2025/0178930 A1* 6/2025 Asrof .................. B01D 61/025

OTHER PUBLICATIONS

Arshad, Z., et al., "Fabrication of a new rationally designed mussel-inspired cationic amphiphilic terpolymer to enhance the separation and anti-fouling performance of membranes", Langmuir, 39, 9186-9199. (Year: 2023).*
Chengbao Geng, et al., "Zwitterionic loose polyamide nanofiltration membrane with good antifouling properties for efficient removal of humic acid and dyes", Journal of Environmental Chemical Engineering, vol. 11, Issue 5, Oct. 2023, 110285, 6 Pages.
Xinyu Zhang, et al., "Engineering polyamide nanofiltration membrane with bifunctional terpolymer brushes for antifouling and antimicrobial properties", Desalination, vol. 558, Jul. 16, 2023, 116642, 9 pages.

* cited by examiner

GRAFTED POLYAMIDE MEMBRANE FOR NANOFILTRATION APPLICATIONS

STATEMENT REGARDING PRIOR DISCLOSURE BY THE INVENTORS

Aspects of the present disclosure are described in Arshad, Z., et al., "Tailoring Nanofiltration Membranes by Incorporating Zwitterionic Quaternary Ammonium Terpolymer to Enhance Performance" published in Issue 7, Volume 20, 2025, Chemistry—An Asian Journal, which is incorporated herein by reference in its entirety.

STATEMENT OF ACKNOWLEDGEMENT

Support provided by the Deanship of Research Oversight & Coordination at King Fahd University of Petroleum and Minerals (KFUPM), Saudi Arabia through the project ER221001 is gratefully acknowledged.

BACKGROUND

Technical Field

The present disclosure relates to the field of separation membranes, and more particularly to nanofiltration membranes having a polyamide active layer modified by grafting a cationic/zwitterionic terpolymer to improve permeability and solute selectivity.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Presently, membrane-based separation technologies are widely investigated for a variety of applications, including water purification, desalination, and resource recovery. Among the different membrane types, nanofiltration (NF) membranes have gained increasing interest due to their ability to operate under relatively low pressure and their intermediate pore size range between reverse osmosis (RO) and ultrafiltration (UF) membranes. A typical NF membrane includes a porous polymeric support and a dense polyamide active layer formed via interfacial polymerization (IP) between acid chloride and amine monomers.

NF membranes fabricated using piperazine and Trimesoyl chloride are widely known but suffer from several drawbacks, including membrane fouling and concentration polarization, both of which significantly impair separation efficiency. Such membranes exhibit limited selectivity for solutes, which restricts their effectiveness in separating organic compounds such as dyes from inorganic salts (e.g., $MgSO_4$, $Na_2SO_4$, $MgCl_2$, NaCl). Consequently, concentrate accumulation on the membrane surface occurs, resulting in low permeate flux and severe fouling issues [S. Guo, et al., Chemical Engineering Journal 2021, 409, 127376, incorporated herein by reference in its entirety].

In order address limitations of conventional NF membranes, loose nanofiltration (LNF) membranes have emerged as alternatives for applications demanding high salt permeability and organic solute rejection. The LNF membrane operates between UF and NF regimes, offering increased flux and favourable salt-dye separation profiles. Multiple fabrication techniques have been explored to construct LNF membranes, including phase inversion, dip-coating, interfacial polymerization, self-assembly, and mussel-inspired deposition. Additionally, grafting functional polymers onto membrane surfaces has been employed to enhance flux and selectivity.

Strategies incorporating antifouling functionality into membranes have also been intensively investigated. Zwitterionic polymers are particularly attractive in this context due to super hydrophilic character and near-neutral surface charge thereof. The aforementioned properties promote hydration layer formation, which improves water permeability and minimizes fouling. For instance, the zwitterionic polymer PSBMA-co-PDA has demonstrated promising salt/dye separation and antifouling performance when applied to LNF membranes.

Controlled incorporation of rationally designed polymers containing cationic and zwitterionic units into polyamide active layers is an effective method for tuning membrane surface properties and performance. Cyclopolymerization of N,N-diallyl quaternary ammonium salts has yielded water-soluble homo- and copolymers with unique pentagon-shaped backbones that influence membrane behavior significantly The DADMAC monomer is a well-known cationic species widely utilized in membrane modification and water treatment, with proven effects on flux, rejection, and antifouling characteristics. Amphiphilic terpolymers incorporating DADMAC have been used to fabricate membranes for oily wastewater treatment, while DADMAC grafted onto polysulfone membranes has enabled LNF membrane production via UV irradiation. Among zwitterionic chemistries used in membrane design, sulfobetaine, carboxybetaine, and phosphobetaine are the most extensively studied.

Despite the progress achieved through various fabrication methods and material incorporations, challenges persist in achieving high permeability without sacrificing rejection efficiency, particularly for complex mixtures such as dye-salt systems. There remains a continuing requirement for advanced NF and LNF membranes capable of achieving high water flux, enhanced solute selectivity, and superior antifouling properties under practical operating conditions, without disclosing the aforementioned solution of the present invention. Accordingly, one object of the present disclosure is to provide a polymeric membrane and a method of making thereof, that may circumvent the above specified drawbacks and limitation of the materials and methods known in the art.

SUMMARY

In an exemplary embodiment, a membrane is provided. The membrane includes a polymeric support, and an active layer comprising a polyamide grafted with a copolymer on the polymeric support. The copolymer includes reacted units of a diallyldimethylammonium chloride (DADMAC), 3-(N,N-diallyl-N-methylammonio)propanesulfonate (DAMAPS), and N,N-diallyldodecane-1,12-diamine (DADA), and the copolymer is grafted to the polyamide with a linking molecule.

In some embodiments, the polymer support is polysulfone (PS).

In some embodiments, the linking molecule is trimesoyl chloride (TMC).

In some embodiments, the copolymer includes 0.05 percent by weight (wt. %) to 0.5 wt. % of the total wight of the membrane.

In some embodiments, the copolymer includes 47 mol. % DADMAC, 43 mol. % DADMAPS, and 0.10 mol. % DADA.

In another exemplary embodiment, a method of making the membrane is described. The method includes dissolving an amine and the copolymer in water to form an aqueous solution, dissolving TMC in an organic solvent to form an organic mixture, pouring the aqueous solution onto a polymeric support and then pouring the organic mixture onto the same support for form a coated support, and heating the coated support to form a membrane.

In some embodiments, the amine is one or more selected from the group consisting of diethylenetriamine (DETA) and triethylamine (TEA).

In some embodiments, the organic solvent is hexanes.

In some embodiments, the polymeric support is a PS support.

In some embodiments, the coated support is heated at 50-70° C.

In some embodiments, the method of making the membrane further includes making the copolymer by dissolving DADAC, DAMAPS, DADMAC, a salt, and an initiator in water to form an aqueous solution, heating the aqueous solution at 60-100° C. for 20-28 hours to form DADMAC-co-DAMAPS-co-DADAC, and adding a base and a salt to the DADMAC-co-DAMAPS-co-DADAC to form the copolymer.

In some embodiments, the salt is sodium chloride.

In some embodiments, the initiator is 2,2'-azobis(2-methylpropionamidine) dihydrochloride (AMPD).

In some embodiments, the base is sodium hydroxide.

In some embodiments, the surface of the membrane has a water contact angle of 12-22°.

In some embodiments, the membrane has a water permeation flux at 5 bar of 25 liters per square meter per hour (LMH) to 40 LMH.

In some embodiments, the membrane has a rejection rate of 95-100% for a dye.

In some embodiments, the dye is Eriochrome black T (EBT).

In some embodiments, the membrane has a permeability rate of 40-70% for a salt. In some embodiments, the salt is one or more selected from the group consisting of NaCl, $MgCl_2$, $Na_2SO_4$, and $MgSO_4$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
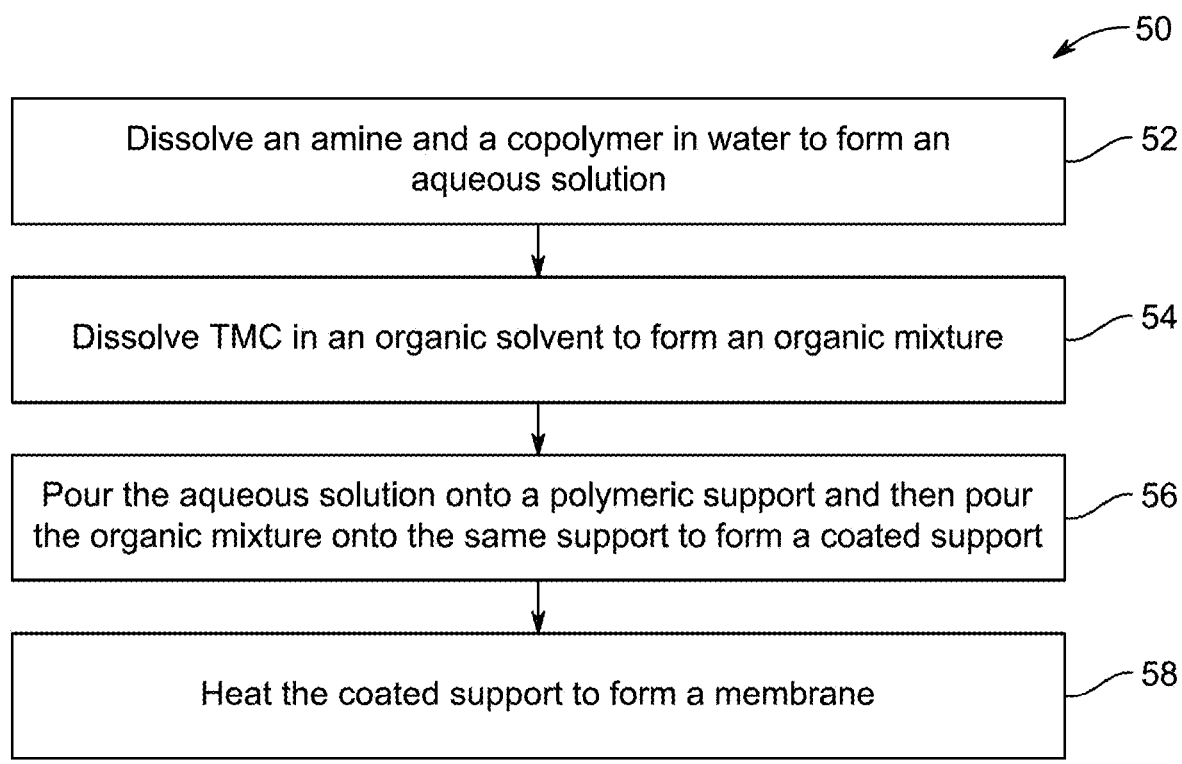
FIG. 1A illustrates an exemplary flow chart depicting a method of making a membrane, according to certain embodiments.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Furthermore, the terms "approximately," "approximate," "about," and similar terms generally refer to ranges that include the identified value within a margin of 20%, 10%, or preferably 5%, and any values therebetween.

As used herein, the term "membrane" as used herein refers to a porous structure that is capable of separating components of a homogeneous or heterogeneous fluid. In particular, "pores" in the sense of the present disclosure indicate voids allowing fluid communication between different sides of the structure. More particular in use when a homogeneous or heterogeneous fluid is passed through the membrane, some components of the fluid can pass through the pores of the membrane into a "permeate stream", some components of the fluid can be retained by the membrane and can thus accumulate in a "retentate" and/or some components of the fluid can be rejected by the membrane into a "rejection stream". Membranes can be of various thicknesses, with homogeneous or heterogeneous structures. Membranes can be in the form of flat sheets or bundles of hollow fibers. Membranes can also be in various configurations, including but not limited to spiral wound, tubular, hollow fiber, and other configurations identifiable to a skilled person upon a reading of the present disclosure. Membranes can also be classified according to their pore diameter. Membranes can be neutral or charged, and particle transport can be active or passive. The latter can be facilitated by pressure, concentration, and chemical or electrical gradients of the membrane process.

Aspects of the present disclosure are directed to an aliphatic diethylenetriamine (DETA)-based nanofiltration membrane tailored for its separation performance by incorporating a rationally designed cationic/zwitterionic terpolymer. The terpolymer poly(DADMAC-co-DAMAPS-co-DADA), composed of diallyldimethylammonium chloride (DADMAC), 3-(N,N-diallyl-N-methylammonio)propanesulfonate (DAMAPS), and N,N-diallyldodecane-1,12-diamine (DADA) is synthesized and grafted in situ into the polyamide active layer via interfacial polymerization.

The molecular engineering approach led to a 5.8-fold increase in water flux while maintaining exceptional dye rejection (~99.9%) for Eriochrome Black T (EBT). Moreover, the modified membrane exhibited enhanced salt permeability for NaCl, MgCl$_2$, Na$_2$SO$_4$, and MgSO$_4$, owing to increased hydrophilicity and improved long-term operational stability introduced by the zwitterionic functionalities. The results highlight the promise of aliphatic DETA-based membranes for desalination and dye-laden wastewater treatment, particularly in environmental and textile sectors, where high dye rejection and tunable salt passage are crucial.

According to a first aspect of the present disclosure, a membrane is disclosed. The membrane includes a polymeric support and an active layer formed on the top of the polymeric support. The polymeric support provides mechanical strength and dimensional stability to the membrane and may be made from any suitable polymeric material, such as polysulfone, polyethersulfone, or polyacrylonitrile. In some embodiments, the polymeric support includes polysulfone. Polysulfones are a group of polymers, including a sulfone group and alkyl- or aryl-groups. The polysulfone polymer may be polysulfone (PSU), polyethersulfone (PES), polyphenylene sulfone (PPSU), poly(arylene sulfone) (PAS), poly(bisphenol-A sulfone) (PSF), or some derivative of polysulfone. The polysulfone polymer may also be called a polyaryl sulfone or a polyarylethersulfone. In some embodiments, the polysulfone may be optionally grafted with suitable hydrophilic monomers like acrylic acid or zwitterionic polymers. In some embodiments, the polysulfone or the polyethersulfone may optionally be modified with TiO$_2$ or graphene oxide, or derivatives thereof. In some other embodiments, the polymeric support includes polyacrylonitrile. The polyacrylonitrile may optionally be modified with sulfonic acid or Zwitterionic groups. In a preferred embodiment, the polymeric support includes polysulfone.

In some embodiments, the polysulfone has a weight average molecular weight (Mw) in a range of 1-3,000 kDa, preferably 5-1,000 kDa, preferably 10-100 kDa, preferably 20-60 kDa, preferably 25-50 kDa, preferably 30-40 kDa, or about 35 kDa.

The active layer is formed on top of the polymeric support. The active layer includes a polyamide matrix that has been grafted with a functional copolymer to enhance selectivity, hydrophilicity, antifouling properties, or ion exchange capacity. The copolymer is composed of reacted units of the following monomers: Diallyldimethylammonium chloride (DADMAC): a quaternary ammonium monomer providing permanent positive charge and hydrophilicity; 3-(N,N-diallyl-N-methylammonio)propanesulfonate (DAMAPS): a zwitterionic monomer contributing to antifouling and charge-balancing properties; and N,N-diallyl-dodecane-1,12-diamine (DADA): a long-chain diamine which imparts flexibility, hydrophobic modulation, and crosslinking potential to the copolymer. The ratio of these monomer units in the copolymer can be adjusted to tune the surface charge, hydrophilic/hydrophobic balance, and functional performance of the membrane. The combination of positively charged DADMAC, DAMAPS, and DADA units provides a unique balance of charge selectivity, fouling resistance, and mechanical integrity. In some embodiments, the copolymer includes 40 to 50 mol % DADMAC, preferably 42 to 48 mol % DADMAC, preferably 44 to 48 mol % DADMAC, preferably 45 mol % DADMAC; 35 to 50 mol % DAMAPS, preferably 37 to 47 mol % DAMAPS, preferably 40 to 45 mol % DAMAPS, preferably 41 to 44 mol % DAMAPS, preferably 42 to 43 mol % DAMAPS; and 0.01 to 0.2 mol % DADA, preferably 0.05 to 0.15 mol % DADA, preferably 0.07 to 0.12 mol % DADA, preferably 0.9 to 0.11 mol %. In a specific embodiment, the copolymer includes 47 mol % DADMAC, 43 mol % DAMAPS, and 0.10 mol % DADA The grafting is achieved using a linking molecule that can covalently bond the copolymer to the polyamide matrix, ensuring chemical stability and strong interfacial adhesion. In a preferred embodiment, the linking molecule is trimesoyl chloride. In alternative embodiments, isophthaloyl chloride, terephthaloyl chloride (TPC), adipoyl chloride, sebacoyl chloride; or carbodiimides like EDC (1-Ethyl-3-(3-dimethylaminopropyl)carbodiimide), NHS (N-Hydroxysuccinimide); or diisocyanates like toluene diisocyanate (TDI), hexamethylene diisocyanate (HDI), isophorone diisocyanate (IPDI); or epoxy-based linkers like glycidyl methacrylate (GMA), bisphenol A diglycidyl ether (BADGE); or silane coupling agents like aminopropyltriethoxysilane (APTES), or glycidyloxypropyltrimethoxysilane (GPTMS) may also be used.

In some embodiments, the membrane includes a copolymer comprising 0.05-0.5 wt. % of the total weight of the membrane.

A method for making the membrane is described. Referring to FIG. 1, a schematic flow diagram of a method of making the membrane is illustrated. The order in which the method 50 is described is not intended to be construed as a limitation, and any number of the described method steps may be combined in any order to implement the method 50. Additionally, individual steps may be removed or skipped from the method 50 without departing from the spirit and scope of the present disclosure.

At step 52, the method 50 includes dissolving an amine and the copolymer in water to form an aqueous solution. The amine is one selected from the diethylenetriamine (DETA) and triethylamine (TEA). Certain other examples of amines that can be used include, methylamine ($CH_3NIH$), ethylamine ($C_2H_5NH_2$), n-propylamine, n-butylamine, isobutylamine, hexylamine, octylamine, ethanolamine (monoethanolamine, MEA), diethanolamine (DEA), 2-amino-2-methyl-1-propanol (AMP), ethylene diamine (EDA), triethylene tetramine (TETA), tetraethylene pentamine (TEPA), spermidine, spermine, poly(allylamine), cyclohexylamine, aniline (phenylamine), N-methylaniline, piperidine, morpholine, pyrrolidine, N,N-dimethylbutylamine, N-methylmorpholine, N,N-dimethylethanolamine (DMEA), tetrabutylammonium chloride (TBAC), benzalkonium chloride, choline chloride, cetyltrimethylammonium bromide (CTAB), and/or combinations thereof. In a preferred embodiment, the amine is DETA. In another preferred embodiment, the amine is TEA. In some embodiments, the amine is a combination of DETA and TEA. In an embodiment, the aqueous solution includes DEA in a weight percentage of 1 to 5%, preferably 2 to 4%, preferably 2 to 3%, more preferably about 2%. In some embodiments, the aqueous solution includes TEA in an amount of 1 to 5%, preferably 1 to 4%, preferably 1 to 3%, more preferably about 1%.

The copolymer includes reacted units of a diallyldimethylammonium chloride (DADMAC), 3-(N,N-diallyl-N-methylammonio)propanesulfonate (DAMAPS), and N,N-diallyldodecane-1,12-diamine (DADA). The copolymer is prepared by initially dissolving diallyldimethylammonium chloride (DADMAC), 3-(N,N-diallyl-N-methylammonio)-2-hydroxypropane sulfonate (DAMAPS), and diallyldimethylammonium acetate (DADAC) in water, along with a salt and a free-radical polymerization initiator to form an aqueous solution. In some embodiments, a salt such as sodium chloride is added to adjust the ionic strength of the solution. In alternative embodiments, the salt may be selected from potassium chloride, sodium sulfate, calcium chloride, sodium acetate, or sodium citrate, depending on the desired ionic environment or final application. In some embodiments, the free-radical polymerization inhibitor is 2,2'-azobis(2-methylpropionamidine) dihydrochloride (AMPD). Suitable alternatives to AMPD include ammonium persulfate, potassium persulfate, hydrogen peroxide, or other water-soluble initiators such as VA-044 or sodium metabisulfite, optionally in combination with a co-initiator for redox initiation.

The aqueous solution is heated at a temperature ranging from about 60° C. to 100° C. for a period of about 20 to 28 hours to facilitate copolymerization, thereby forming a copolymer comprising polymerized units of DADMAC, DAMAPS, and DADAC, referred to as poly(DADMAC-co-DAMAPS-co-DADAC).

Upon completion of the polymerization reaction, a base such as sodium hydroxide is added to the copolymer solution to neutralize any residual acidic species and adjust the pH. Additionally, further amounts of sodium chloride or a similar salt may be added to stabilize the final copolymer composition. In alternative embodiments, the base may be selected from potassium hydroxide, sodium carbonate, sodium bicarbonate, or organic bases such as triethylamine, diethanolamine, or imidazole, depending on the applications.

In some embodiments, the molar ratio of DADAC to DAMAPS is in the range of 1:1 to 1:10, preferably 1:2 to 1:8, preferably 1:3 to 1:7, preferably 1:4 to 1:6, preferably 1:4 to 1:5, more preferably 1:4.3. In some embodiments, the molar ratio of DADAC to DADMAC is in the range of 1:1 to 1:10, preferably 1:2 to 1:8, preferably 1:3 to 1:7, preferably 1:4 to 1:6, preferably 1:4 to 1:5, more preferably 1:4.76. In a specific embodiment, the molar ratio of DADAC:DAMAPS:DADMAC is 1:4.3:4.8.

At step 54, the method 50 includes dissolving TMC in an organic solvent to form an organic mixture. As used herein, the term "solvent" refers to and includes, but is not limited to, water (e.g. tap water, distilled water, deionized water, deionized distilled water), organic solvents, such as ethers (e.g. diethyl ether, tetrahydrofuran, 1,4-dioxane, tetrahydropyran, t-butyl methyl ether, cyclopentyl methyl ether, di-isopropyl ether), glycol ethers (e.g. 1,2-dimethoxyethane, diglyme, triglyme), alcohols (e.g. methanol, ethanol, trifluoroethanol, n-propanol, iso-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), amide solvents (e.g. dimethylformamide, dimethylacetamide, N-methyl-2-pyrrolidone, formamide, N-formylmorpholine, N-methylformamide, 2-pyrrolidone, tetramethylurea, N-vinylacetamide), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. As used herein, solvent may refer to non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide), polar protic solvents (e.g., acetic acid, n-butanol, isopropanol, n-propanol, ethanol, methanol, formic acid, water), and mixtures thereof. In one preferred embodiment, the solvent is hexane. In an embodiment, the concentration of TMC in the organic solvent is about 0.1 to 0.2%, preferably 0.12 to 0.18%, preferably 0.14 to 0.16%, preferably 0.15%.

At step 56, the method 50 includes pouring the aqueous solution onto a polymeric support and then pouring the organic mixture onto the same support to form a coated support. In some embodiments, the polymeric support includes polysulfone. Examples of polysulfones include PSU, PES, PPSU, PAS, PSF, or some derivative of polysulfone. The polysulfone polymer may also be called a polyaryl sulfone or a polyarylethersulfone. In a preferred embodiment, the polysulfone polymer is PSU. In some embodiments, other polymers such as polyvinyl chloride, polyvinylidene chloride, polyacrylonitrile, high impact polystyrene, acrylonitrile butadiene styrene, polyethylene/acrylonitrile butadiene styrene, polycarbonate/acrylonitrile butadiene styrene, acrylic polymers, polybutadiene, polyisoprene, polyacetylene, silicones, synthetic rubbers and the like, and copolymers and mixtures thereof may be used.

In one embodiment, the aqueous solution is poured onto the polymeric support membrane and allowed to remain in contact for 1-20 minutes to ensure adequate absorption or surface interaction. Thereafter, the excess aqueous solution is removed, for example, using a rubber roller or by draining.

Subsequently, the organic solution is poured onto the same surface of the support membrane. Upon contact between the immiscible aqueous and organic phases, interfacial polymerization occurs, resulting in the formation of a polyamide layer on the surface of the support membrane.

At step 58, the method 50 includes heating the coated support to form a membrane. The coated support is heated in an oven for a period of 10 to 120 minutes, preferably 10 to 90 minutes, preferably 10 to 60 minutes, preferably 10 to 45 minutes, preferably 10 to 30 minutes, preferably 10 to 20 minutes, preferably 10 minutes at a temperature range of 50 to 70° C., preferably 55-65° C., preferably 60° C., to evaporate the solvents (n-hexane), resulting in the formation of the membrane.

The success of the fabrication process was determined based on the determination of the water contact angle (WCA). Generally, if the WCA is smaller than 90°, the membrane is considered hydrophilic; if the WCA is larger than 90°, the membrane is considered hydrophobic. The WCA of the membrane of the present disclosure is in a range of 12-22°, preferably 13 to 20°, preferably 13 to 15°, preferably 13 to 14°, and more preferably about 13.8°. The membrane has a rate of flux of 25 to 40 L m$^{-2}$ h$^{-1}$ at a pressure of 5 bar.

Elemental analysis reveals the successful fabrication of the membrane. The membrane includes carbon in an amount of 65 to 70%, preferably 67.69% by weight, oxygen in an amount of 15 to 20%, preferably 15 to 18%, preferably 15.8% by weight, sulfur in an amount of 5 to 7%, preferably 6-7%, preferably 6.28% by weight, and nitrogen in an amount of 5 to 12%, preferably 7-11%, preferably 10.24% by weight based on the total weight of the membrane.

The membrane of the present disclosure is used for removing solutes like dyes and salts from an aqueous solution/solvent, such as water. In an embodiment, the solute is a dye. Suitable examples of dyes include alkaline methylene blue, methylene blue, tetrazine, acid orange, phenolic phenol, bisphenol, 2,4-dichlorophenol, Congo red, toluene, chromium ions, bromate ions, eosin yellow, Eriochrome black T (EBT), etc. In an embodiment, the solute is EBT. In an embodiment, the membrane has a rejection rate of 95-100%, preferably 96-99%, preferably 97 to 99%, preferably 98 to 99% for a dye. In a specific embodiment, the membrane has a rejection rate of greater than 99%, preferably 99.5%, preferably 99.7%, preferably 99.9%, more preferably about 99.9% for a dye, preferably EBT.

In an embodiment, the solute is a salt. In some embodiments, the membrane is used for removing salts from the aqueous solution. For the salt, the membrane has a permeability rate of 40-70%, preferably 45 to 65%, preferably 50 to 65%, preferably 55 to 65%, preferably 60 to 65%, preferably 65% for a salt. The salt may be one or more selected from $MgCl_2$, $CaCl_2$, $MgSO_4$, $Na_2SO_4$, NaCl, and/or a mixture thereof.

In some embodiments, the solute is a pharmaceutically active compound. Pharmaceutically active compounds are a class of emerging environmental contaminants widely used in human and veterinary medicine. The primary source of release of these substances and their metabolites into the environment is represented by domestic disposal and hospital sewage discharge. Suitable examples of pharmaceutically active compounds include cetaminophen, metoprolol, caffeine, antipyrine, sulfamethoxazole, flumequine, ketorolac, atrazine, isoproturon, 2-hydroxybiphenyl, diclofenac, amitriptyline, and loperamide. Certain other examples include, analgesics (for example, propoxyphene); anticonvulsants (for example: phenytoin); anti-depressants (for example, fluoxetine (Prozac), sertraline (Zoloft), amitriptyline, protriptyline, trimipramine maleate, nortriptyline, desipramine, imipramine, doxepin, nordoxepin, paroxetine); anti-inflammatory (for example, methyprednisolone, prednisone); hormones (for example, equilin, 17β-estradiol, estrone, 17α-ethynyl estradiol, medroxyprogesterone, megestrol acetate, mestranol, progesterone, norethindrone, norethynodrel, norgestrel, cholesterol); antibiotics (for example, norfloxacin, lincomycin, oxytetracycline HCl, ciprofloxacin, ofloxacin, trimethoprim, penicillin G. 1/2-benzathine salt, sulfamethoxazole, penicillin V potassium salt, tylosin tartrate).

EXAMPLES

The following examples demonstrate a polymeric membrane and a method of making thereof. The examples are provided solely for illustration and are not to be construed as limitations of the present disclosure, as many variations thereof are possible without departing from the spirit and scope of the present disclosure.

Example 1: Materials

According to the present disclosure, monomer diallyldimethylammonium chloride (DADMAC), polymerization initiator 2,2'-Azobis(2-methylpropionamidine) dihydrochloride (AMPD) (>97%), ring-forming agent 1,3-propanesultone, and diallylmethylamine were procured from Sigma-Aldrich. The aliphatic amine diethylenetriamine (DETA), acid chloride monomer trimesoyl chloride (TMC), membrane-forming polymer polysulfone (PS), organic solvent dimethylacetamide (DMA), and non-polar solvent hexane were also obtained from Sigma-Aldrich. The chemical precursors ethyl formate, 1,12-diaminododecane, and allyl chloride were sourced from Fluka. The organic base triethylamine (TEA) was acquired from TCI Chemicals. The polyester support used for membrane casting, identified as Novatexx 2413, was supplied by the Freudenberg Group. Further, analytical reagent (AR) grade sodium chloride, sodium hydroxide, ether, acetonitrile, and methanol were utilized as received from Fluka AG, Buchs, Switzerland.

Ultrapure Milli-Q water was employed throughout the synthesis and membrane fabrication procedures. A dialysis membrane with a molecular weight cut-off (MWCO) of 3500 Da (Spectra/Por, Spectrum) was utilized for polymer purification.

For comparative analysis and synthesis confirmation of the above-described terpolymer PDMD, poly-DADMAC was synthesized in accordance with established literature procedures [Z. Arshad, et al., Polymer (Guildf) 2023, 264, 125537, incorporated herein by reference in its entirety]. Additionally, the intermediate compound DADAC was synthesized following the previously reported protocol [M. A. J. Mazumder, et al. Chemical Engineering Journal 2018, 334, 1440, incorporated herein by reference in its entirety].

Example 2: Physical Methods

Rheological elemental analysis was conducted using a Perkin Elmer elemental analyzer (Model 2400), according to certain embodiments. The Fourier transform infrared (FTIR) spectroscopy analysis was performed utilizing a Nicolet iS10 spectrometer (Thermo Scientific), according to certain embodiments. The nuclear magnetic resonance (NMR) spectra were recorded using a 400 MHz Avance III Bruker spectrometer, where residual $D_2O$ protons at $\delta$ 4.65 ppm for $^1H$ and dioxane signal at $\delta$ 67.4 ppm for $^{13}C$ were employed as internal standards, according to certain embodiments.

Thermogravimetric analysis (TGA) was carried out using a Q600 TA instrument (Simultaneous Differential Thermal Analyzer, SDT) under a nitrogen flow environment, according to certain embodiments. The polymer viscosity was measured using an Ubbelohde viscometer (flow rate 0.005 cSt/s), which was immersed in a thermostatic water bath (SI Analytics) maintained at 30.0±0.1° C., according to certain embodiments.

The surface roughness and topography of the membranes were analyzed using atomic force microscopy (AFM) with an Agilent 550 instrument, according to certain embodiments. The water contact angle of the membrane surface was measured using a KRÜSS Goniometer (Model DSA25), according to certain embodiments. The zeta potential of the membrane surface was determined using an electrokinetic analyzer (SurPASS 3, Anton Paar), according to certain embodiments.

The membrane morphology was characterized using a scanning electron microscope (SEM), model EM-30AX (COXEM), according to certain embodiments. The dye rejection efficiency of the membranes was evaluated using ultraviolet-visible (UV-VIS) spectrophotometry with a JASCO V-750ST instrument, according to certain embodiments.

Example 3:
Poly-(DADMAC-co-DAMAPS-co-DADA)
Synthesis

Figure 1B:
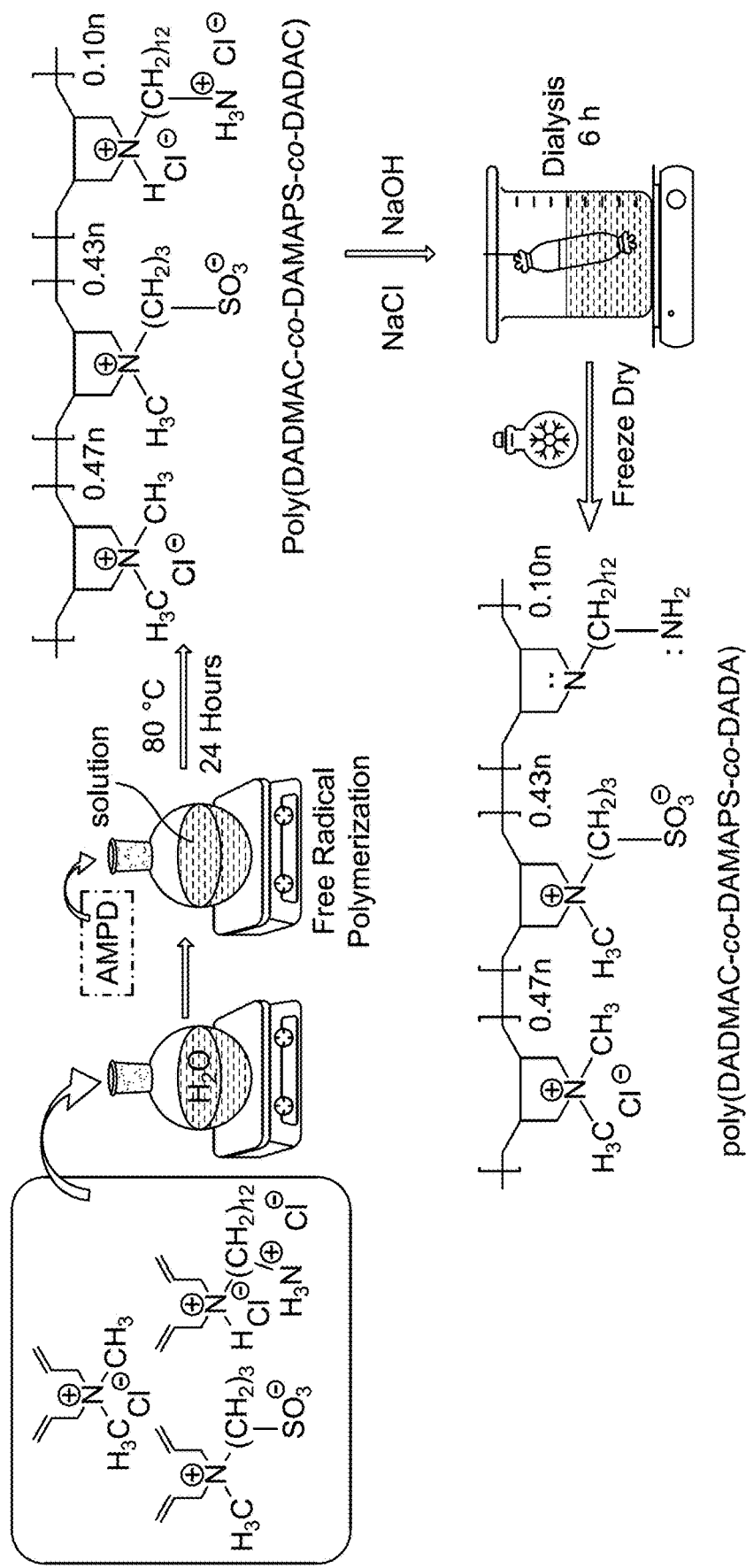
FIG. 1B illustrates an exemplary synthesis process of poly-(DADMAC-co-DAMAPS-co-DADA) [PDMD] via copolymerization of diallyldimethylammonium chloride (DADMAC), 3-(dimethyl(allyl)ammonio)propane-1-sulfonate (DAMAPS), and diallyldimethylammonium chloride hydrochloride (DADAC) monomers, according to certain embodiments.

A synthesis procedure was conducted where N,N-diallyldodecane-1,12-diammonium dichloride (DADAC) (0.71 g, 2.1 mmol), 3-(N,N-diallyl-N-methylammonio)propanesulfonate (DAMAPS) (2.1 g, 9.0 mmol), diallyldimethylammonium chloride (DADMAC) (1.62 g, 10 mmol), and sodium chloride (NaCl) (0.13 g) were dissolved in deionized water (2.38 g) in a round-bottom flask. The resulting solution was purged with nitrogen gas to remove dissolved oxygen, after which 2,2'-Azobis(2-methylpropionamidine) dihydrochloride (AMPD) (290 mg) was added as a polymerization initiator. The mixture was stirred continuously and maintained at a temperature of 80° C. for a duration of 24 hours, resulting in polymerization. Following completion of the polymerization reaction, the thickened product mixture was subjected to dialysis against distilled water for 24 hours to remove unreacted species and low-molecular-weight byproducts. Subsequently, sodium hydroxide (NaOH) (933 mg) and NaCl (6 g) were introduced into the dialysis bag containing the poly-(DADMAC-co-DAMAPS-co-DADAC) polymer solution, and dialysis was continued for an additional 6 hours to complete the transformation of DADAC to N,N-diallyldodecane-1,12-diamine (DADA), obtaining the target terpolymer. Furthermore, upon completion of dialysis, the solution was freeze-dried to yield the desired terpolymer, poly-(DADMAC-co-DAMAPS-co-DADA), as a white solid in 87% yield (3.86 g). FIG. 1B shows a schematic synthesis process for the synthesis of poly-(DADMAC-co-DAMAPS-co-DADA). Elemental analysis of the obtained polymer revealed the following composition: calculated values: carbon (C), 64.69%; hydrogen (H), 11.00%; nitrogen (N), 5.02%; experimental values: C, 64.7%; H, 10.9%; N, 5.0%.

Fourier-transform infrared (FTIR) spectroscopy (using KBr pellet) of the poly-(DADMAC-co-DAMAPS-co-DADA) exhibited characteristic absorption peaks at 3390 $cm^{-1}$ (N—H and O—H stretching), 2922 $cm^{-1}$ and 2851 $cm^{-1}$ (alkyl C—H and N—H stretching), 1645 $cm^{-1}$ (N—H bending), 1464 $cm^{-1}$ (C—H bending), 1181 $cm^{-1}$ (sulfonyl $SO_2$ stretching), 1036 $cm^{-1}$ (sulfoxide SO stretching), 947 $cm^{-1}$ (aromatic ring stretching), and additional peaks at 728 $cm^{-1}$ and 599 $cm^{-1}$.

Example 4: Synthesis of Membranes

A membrane support was prepared. Polysulfone (PS) beads were vacuum-dried at 50° C. for a duration of 24 hours. Subsequently, a solution comprising 18% (w/w) PS was prepared at ambient temperature using dimethylacetamide (DMA) as a solvent. The resulting PS solution was degassed for 30 minutes and allowed to stand for 24 hours to ensure the complete release of trapped air bubbles. The degassed solution was then cast using a membrane applicator onto a non-woven polyester support. The cast membrane was subjected to a coagulation process by immersion into a coagulation bath for 10 minutes to initiate solidification. The coagulated support membrane was subsequently immersed in a deionized water bath and maintained overnight to complete the solvent exchange and phase inversion process.

In accordance with certain embodiments, a polyamide active layer was subsequently formed on the surface of the prepared membrane support via interfacial polymerization (IP). An aqueous phase comprising 2% (w/v) diethylenetriamine (DETA), 1% (w/v) triethylamine (TEA), and 0.1-0.3% (w/v) of the terpolymer poly-(DADMAC-co-DAMAPS-co-DADA) (PDMD) was prepared and utilized. Separately, an organic solution comprising 0.15% (w/v) trimesoyl chloride (TMC) dissolved in hexane was also prepared. The aqueous solution containing DETA, TEA, and PDMD was poured onto the surface of the PS membrane support and maintained for 2 minutes to enable surface saturation. Excess solution was removed using a rubber roller. Subsequently, the organic TMC solution was poured onto the same surface and maintained for 1 minute to facilitate the IP reaction between DETA and TMC, thereby forming the polyamide active layer on the membrane support and enabling in situ grafting of the PDMD terpolymer within the active layer matrix.

Following formation of the polyamide layer, the resultant membrane was rinsed with hexane and placed in an oven at 60° C. for a duration of 10 minutes to complete thermal treatment. Grafted membranes were prepared using variable PDMD concentrations. The membrane fabricated using 0.1% (w/v) PDMD concentration is hereinafter referred to as DD-DAMAPS-1, where "DD" refers to the combined grafted DADMAC and DADA units. The membrane fabricated using 0.3% (w/v) PDMD concentration is hereinafter referred to as DD-DAMAPS-2. For comparative purposes, a control membrane without incorporation of PDMD was also synthesized. In the control membrane, herein designated as PsZ, the interfacial polymerization reaction was limited to DETA and TMC, thereby yielding a conventional polyamide active layer devoid of zwitterionic or cationic polymer modification.

Figure 1C:
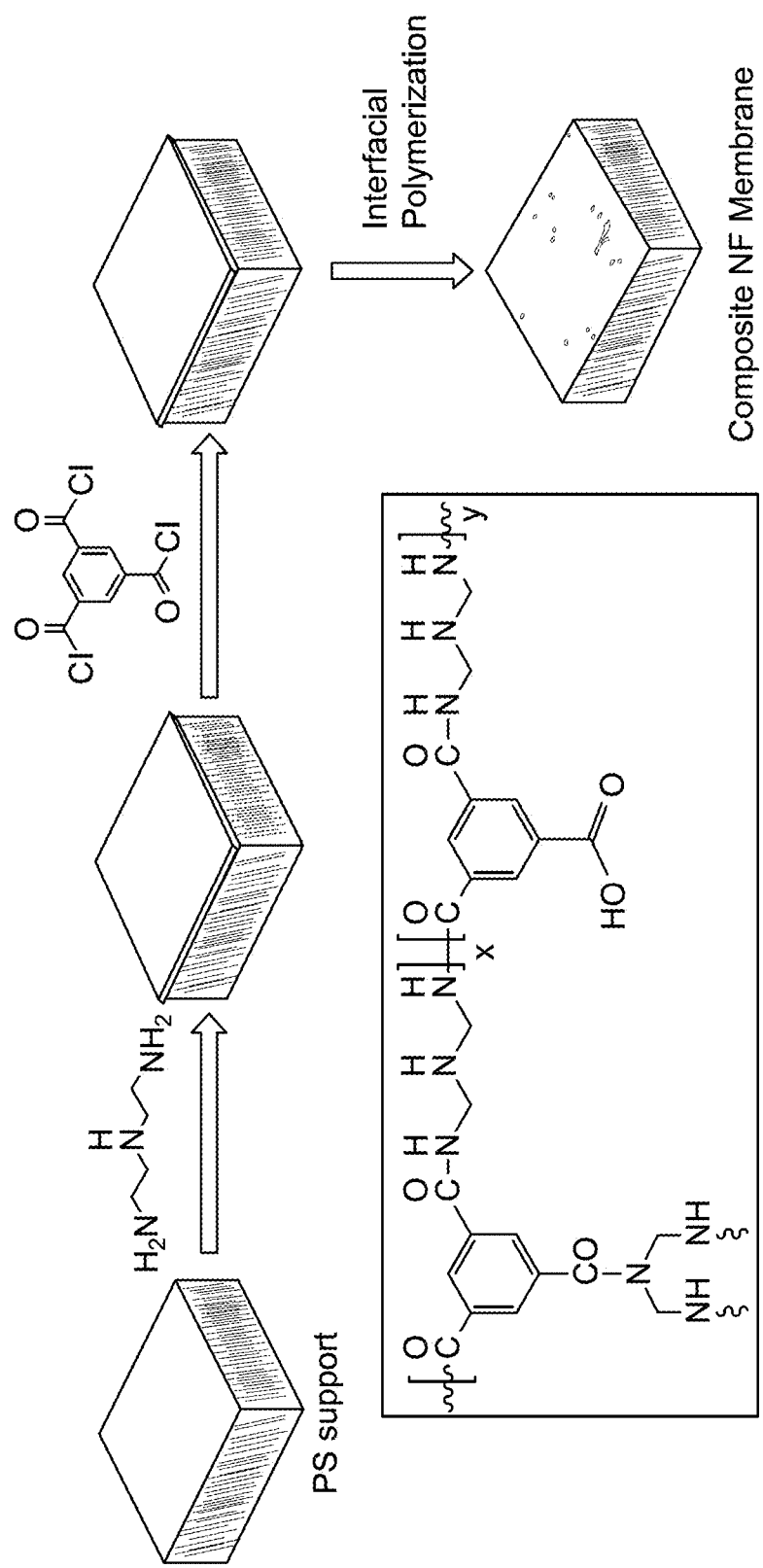
FIG. 1C illustrates synthesis procedure of pristine and PDMD containing polyamide active layers on the PS support membranes, according to certain embodiments.
Figure 1C:
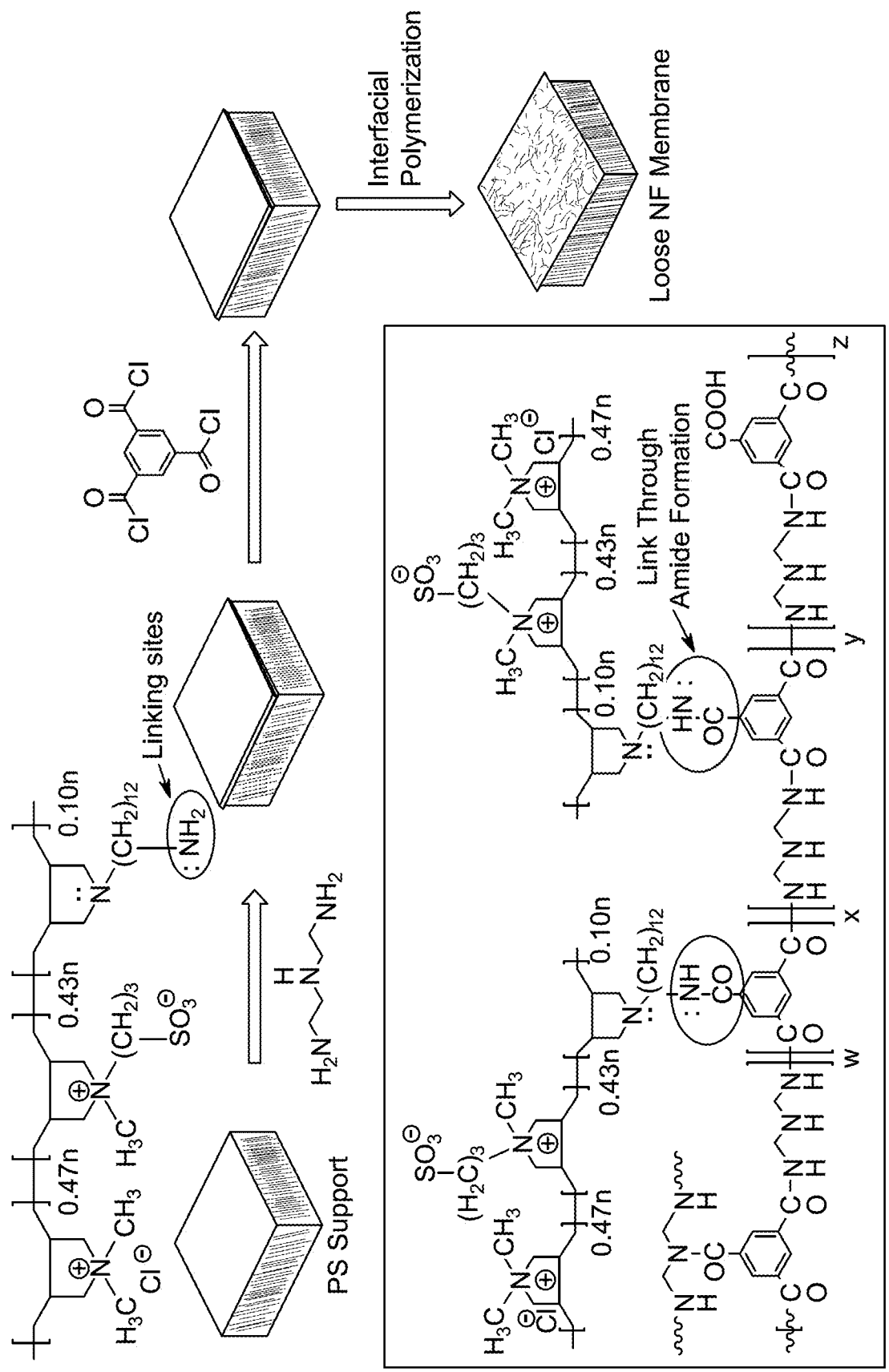

FIG. 1C illustrates the schematic synthetic process of DD-DAMAPS-1, DD-DAMAPS-2, and PsZ membranes, according to certain embodiments.

Example 5: Evaluation of Separation Performance

The membranes were tested for water permeability, solutes rejection, and antifouling performance using a cross-flow setup having the capacity of three filtration membrane chambers with the size of 10×5.5 cm and a chiller to keep feed temperature at 23° C. Before measuring the pure water flux, the membranes were compacted at high pressure for 1 hour. For the salt rejection study, $MgSO_4$, $Na_2SO_4$, $MgCl_2$, and NaCl were used with a 2000 ppm feed concentration of each at 15 bar. The detailed salt rejection study for $Na_2SO_4$ was also done with different feed concentrations of 2000, 4000, 6000, 8000, and 10000 ppm at 15 bar. The total dissolved solids (TDS) value for feed and permeate were measured using Ultrameter II™ from Myron company. The EBT rejection study was done using 25, 50, 75, and 100 ppm feed concentrations at 10 bar. The antifouling studies were performed by combined feed solution containing 50 ppm EBT and 50 ppm BSA at 10 bar.

Equation 1 was used to calculate the permeation flux.

$$J = V/(A \times t) \quad (1)$$

where V is for volume (liter), A denotes the membrane area ($m^2$), and t is time (hours). The salt rejection of the membranes was calculated using equation 2:

$$R\,(\%) = \left(\frac{Cf - Cp}{Cf}\right) \times 100 \quad (2)$$

where Cf and Cp are the concentration of feed and permeate, respectively.

A cationic/zwitterionic terpolymer, poly-(DADMAC-co-DAMAPS-co-DADA) (PDMD), including three distinct monomeric motifs was synthesized to enable in situ grafting within a polyamide active layer. The terpolymer incorporated diallyldimethylammonium chloride (DADMAC), a cationic monomer bearing a permanent positive charge, and 3-(N,N-diallyl-N-methylammonio)propanesulfonate (DAMAPS), a zwitterionic monomer bearing both permanent positive and negative charges in an electroneutral configuration. The aforementioned monomers are known to form strong electrostatic interactions with water molecules, promoting the formation of a stable hydration layer, enhancing both permeation flux and antifouling characteristics. In order to enable efficient integration of these monomers into the polyamide layer via interfacial polymerization, the dicationic monomer N,N-diallyldodecane-1,12-diammonium dichloride (DADAC), bearing terminal amine salt ($-NH_3^+$ $Cl^-$) groups, was co-polymerized with DADMAC and DAMAPS.

The terpolymer poly-(DADMAC-co-DAMAPS-co-DADAC) was synthesized in accordance with Butler's cyclopolymerization protocol using 2,2'-azobis(2-methylpropionamidine) dihydrochloride (AMPD) as the free-radical initiator, and the resulting polymer was obtained in 87% yield. To facilitate participation in the interfacial polymerization reaction, the terminal amine salt ($-NH_3^+Cl^-$) groups of the synthesized poly-(DADMAC-co-DAMAPS-co-DADAC) were converted into basic amine ($-NH_2$) groups by treatment with sodium hydroxide (NaOH), yielding the functionalized terpolymer poly-(DADMAC-co-DAMAPS-co-DADA). The resulting PDMD structure included two cationic nitrogen, one tertiary nitrogen, one primary nitrogen, and one anionic sulfur moiety per repeat unit.

Nuclear magnetic resonance (NMR) spectroscopy was used to confirm the chemical structure of the synthesized PDMD terpolymer. Both $^1H$ and $^{13}C$ NMR spectra were analysed for the homopolymer of DADMAC and the poly-(DADMAC-co-DAMAPS-co-DADA) terpolymer. The diallyl monomers exhibited characteristic alkene proton signals in the $^1H$ NMR spectra at 5-6 ppm (designated as signals 'a' and 'b'), and corresponding alkene carbon signals in the $^{13}C$ NMR spectra at 120 ppm to 135 ppm, as shown in FIGS. 2A-2C and FIGS. 3A-3C, respectively. Upon polymerization, the aforementioned alkene signals disappeared, as indicated in FIGS. 2D-2E and FIGS. 3D-3E, confirming successful polymerization through a chain transfer mechanism involving allylic hydrogen termination, consistent with established free-radical cyclopolymerization pathways [G. B. Butler, et al. J. Am. Chem. Soc. 1957, 79, 3128, incorporated herein by reference in its entirety]. The inclusion of homopolymerized DADMAC served as a reference benchmark to validate the spectral shifts observed in the synthesized PDMD terpolymer.

Figure 4:
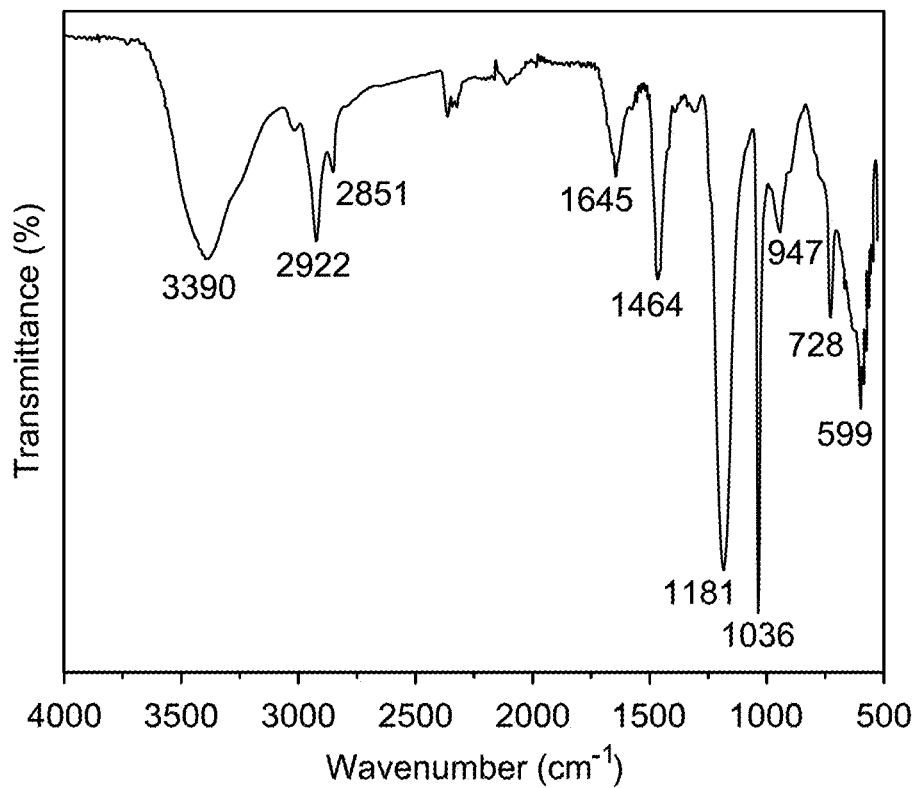
FIG. 4 illustrates a Fourier transform infrared (FTIR) spectral analysis of PDMD.

The infrared (IR) spectral analysis of the synthesized poly-(DADMAC-co-DAMAPS-co-DADA) (PDMD) was conducted to confirm the characteristic vibrational modes of functional groups present in the polymer structure. The IR spectrum, as illustrated in FIG. 4, exhibited a broad absorption band within the range of 3200-3600 $cm^{-1}$, attributed to 0-H and $NH_2$ stretching vibrations. The absorption peaks at 2922 $cm^{-1}$ and 2851 $cm^{-1}$ corresponded to N—H and alkyl C—H stretching modes, respectively. A distinct absorption band at 1645 $cm^{-1}$ was ascribed to N—H bending, while the band at 1464 $cm^{-1}$ indicated C—H bending. The absorption signals at 1181 $cm^{-1}$ and 1036 $cm^{-1}$ were assigned to symmetric and asymmetric stretching vibrations of sulfonyl ($SO_2$) and sulfoxide (SO) functional groups, respectively. Furthermore, a peak at 947 $cm^{-1}$ was associated with aromatic ring stretching.

Figure 5:
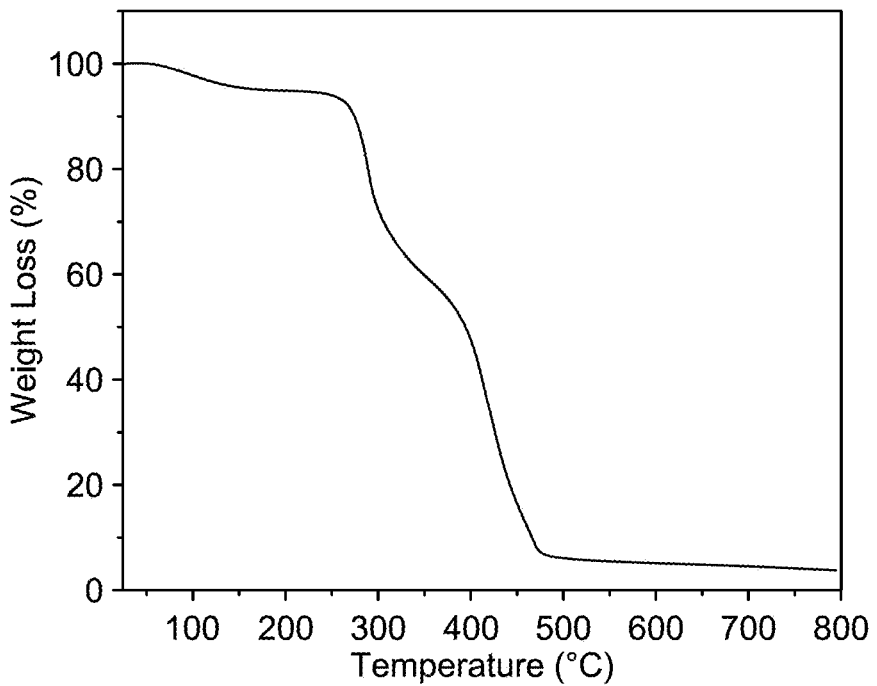
FIG. 5 illustrates a thermogravimetric analysis (TGA) of PDMD.

Thermogravimetric analysis (TGA) was conducted to evaluate the thermal stability of the PDMD polymer. The TGA results, as presented in FIG. 5, demonstrated an initial weight loss of approximately 6% up to 200° C., attributed to moisture evaporation. A progressive weight reduction was observed between 270 to 470° C., corresponding to an 86% loss in mass, which was attributed to the thermal decomposition of pyrrolidine ring structures. The TGA results confirmed that the polymer maintained thermal stability up to at least 260° C.

Figure 6:
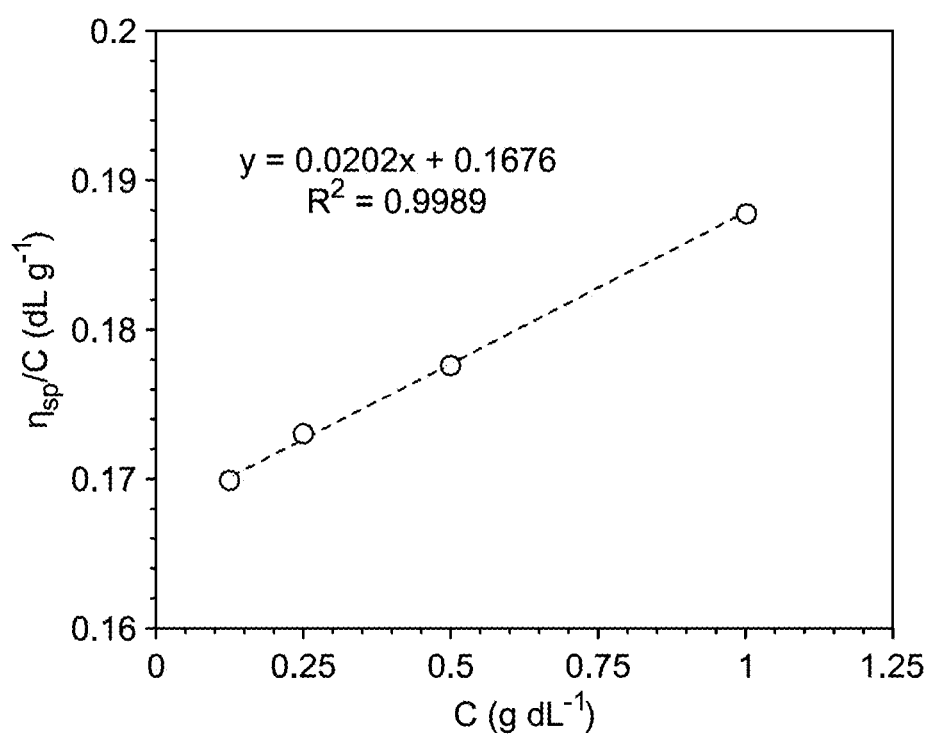
FIG. 6 illustrates a viscosity plot of PDMD in 0.1 M NaCl at 30° C.

Viscometric analysis was performed to determine the intrinsic viscosity of PDMD. The viscosity measurements were conducted in 0.1 M sodium chloride (NaCl) solution, and the data were modeled as shown in FIG. 6. The intrinsic viscosity of the polymer was determined to be 0.168 g·dL$^{-1}$. Accurate determination of molar mass by gel permeation chromatography (GPC) was not feasible for PDMD due to the presence of NH$^+$ and SO$_3^-$ functional groups, which are known to adsorb onto the GPC column matrix.

Morphological characterization of the PsZ membrane and the PDMD-incorporated membranes, designated DD-DAMAPS-1 and DD-DAMAPS-2, was performed utilizing scanning electron microscopy (SEM). A gold (Au) coating was applied to the membrane surfaces to enable electrical conductance during imaging. SEM-based surface analysis and comparative morphological evaluation are illustrated in FIGS. 4A-4I.

The surface of the PsZ membrane, prepared via interfacial polymerization (IP) between trimesoyl chloride (TMC) and diethylenetriamine (DETA), was observed to be smooth and uniform. In contrast, the surface of DD-DAMAPS-1 exhibited a crumpled morphology attributed to the incorporation of the PDMD terpolymer. Morphological features appearing as dispersed thread-like structures were observed on the DD-DAMAPS-1 membrane surface. The listed features were attributed to the presence of DADA units in the PDMD, which contain terminal amine groups capable of reacting with TMC during IP. The remaining DADMAC and DAMAPS moieties of the grafted polymer manifested as thread-like surface features, thereby indicating successful dispersion and surface localization of the polymer.

Figure 2A:
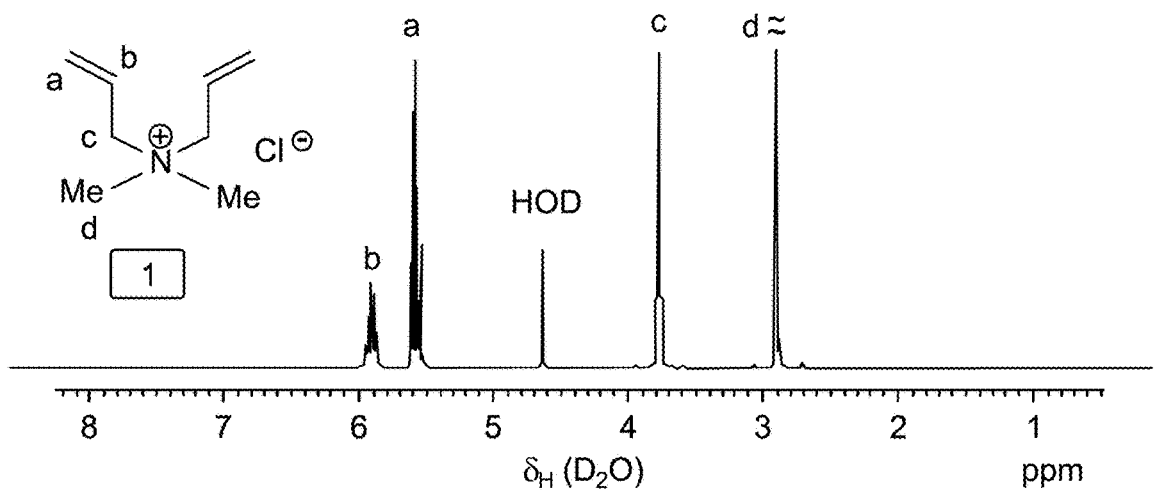
FIG. 2A illustrates the proton nuclear magnetic resonance (NMR) spectrum of DADMAC in $D_2O$, according to certain embodiments.
Figure 2B:
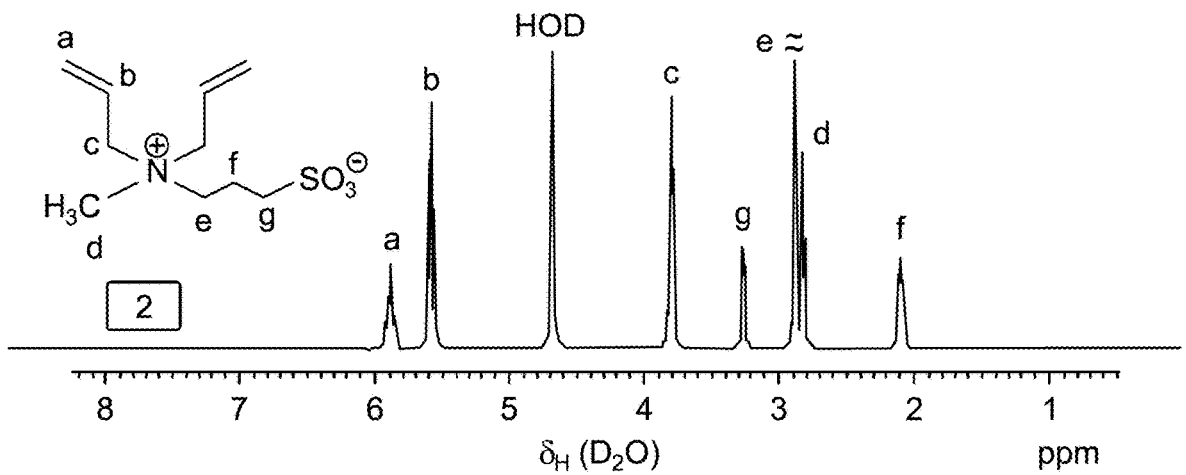
FIG. 2B illustrates the proton NMR spectrum of DAMAPS in $D_2O$, according to certain embodiments.
Figure 2C:
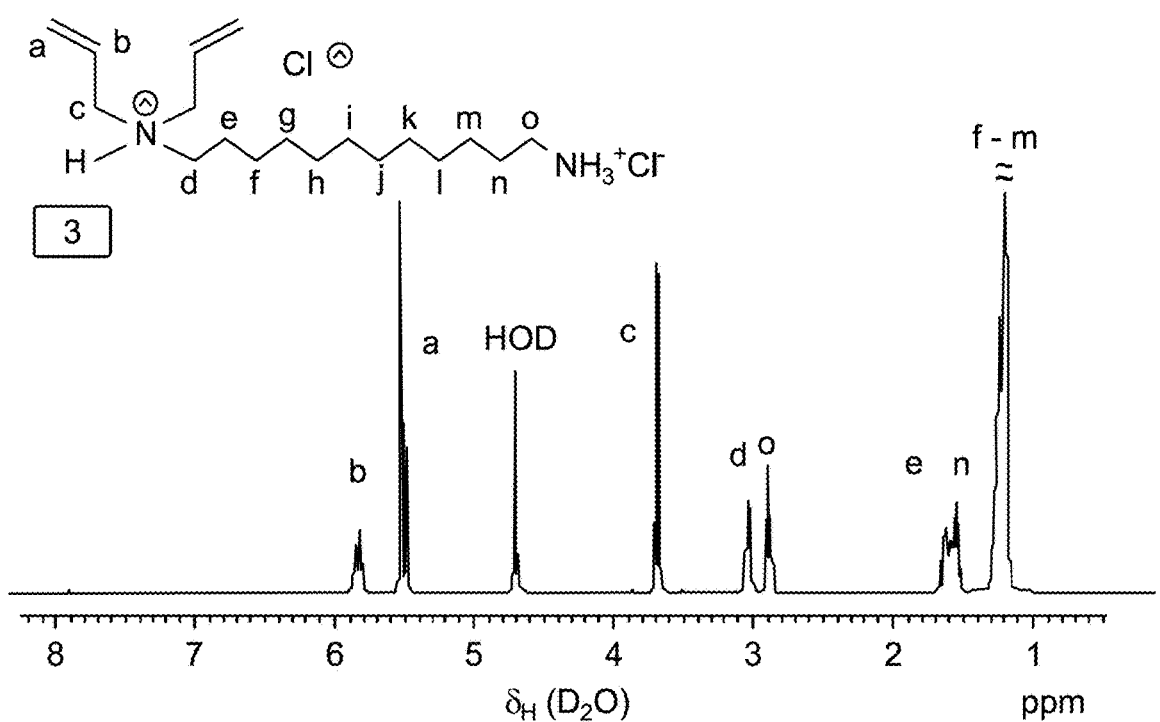
FIG. 2C illustrates the proton NMR spectrum of DADAC in $D_2O$, according to certain embodiments.
Figure 2D:
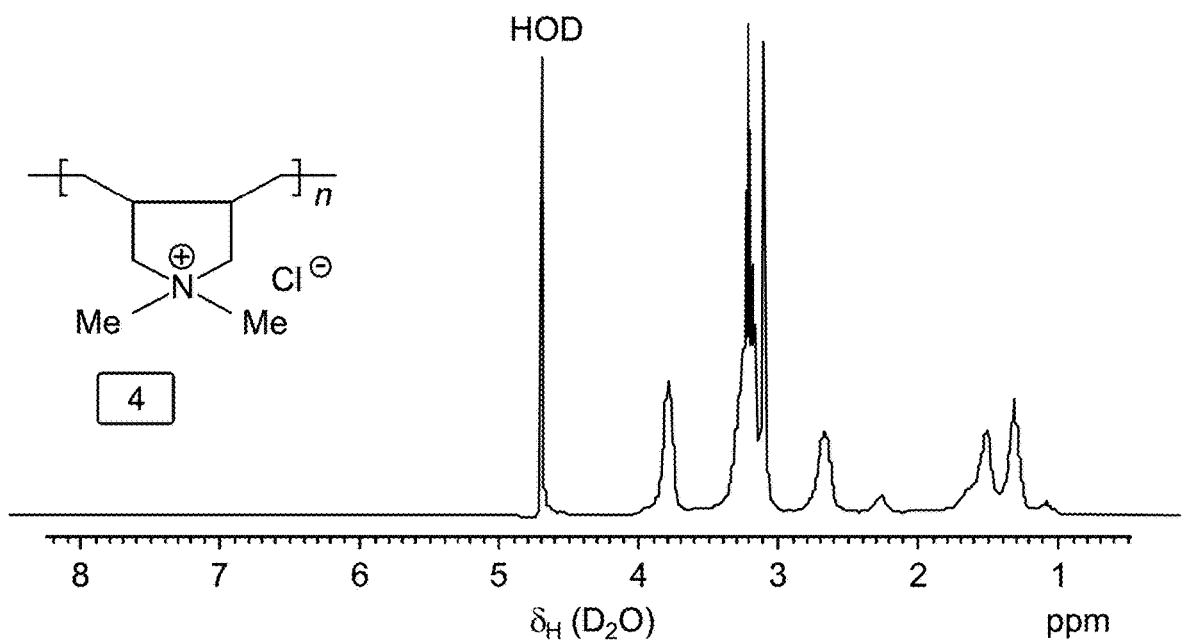
FIG. 2D illustrates the proton NMR spectrum of PDADMAC in $D_2O$, according to certain embodiments.
Figure 2E:
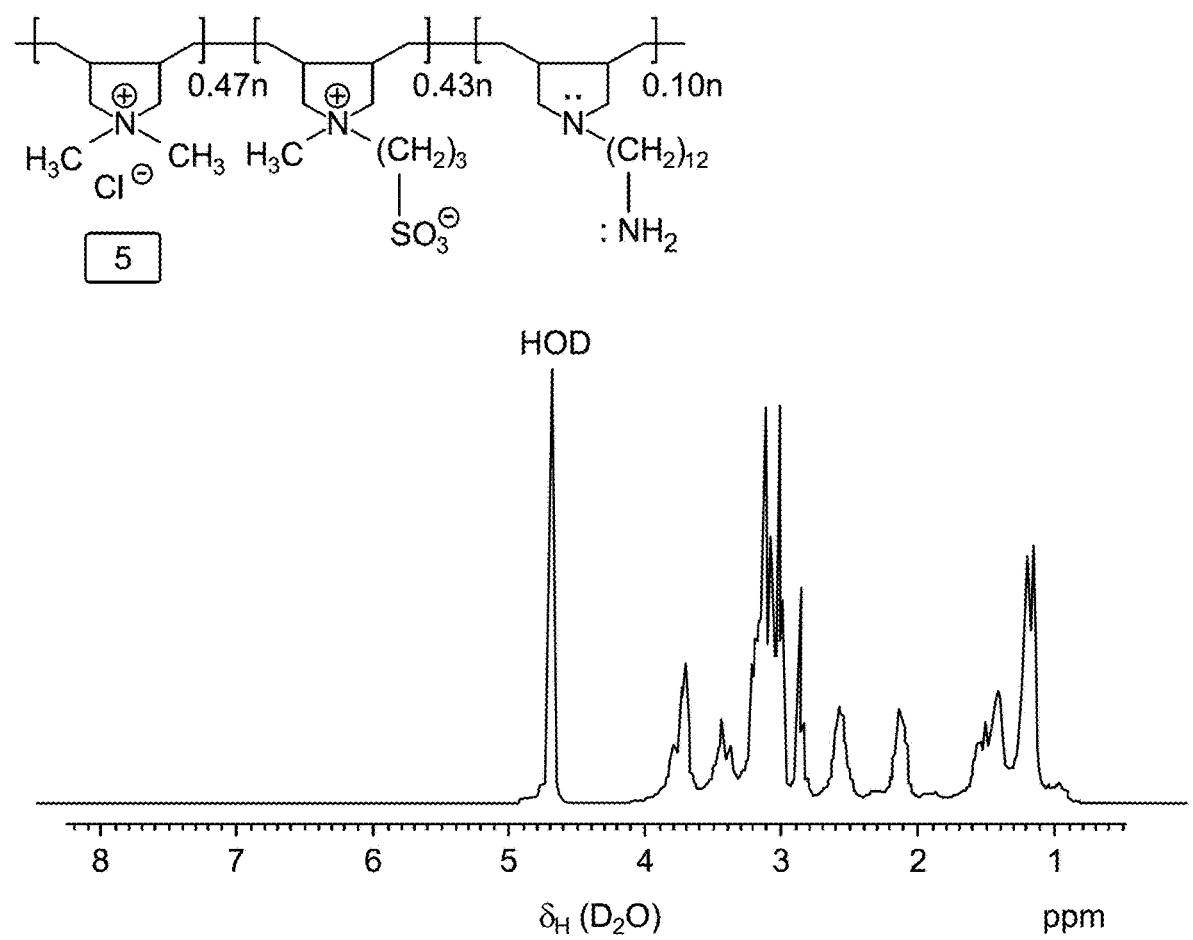
FIG. 2E illustrates the proton NMR spectrum of PDMD in $D_2O$, according to certain embodiments.
Figure 3A:
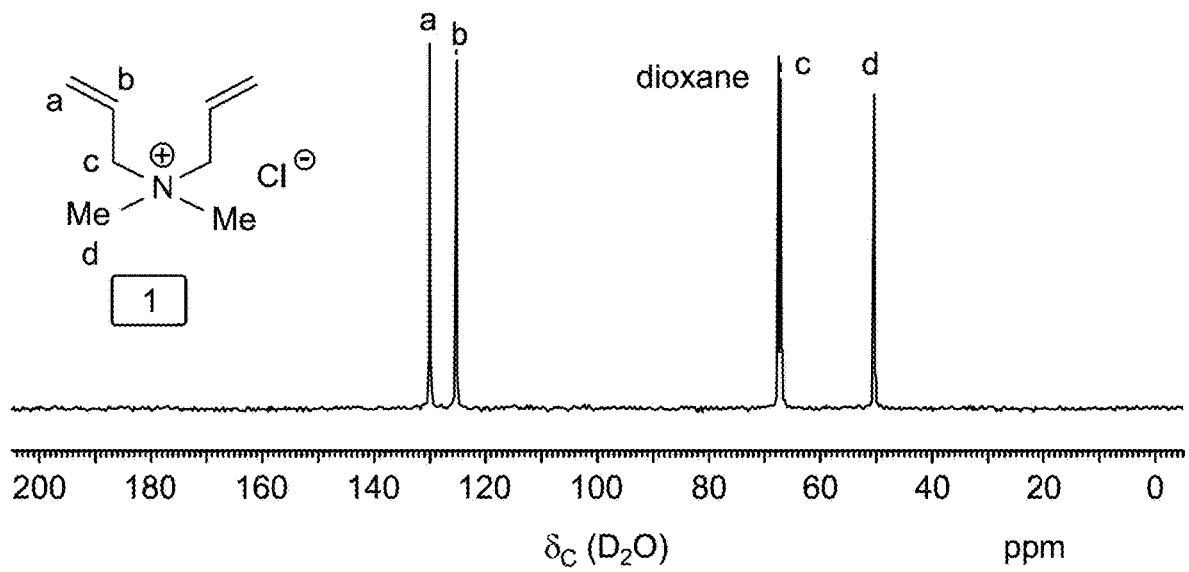
FIG. 3A illustrates the carbon NMR spectrum of DADMAC in $D_2O$, according to certain embodiments.
Figure 3B:
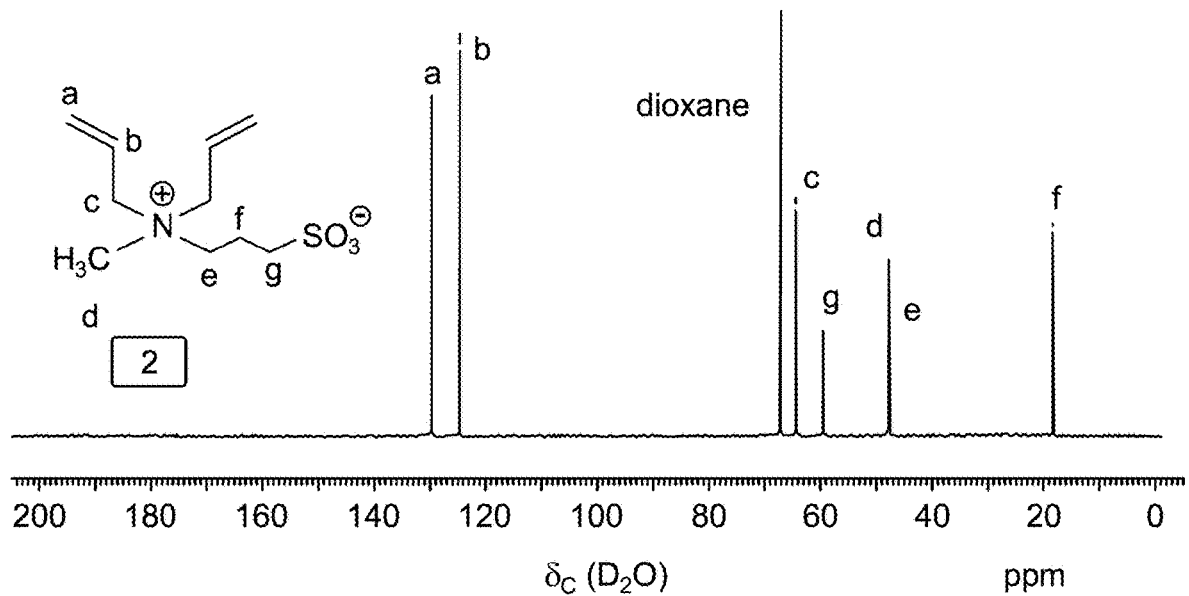
FIG. 3B illustrates the carbon NMR spectrum of DAMAPS in $D_2O$, according to certain embodiments.
Figure 3C:
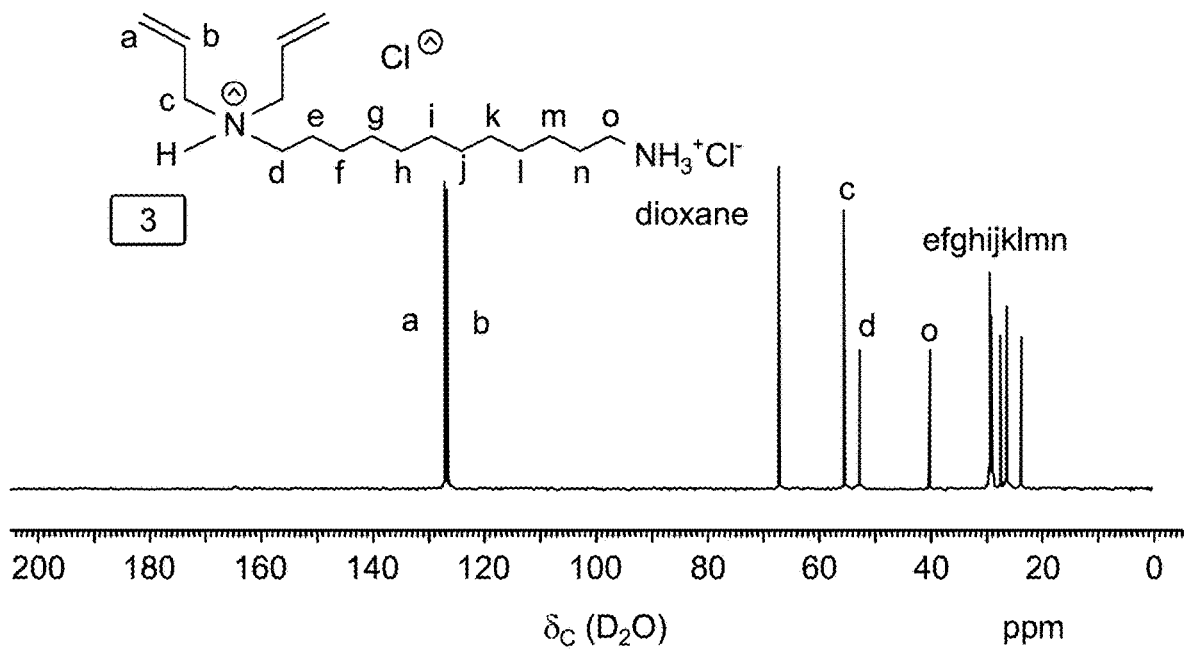
FIG. 3C illustrates the carbon NMR spectrum of DADAC in $D_2O$, according to certain embodiments.
Figure 3D:
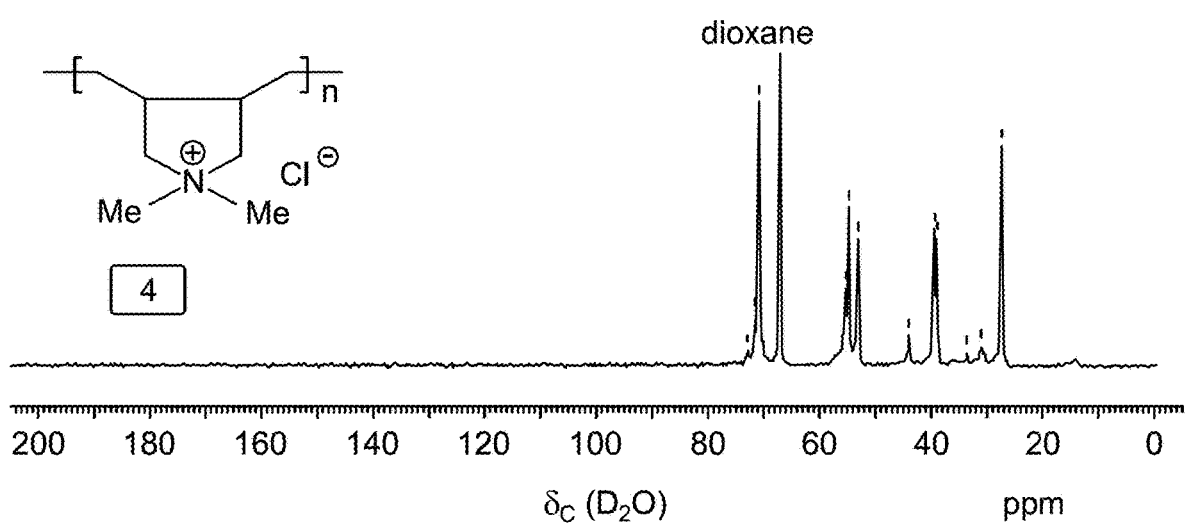
FIG. 3D illustrates the carbon NMR spectrum of PDADMAC in $D_2O$, according to certain embodiments.
Figure 3E:
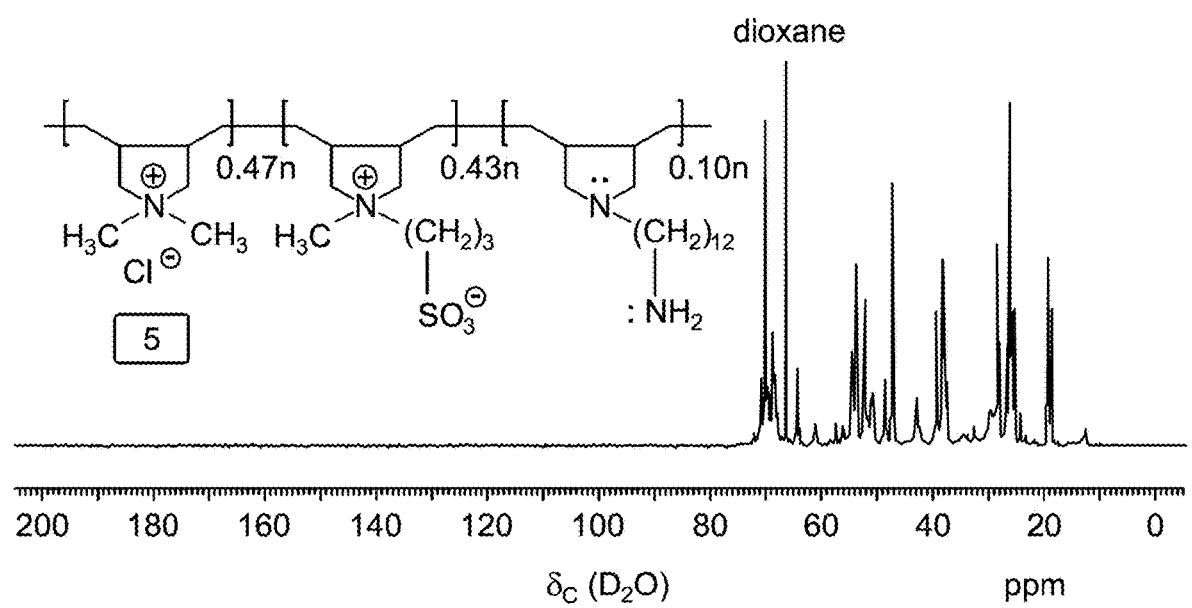
FIG. 3E illustrates the carbon NMR spectrum of PDMD in $D_2O$, according to certain embodiments.

The membrane designated DD-DAMAPS-2 also exhibited a crumpled morphology; however, a distinct structural network was observed in comparison to DD-DAMAPS-1. The surface of DD-DAMAPS-2 presented longer, more spaced thread-like structures forming an extended chain-like network. As the concentration of PDMD increased, a reduction in uniform polymer dispersion was observed, attributed to decreased cross-linking density within the polyamide layer. The elevated terpolymer content negatively impacted the degree of cross-linking between DETA and TMC, due to the structural nature of the terpolymer. The PDMD terpolymer contains multiple repeating units but only a single amine terminal capable of forming an amide linkage with TMC. The concentration of amine-functional terminals within the PDMD terpolymer was approximately 10%, as shown in FIG. 2B. As the content of PDMD increased, more amide linkages formed between the PDMD and TMC, reducing the availability of TMC for cross-linking with DETA. This reduction led to the formation of a polyamide active layer characterized by lower uniformity and increased porosity.

FIGS. 4A-4I illustrate the comparative SEM-based surface morphologies of the PsZ, DD-DAMAPS-1, and DD-DAMAPS-2 membranes at magnification scales of 50 m (a), 10 m (b), and 5 m (c), according to certain embodiments.

Elemental mapping analysis of the PsZ and DD-DAMAPS-1 membranes was conducted to obtain qualitative and quantitative data regarding elemental composition, as illustrated in FIGS. 5A-5E and FIGS. 6A-6E. The PsZ membrane, including a polyamide active layer formed via interfacial polymerization of diethylenetriamine (DETA) and Trimesoyl chloride (TMC) on a polysulfone (PS) support, exhibited elemental distribution with carbon at 75.40 wt. %, nitrogen at 2.56 wt. %, oxygen at 14.92 wt. %, and sulfur at 7.12 wt. %, as shown in FIGS. 5A-5E. The observed elemental composition aligned with theoretical values.

In the DD-DAMAPS-1 membrane, elemental mapping revealed carbon at 67.69 wt. %, nitrogen at 10.24 wt. %, oxygen at 15.80 wt. %, and sulfur at 6.28 wt. %, as shown in FIGS. 6A-6E. A reduction in the carbon content and a significant increase in nitrogen content were observed in comparison to the PsZ membrane. This increase in nitrogen content was attributed to the incorporation of poly-(DADMAC-co-DAMAPS-co-DADA) (PDMD), which contains three pendant groups in the polymer backbone bearing quaternary nitrogen atoms. The observed nitrogen increase served as confirmation of successful grafting of the PDMD into the polyamide active layer.

Figure 7A:
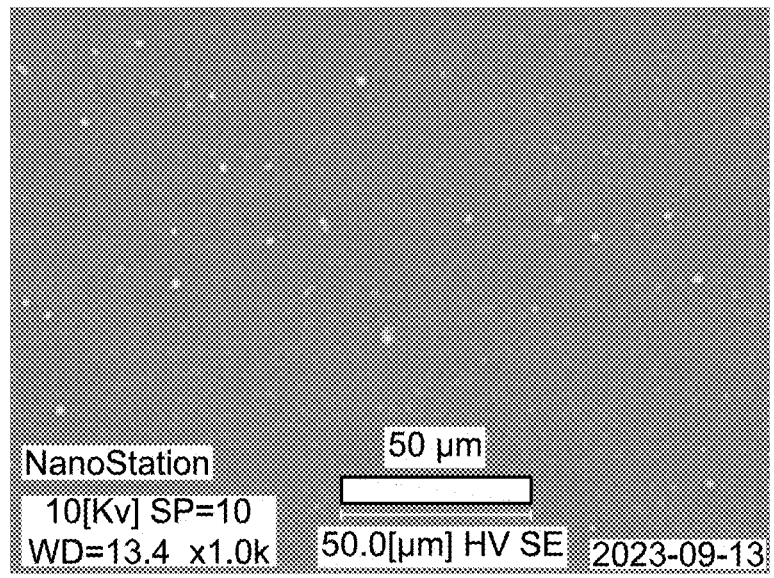
FIG. 7A illustrates a scanning electron microscopy (SEM) image of the top surface of the PsZ membrane at 50 μm magnification, according to certain embodiments.
Figure 7B:
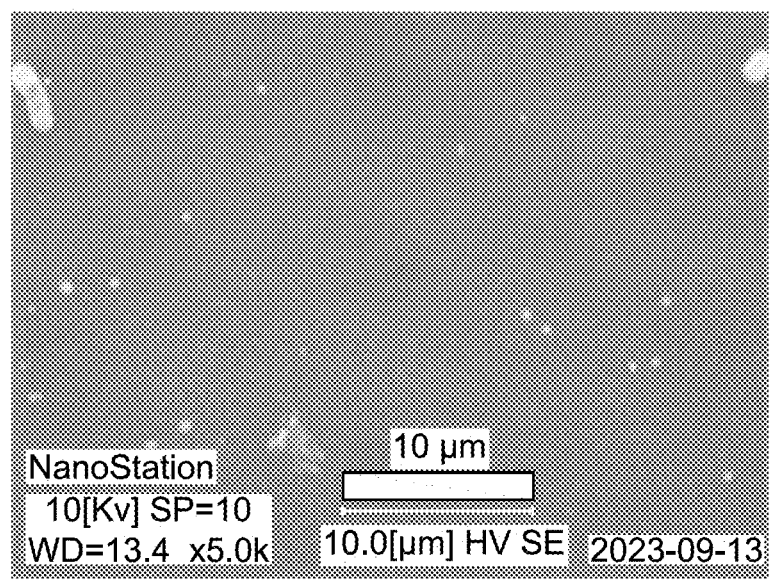
FIG. 7B illustrates the SEM image of the top surface of the PsZ membrane at 10 μm magnification, according to certain embodiments.
Figure 7C:
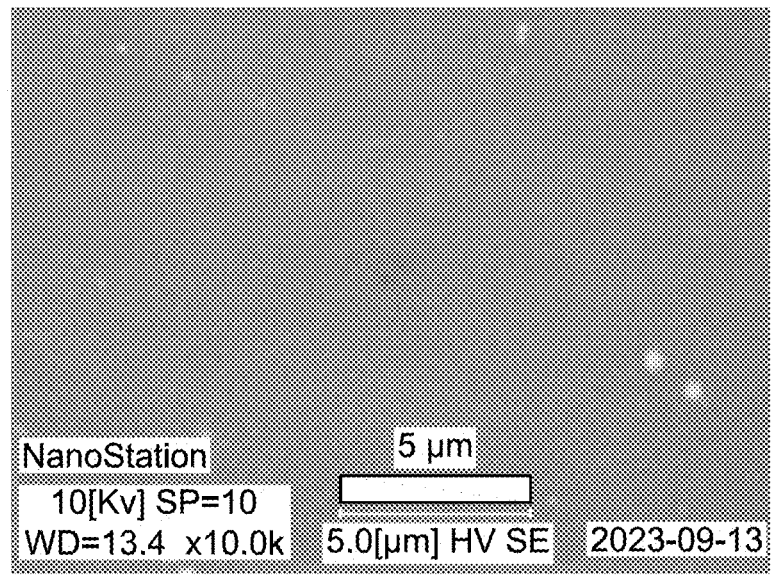
FIG. 7C illustrates the SEM image of the top surface of the PsZ membrane at 5 μm magnification, according to certain embodiments.
Figure 7D:
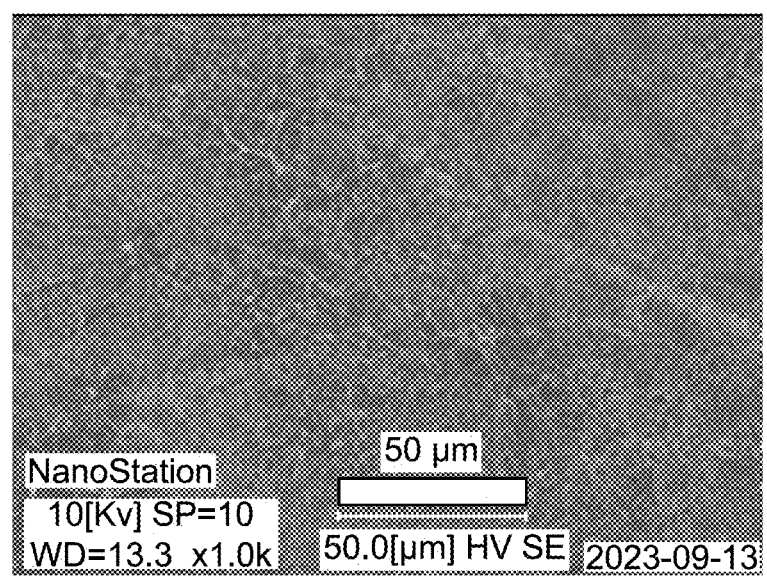
FIG. 7D illustrates the SEM image of the top surface of the DD-DAMAPS-1 membrane at 50 μm magnification, according to certain embodiments.
Figure 7E:
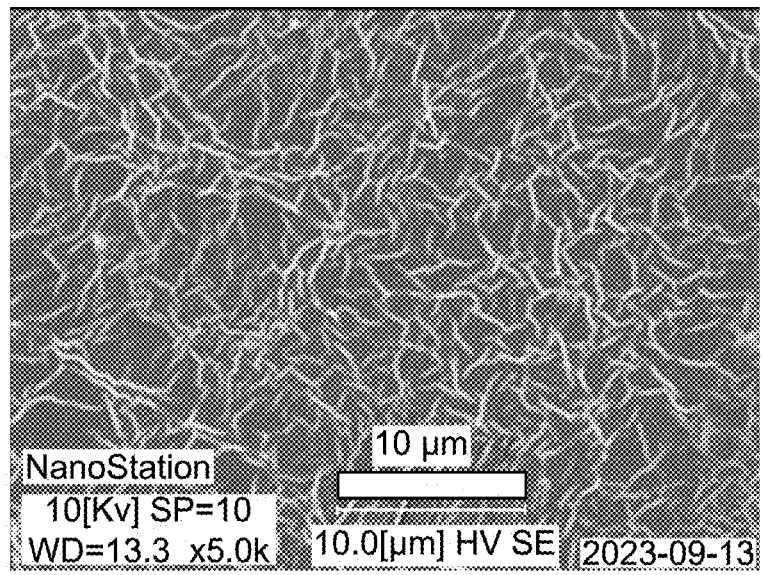
FIG. 7E illustrates the SEM image of the top surface of the DD-DAMAPS-1 membrane at 10 μm magnification, according to certain embodiments.
Figure 7F:
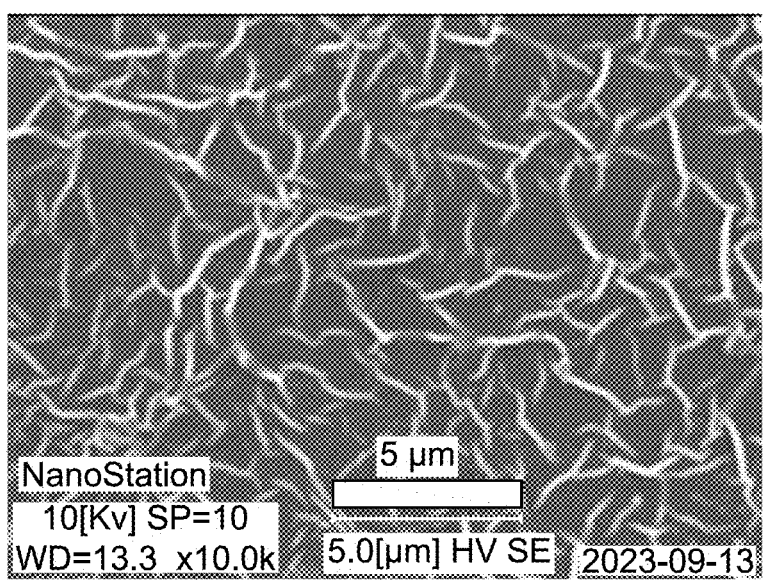
FIG. 7F illustrates the SEM image of the top surface of the DD-DAMAPS-1 membrane at 5 μm magnification, according to certain embodiments.
Figure 7G:
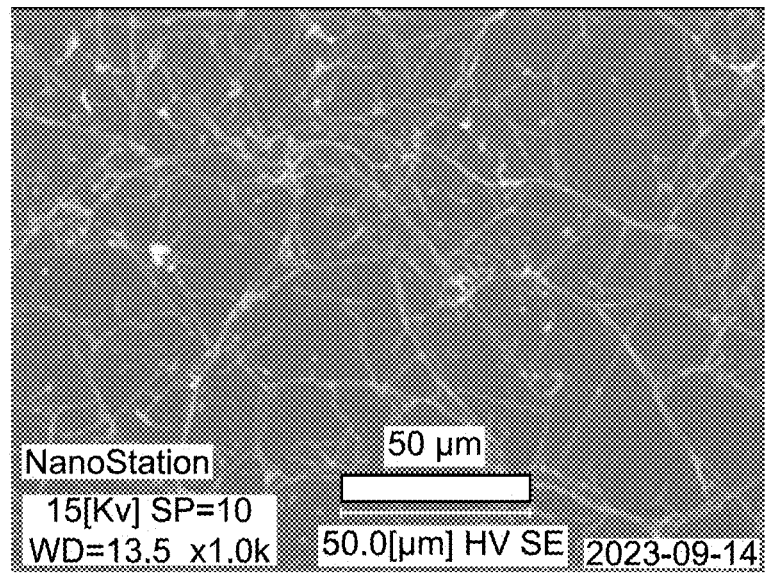
FIG. 7G illustrates the SEM image of the top surface of the DD-DAMAPS-2 membrane at 50 μm magnification, according to certain embodiments.
Figure 7H:
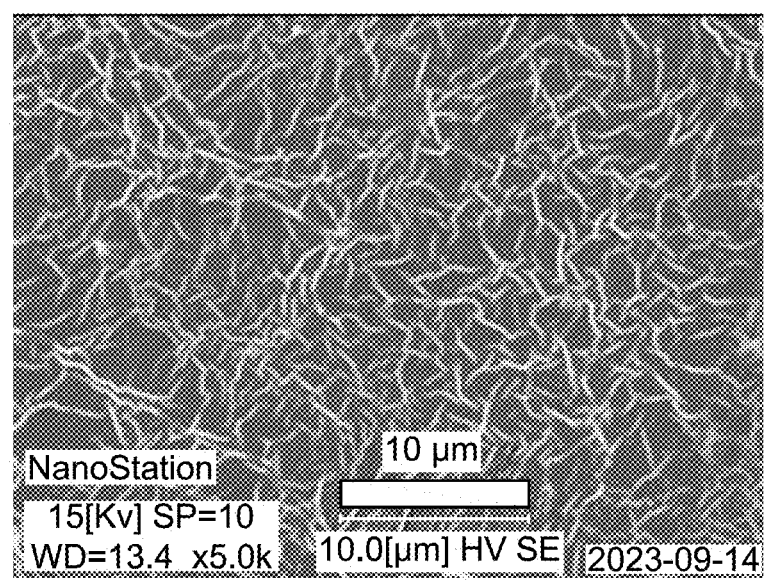
FIG. 7H illustrates the SEM image of the top surface of the DD-DAMAPS-2 membrane at 10 μm magnification, according to certain embodiments.
Figure 7I:
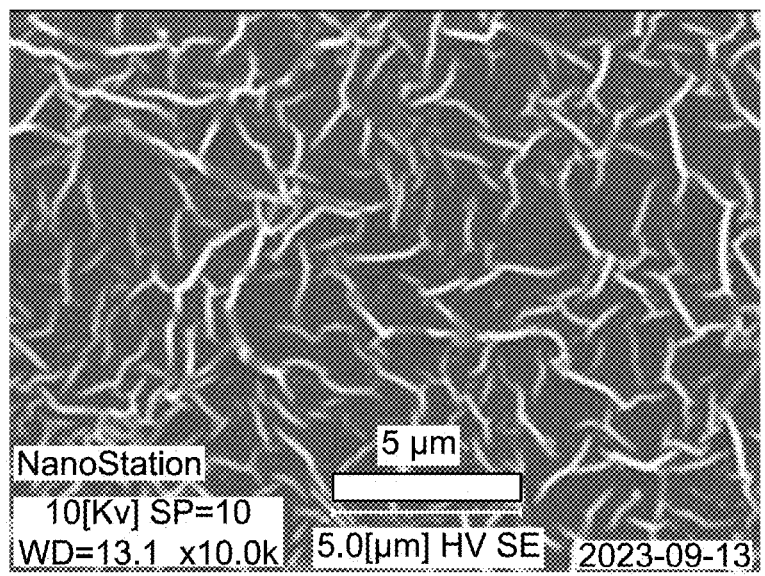
FIG. 7I illustrates the SEM image of the top surface of the DD-DAMAPS-2 membrane at 5 μm magnification, according to certain embodiments.
Figure 8A:
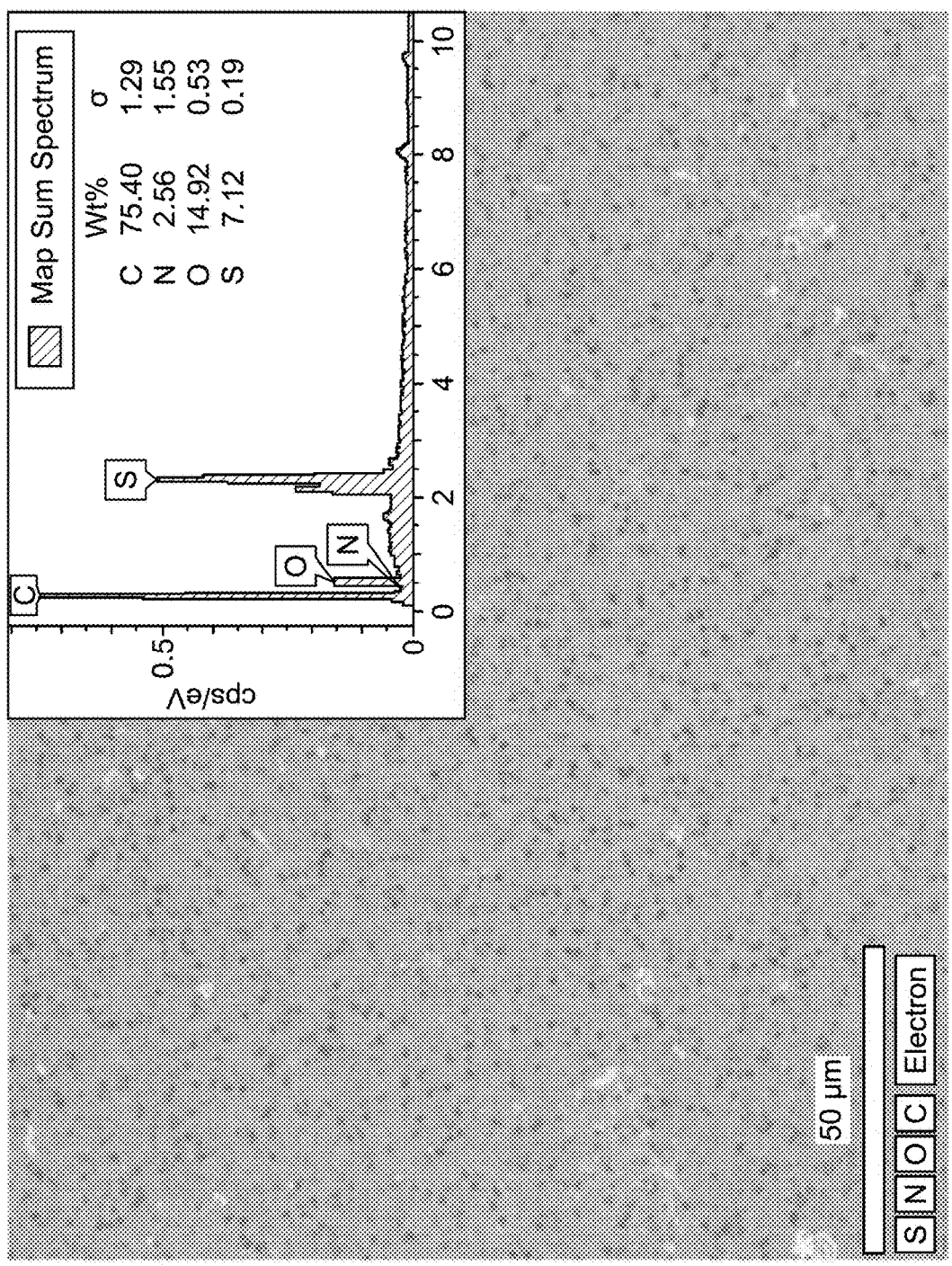
FIG. 8A illustrates the combined EDX spectrum and elemental mapping of the top surface of the PsZ membrane, according to certain embodiments.
Figure 8B:
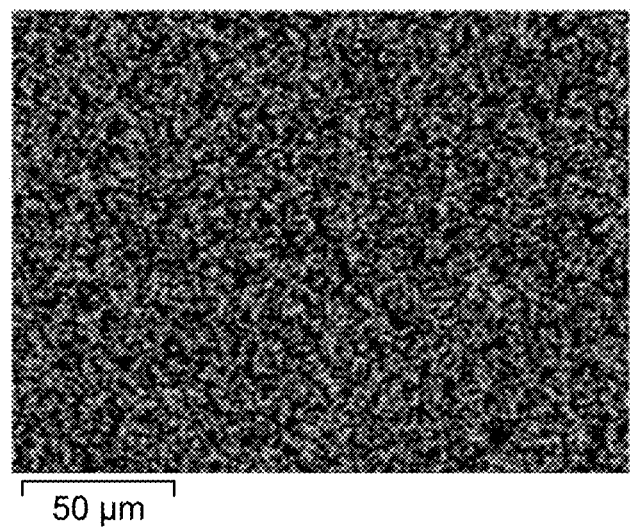
FIG. 8B illustrates the elemental mapping of the PsZ membrane depicting a presence of sulphur, according to certain embodiments.
Figure 8C:
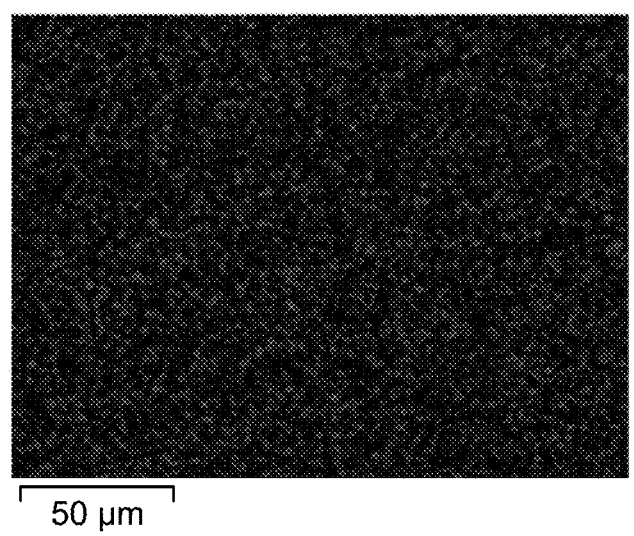
FIG. 8C illustrates the elemental mapping of the PsZ membrane depicting a presence of carbon, according to certain embodiments.
Figure 8D:
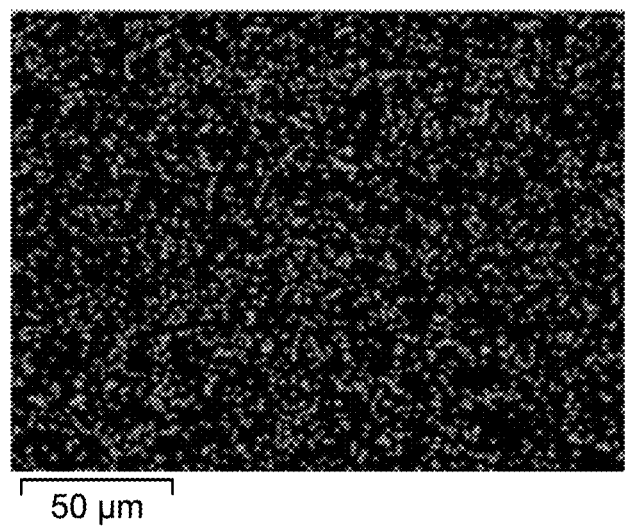
FIG. 8D illustrates the elemental mapping of the PsZ membrane depicting a presence of oxygen, according to certain embodiments.
Figure 8E:
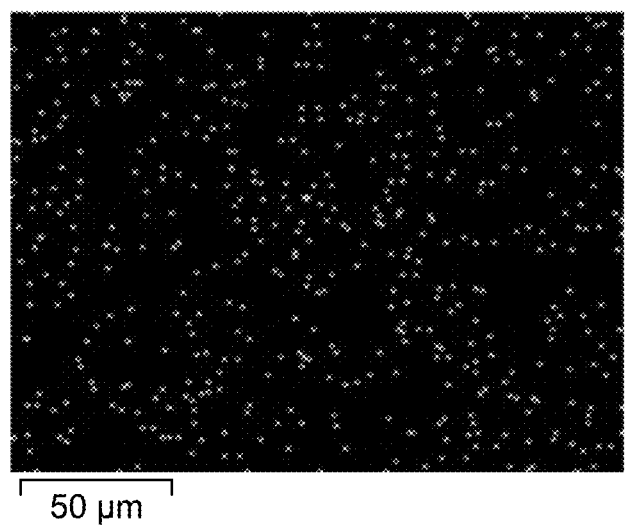
FIG. 8E illustrates the elemental mapping of the PsZ membrane depicting a presence of nitrogen, according to certain embodiments.
Figure 9A:
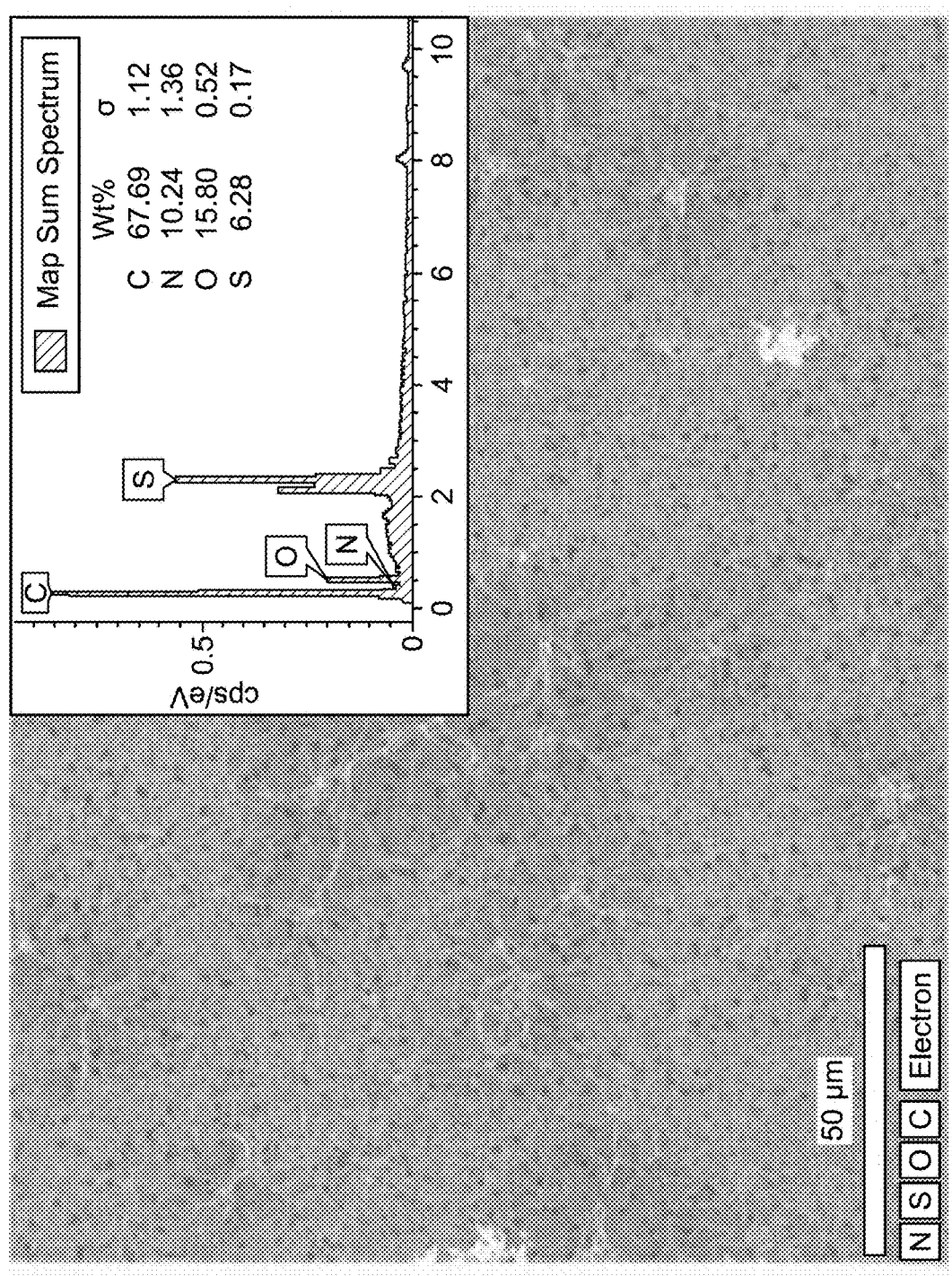
FIG. 9A illustrates the combined EDX spectrum and elemental mapping of the top surface of the DD-DAMAPS-1 membrane, according to certain embodiments.
Figure 9B:
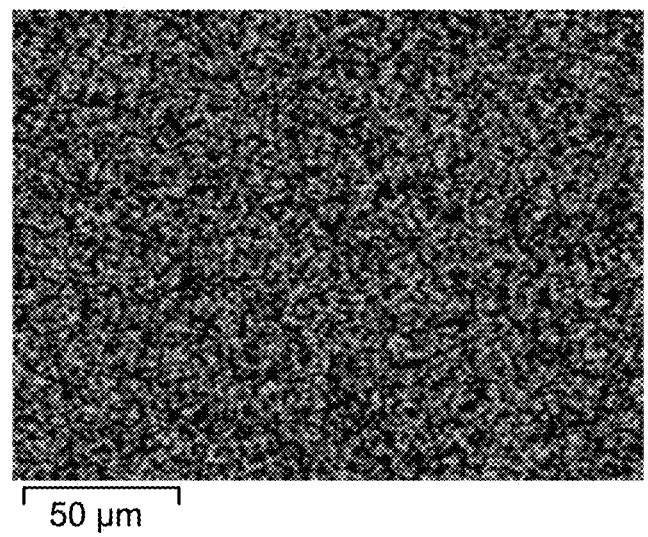
FIG. 9B illustrates the elemental mapping of the DD-DAMAPS-1 membrane depicting a presence of sulphur, according to certain embodiments.
Figure 9C:
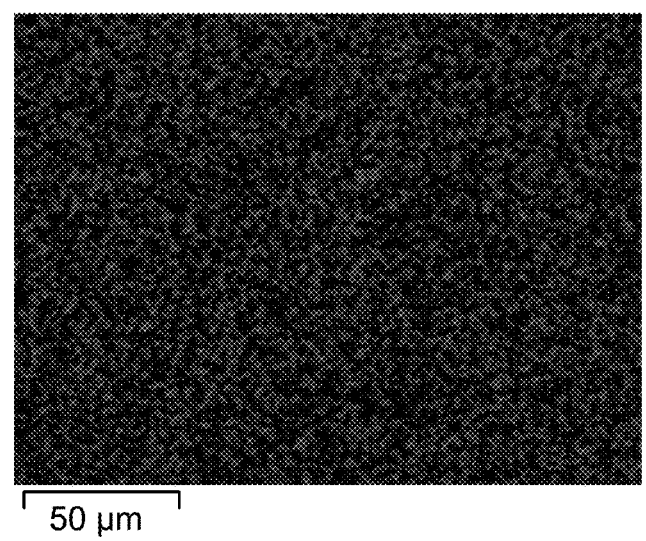
FIG. 9C illustrates the elemental mapping of the DD-DAMAPS-1 membrane depicting a presence of carbon, according to certain embodiments.
Figure 9D:
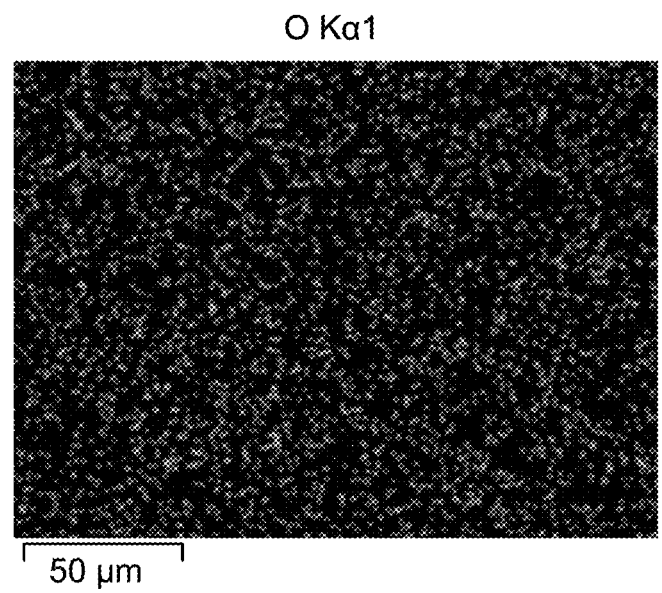
FIG. 9D illustrates the elemental mapping of the DD-DAMAPS-1 membrane depicting a presence of oxygen, according to certain embodiments.
Figure 9E:
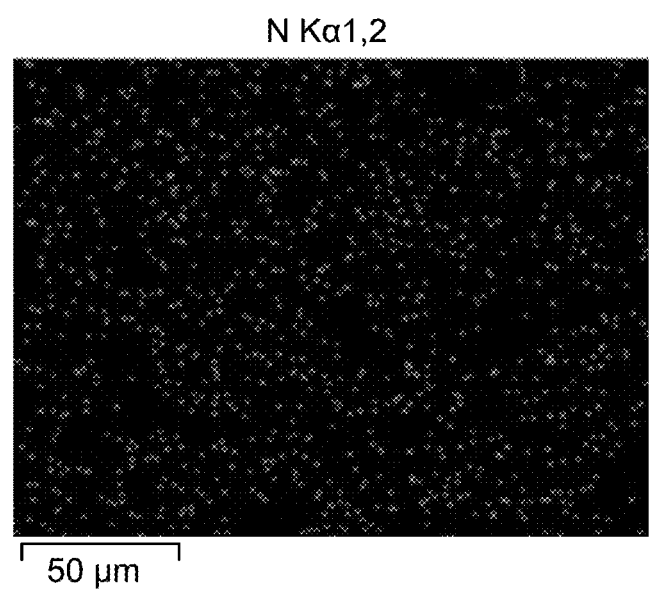
FIG. 9E illustrates the elemental mapping of the DD-DAMAPS-1 membrane depicting a presence of nitrogen, according to certain embodiments.

The minor increase in oxygen content in DD-DAMAPS-1 was attributed to the oxygen-containing sulfonate group in the zwitterionic DAMAPS monomer. In order to further characterize the membrane surface morphology and roughness, atomic force microscopy (AFM) was employed. The AFM analysis corroborated the findings from scanning electron microscopy (SEM) and revealed distinct topographical differences among the PsZ, DD-DAMAPS-1, and DD-DAMAPS-2 membranes, as shown in FIGS. 7A-7C.

Figure 10A:
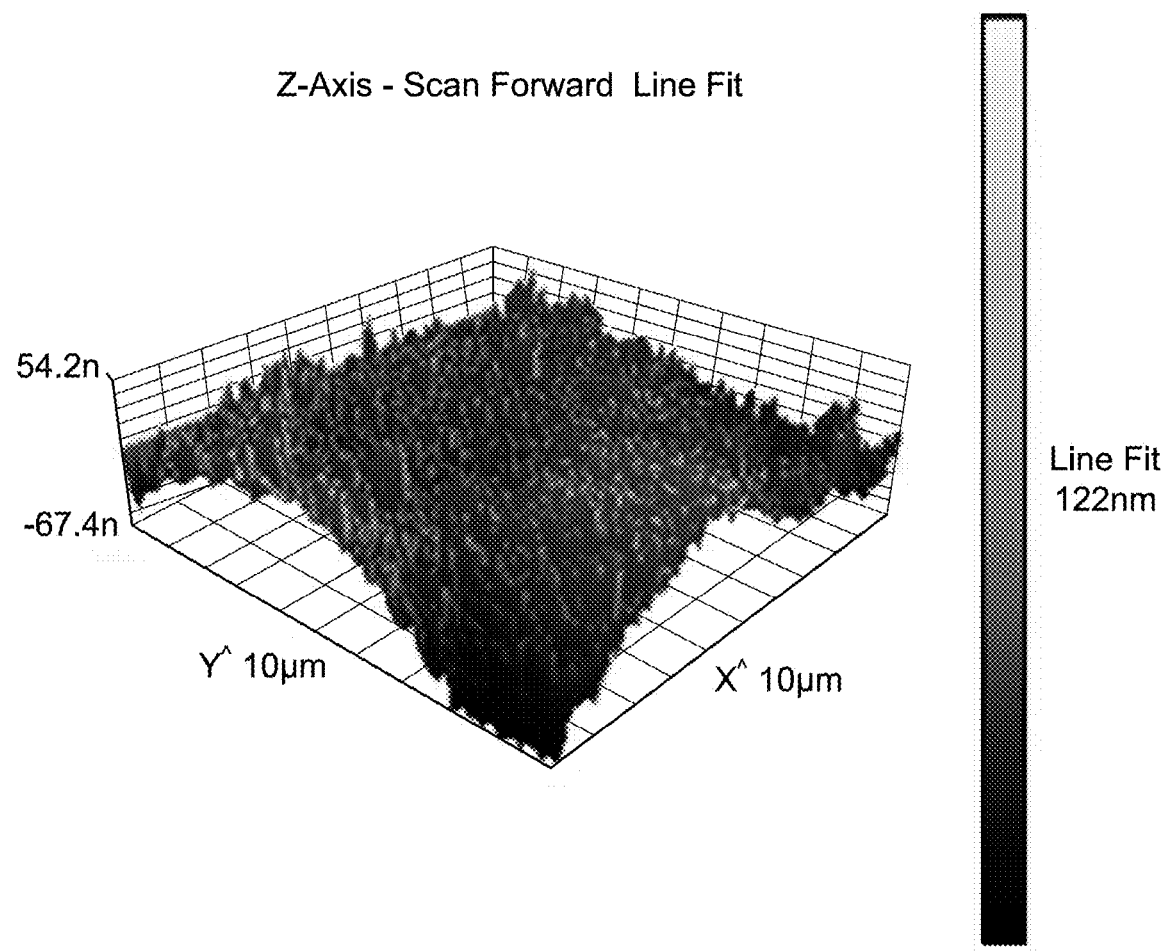
FIG. 10A illustrates a three-dimensional atomic force microscopy (3D AFM) surface morphology of the PsZ membrane, according to certain embodiments.
Figure 10B:
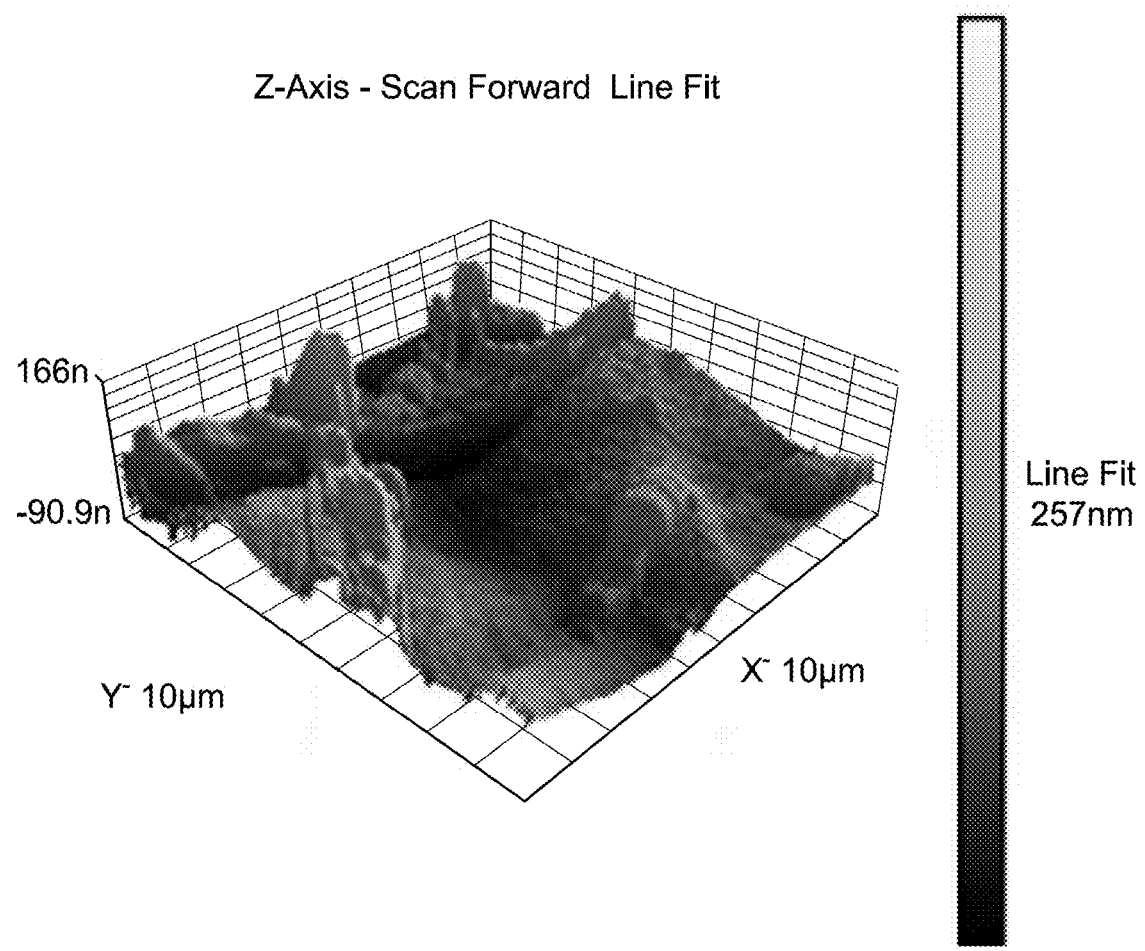
FIG. 10B illustrates the 3D AFM surface morphology of the DD-DAMAPS-1 membrane, according to certain embodiments.
Figure 10C:
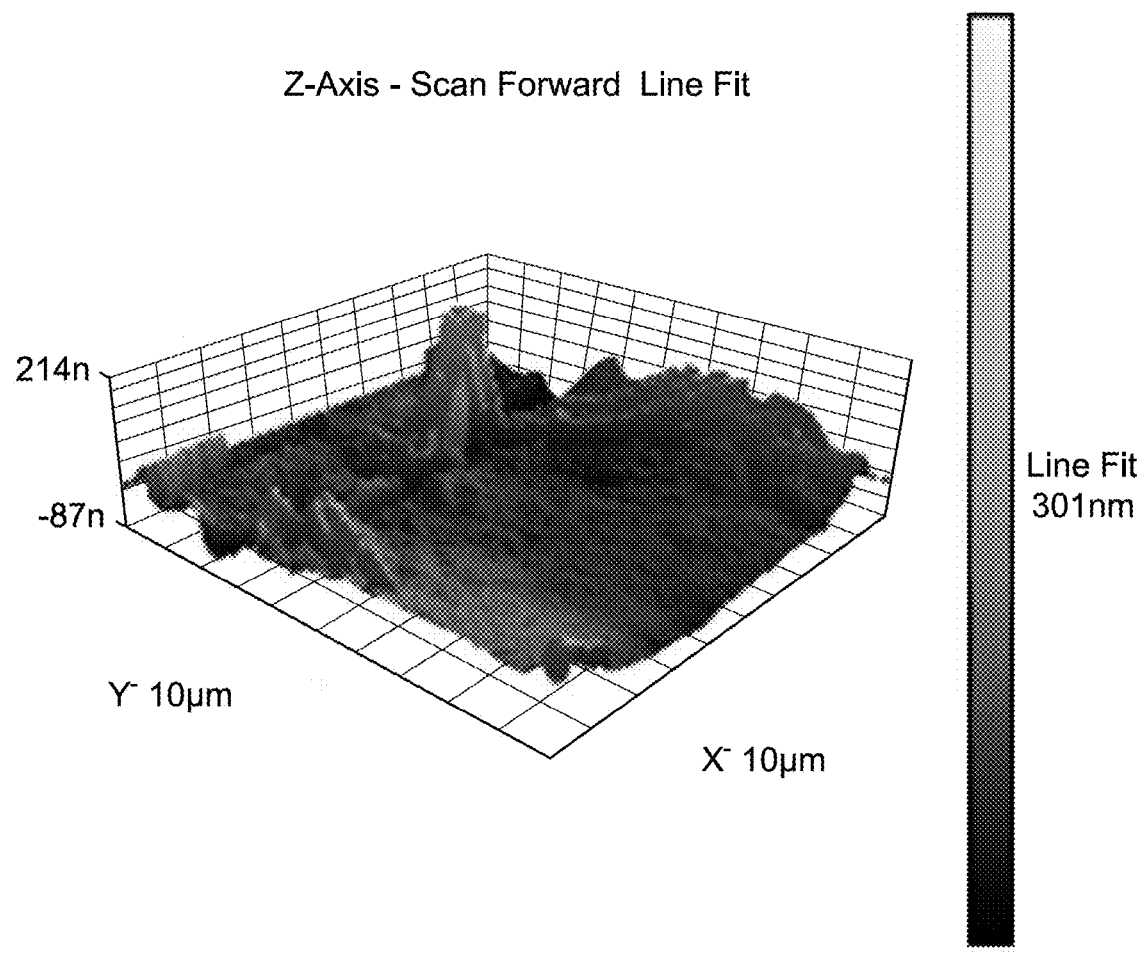
FIG. 10C illustrates the 3D AFM surface morphology of the DD-DAMAPS-2 membrane, according to certain embodiments.
Figure 11A:
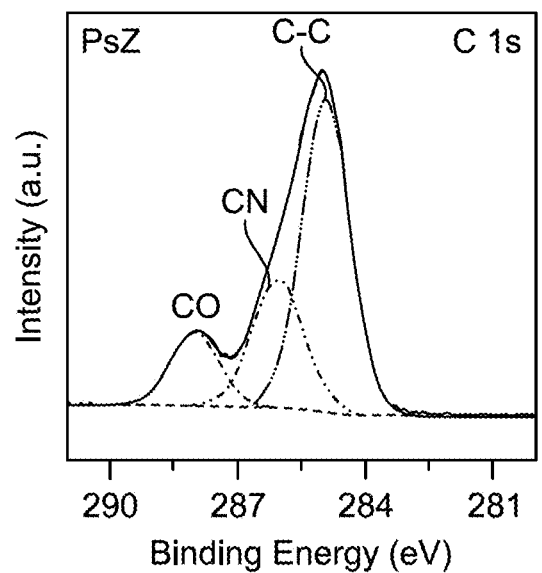
FIG. 11A illustrates a high-resolution X-ray photoelectron spectroscopy (XPS) spectrum of the C is level of the PsZ membrane, according to certain embodiments.
Figure 11B:
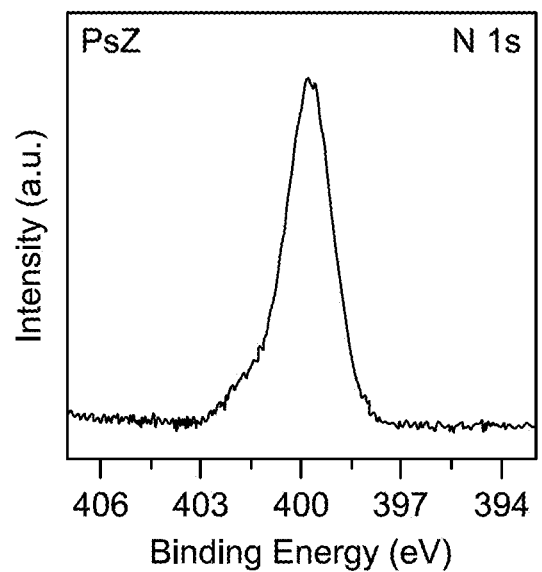
FIG. 11B illustrates the high-resolution XPS spectrum of the N is level of the PsZ membrane, according to certain embodiments.
Figure 11C:
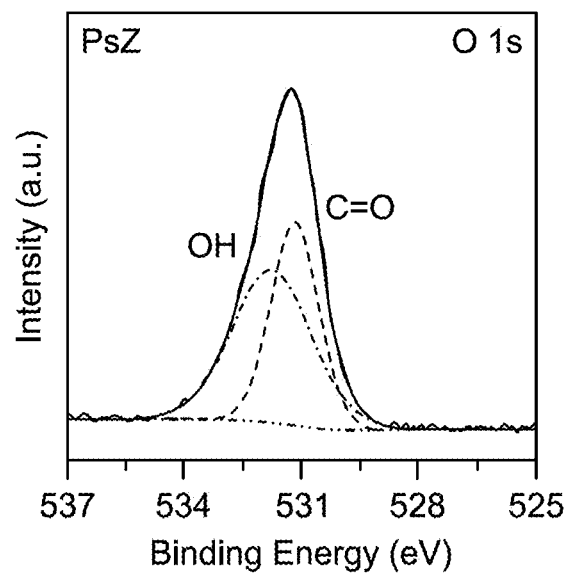
FIG. 11C illustrates the high-resolution XPS spectrum of the O is level of the PsZ membrane, according to certain embodiments.
Figure 11D:
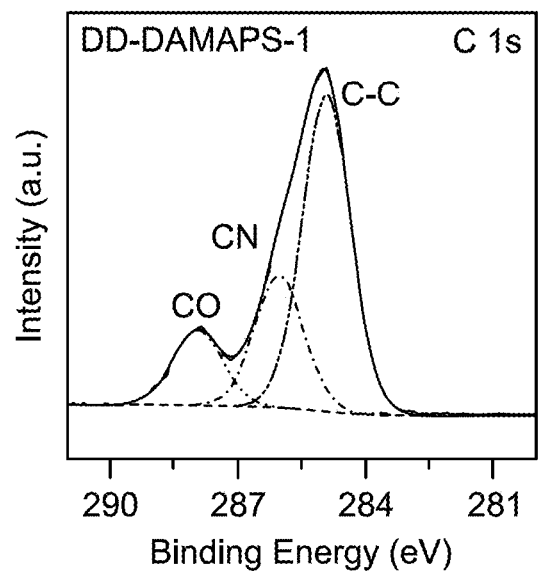
FIG. 11D illustrates the high-resolution XPS spectrum of the C is level of the DD-DAMAPS-1 membrane, according to certain embodiments.
Figure 11E:
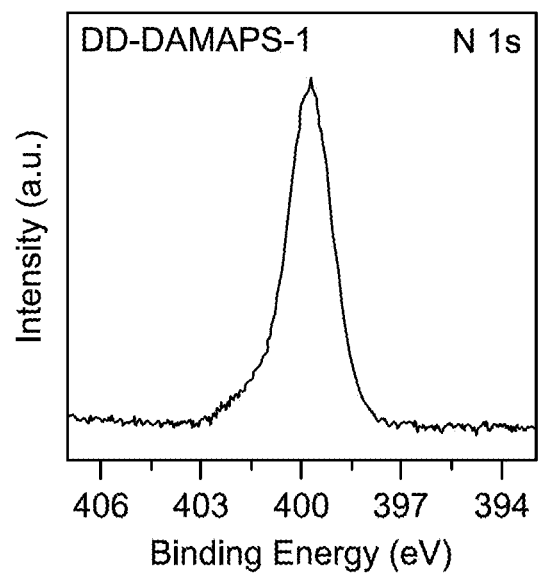
FIG. 11E illustrates the high-resolution XPS spectrum of the N is level of the DD-DAMAPS-1 membrane, according to certain embodiments.
Figure 11F:
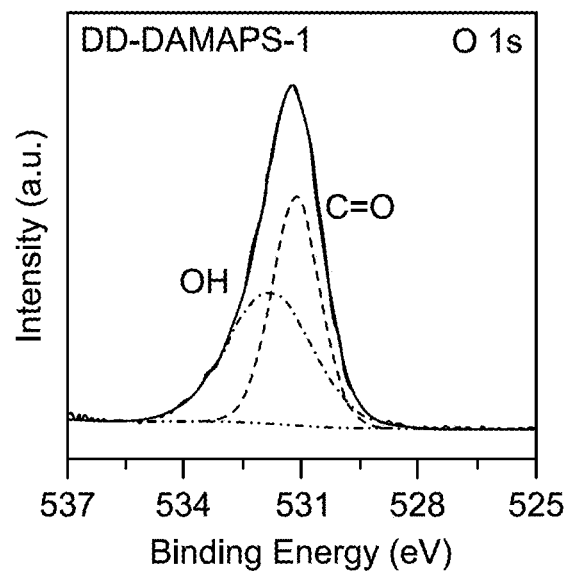
FIG. 11F illustrates the high-resolution XPS spectrum of the O is level of the DD-DAMAPS-1 membrane, according to certain embodiments.
Figure 11G:
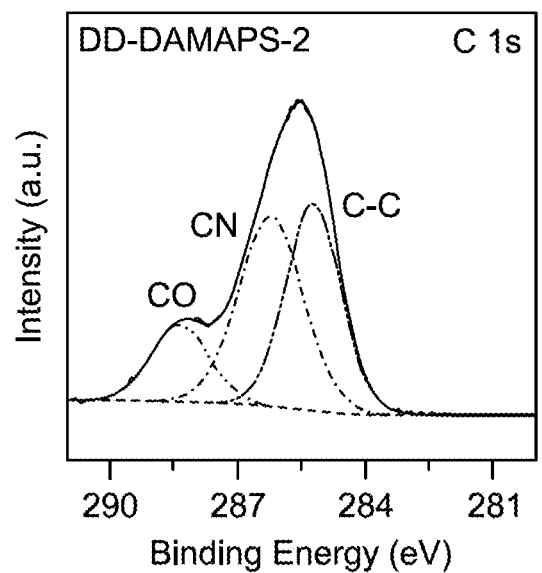
FIG. 11G illustrates the high-resolution XPS spectrum of the C is level of the DD-DAMAPS-2 membrane, according to certain embodiments.
Figure 11H:
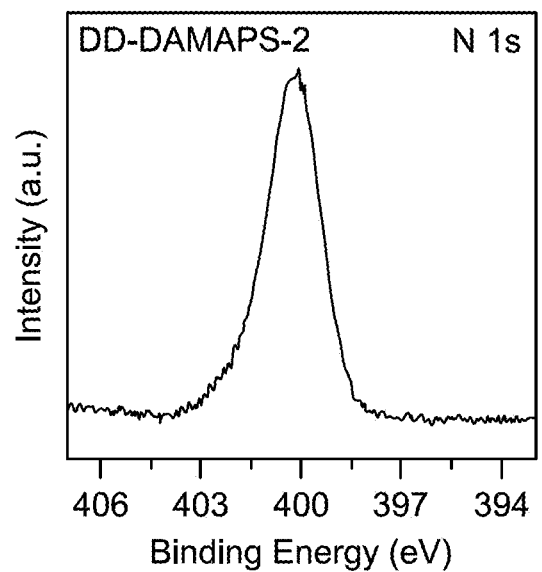
FIG. 11H illustrates the high-resolution XPS spectrum of the N is level of the DD-DAMAPS-2 membrane, according to certain embodiments.
Figure 11I:
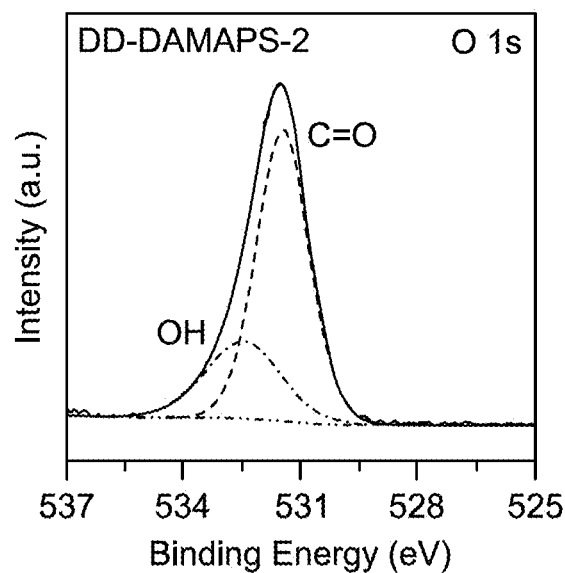
FIG. 11I illustrates the high-resolution XPS spectrum of the O is level of the DD-DAMAPS-2 membrane, according to certain embodiments.
Figure 11J:
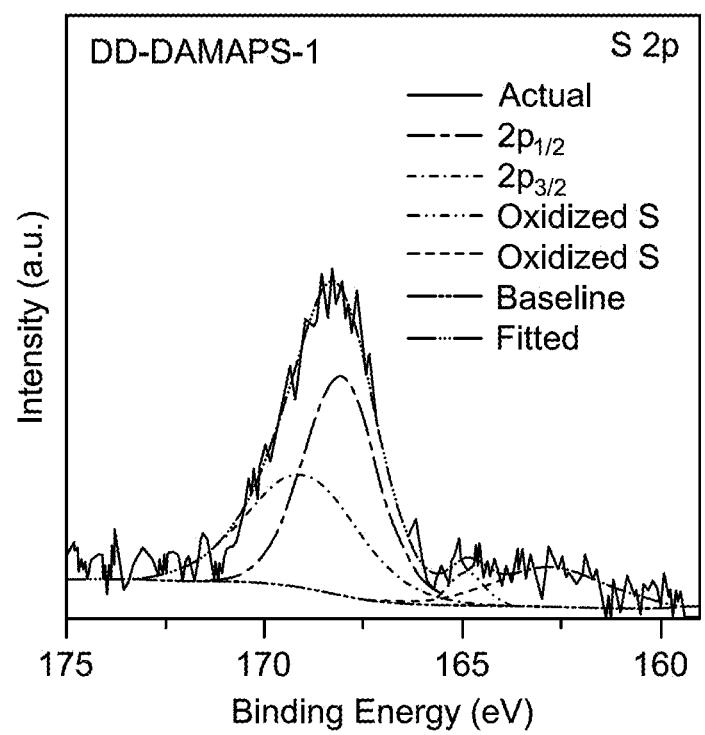
FIG. 11J illustrates the high-resolution XPS spectrum of the S 2p level of the DD-DAMAPS-1 membrane, according to certain embodiments.
Figure 11K:
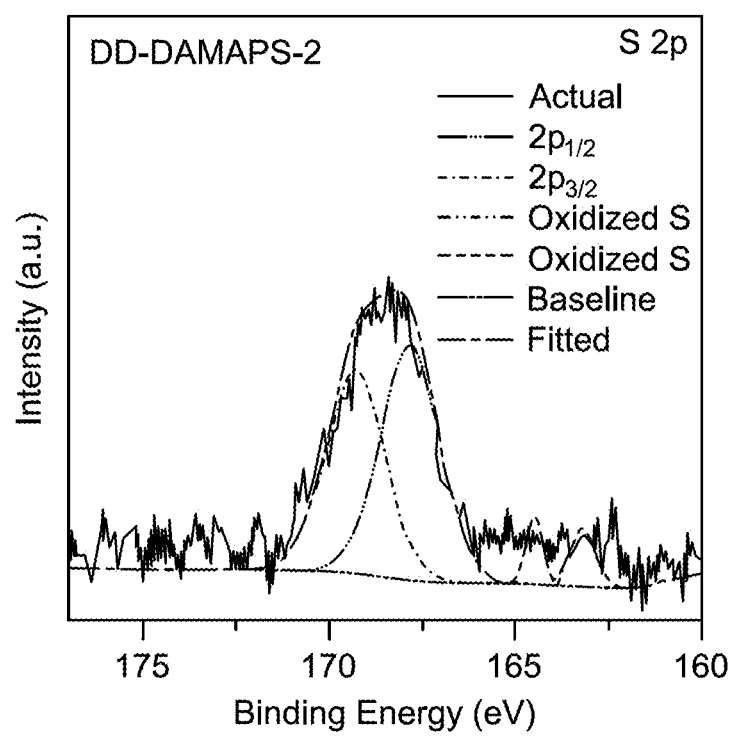
FIG. 11K illustrates the high-resolution XPS spectrum of the S 2p level of the DD-DAMAPS-2 membrane, according to certain embodiments.
Figure 12A:
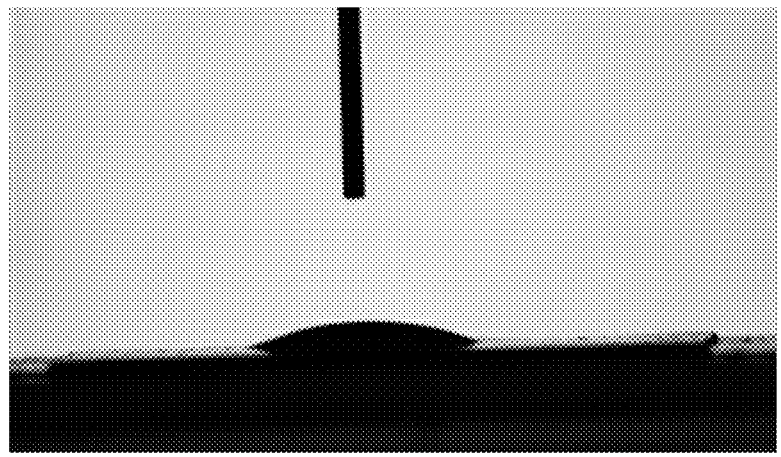
FIG. 12A illustrates a water contact angle measured on a surface of the PsZ membrane, according to certain embodiments.
Figure 12B:
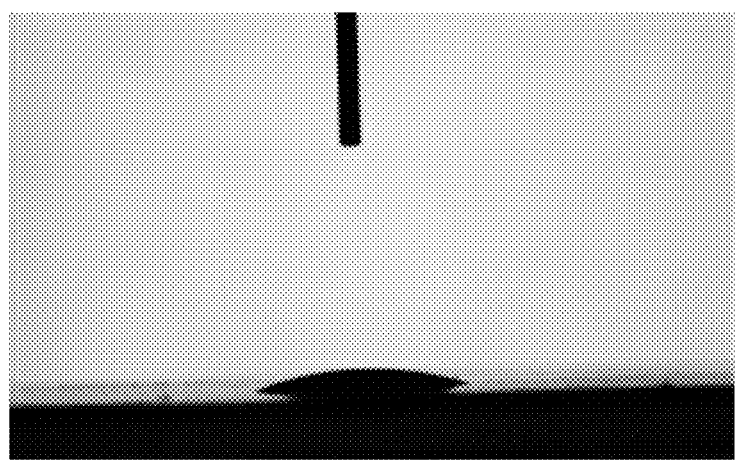
FIG. 12B illustrates a water contact angle measured on a surface of the DD-DAMAPS-1 membrane, according to certain embodiments.
Figure 12C:
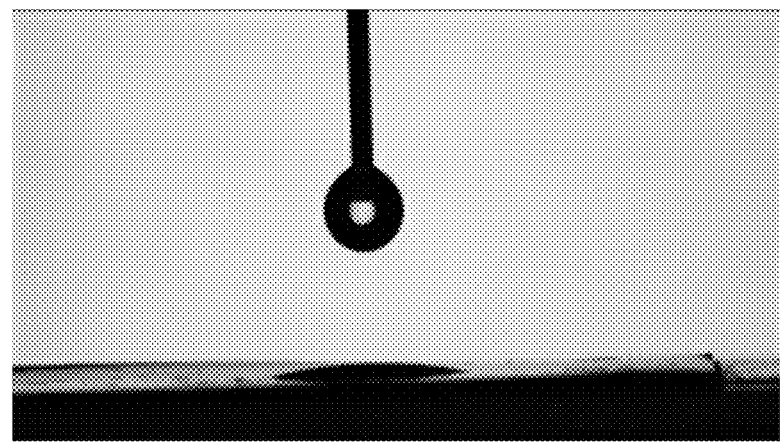
FIG. 12C illustrates a water contact angle measured on a surface of the DD-DAMAPS-2 membrane, according to certain embodiments.
Figure 12D:
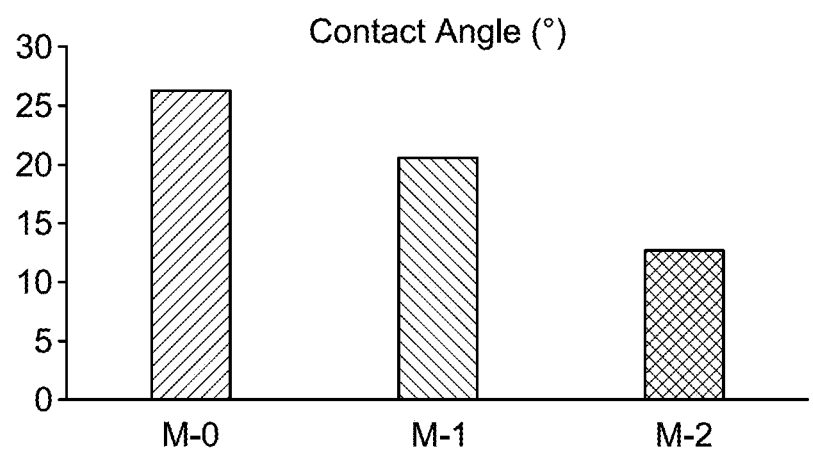
FIG. 12D illustrates a comparative plot of the water contact angles of the PsZ, DD-DAMAPS-1, and DD-DAMAPS-2 membranes, according to certain embodiments.

The surface roughness of the membranes was found to be proportional to the concentration of the grafted PDMD and the degree of cross-linking in the polyamide layer. The PsZ membrane exhibited a smooth surface, consistent with SEM observations, and an average surface roughness of 13.3 nm, as indicated in FIG. 10A. In contrast, the DD-DAMAPS-1 membrane demonstrated significantly enhanced surface roughness, approximately 3.3 times higher than that of PsZ, attributed to the crumpled morphology resulting from polymer grafting. The average surface roughness of DD-DAMAPS-1 was measured at 30.4 nm.

The DD-DAMAPS-2 membrane exhibited a slightly reduced surface roughness of 26.6 nm, likely due to the formation of a less crumpled and more porous polyamide layer. The increased polymer concentration was found to reduce the cross-linking efficiency of TMC with DETA, resulting in altered membrane morphology. The AFM three-dimensional imaging revealed that the modified membrane surfaces presented dispersed aggregates of variable height, as depicted in FIGS. 6B and 6C. The incorporation of PDMD into the polyamide active layer induced surface roughening, consistent with previously reported findings [J. Wang, et al., Colloids Surf. A Physicochem. Eng. Asp. 2006, 273, 63, incorporated herein by reference in its entirety]. The AFM data further demonstrated that the grafted polymer appeared as discrete island-like formations on the membrane surface. The cross-section of the PsZ, DD-DAMAPS-1, and DD-DAMAPS-2 membranes. The cross-sectional view displays the different regions of the membranes. The polyamide active layer for all three membranes can be seen, which appears as a dense layer on the top. Below the top layer, a porous layer is identified; the porous layer has a finger-like structure and further includes small voids that gradually convert into larger voids as going down to the bottom. The finger-like projections are created during the phase inversion process [G. D. Vilakati, et al., J. Memb. Sci. 2014, 469, 216, incorporated herein by reference in its entirety].

The X-ray photoelectron spectroscopy (XPS) spectra of the PsZ, DD-DAMAPS-1, and DD-DAMAPS-2 membranes are shown in FIGS. 8A-8K. A detailed deconvolution of elemental binding energies was conducted for each membrane composition. The C is spectrum for each membrane exhibited three distinct peaks at approximately 284.90 eV, 286.20 eV, and 288.10 eV, corresponding to C—C, C—N, and C=O bonds, respectively. The N is spectrum demonstrated a peak at approximately 399.77 eV, attributed to the presence of the N—C bond within the membrane matrix. The O is spectrum exhibited two peaks at 531.15 eV and 532.42 eV, assigned to the C=O and O=C—OH functionalities, respectively. The O=C—OH peak was interpreted as arising from the hydrolysis of residual acid chloride groups derived from trimesoyl chloride during the interfacial polymerization process.

Additional sulfur peaks were detected exclusively in the DD-DAMAPS-1 and DD-DAMAPS-2 membranes, attributed to the sulfonate functionalities originating from the grafted poly-(DADMAC-co-DAMAPS-co-DADA) (PDMD) terpolymer. The deconvolution of the S 2p region revealed four peaks centered at approximately 163.00 eV, 164.49 eV, 167.82 eV, and 169.16 eV. The initial two peaks at 163.00 eV and 164.49 eV were minor and assigned to oxidized sulfur species. The subsequent peaks at 167.82 eV and 169.16 eV were attributed to the S $2p_{3/2}$ and S $2p_{1/2}$ spin-orbit components of the sulfonate group (C—$SO_3^-$), respectively.

SEM and elemental analysis confirmed that the surface morphology and elemental composition of the polyamide active layer were significantly altered following the grafting of the poly-(DADMAC-co-DAMAPS-co-DADA) (PDMD) terpolymer. The functional performance of nanofiltration membranes is dependent on the physicochemical characteristics of the polyamide active layer, among which surface wettability constitutes a key parameter influencing permeability and antifouling efficiency.

Surface wettability of the fabricated membranes was evaluated through contact angle measurements as shown in FIGS. 9A-9D. The measured water contact angles were 26.6°±0.5° for PsZ, 19.9°±0.8° for DD-DAMAPS-1, and 13.8°±1 for DD-DAMAPS-2 membranes. A progressive reduction in water contact angle was observed from PsZ to the PDMD-incorporated membranes. The poly-(DADMAC-co-DAMAPS-co-DADA) polymer includes quaternary ammonium and sulfonate functionalities, both of which exhibit strong water affinity, thereby contributing to lower water contact angles for the DD-DAMAPS-1 and DD-DAMAPS-2 membranes. A reduction of approximately 25% in the contact angle was recorded for DD-DAMAPS-1, and a reduction of approximately 48% was recorded for DD-DAMAPS-2, in comparison to PsZ. The increased hydrophilicity is attributed to the cationic backbone and regularly branched sulfobetaine groups present in the polymer structure. The enhanced surface wettability contributed to increased water flux and conferred superior antifouling properties by facilitating the formation of a stable hydration layer on the membrane surface. The hydration layer generated by the hydrophilic polymeric structure functions as a barrier to the adsorption of organic solutes and microbial agents.

Figure 13:
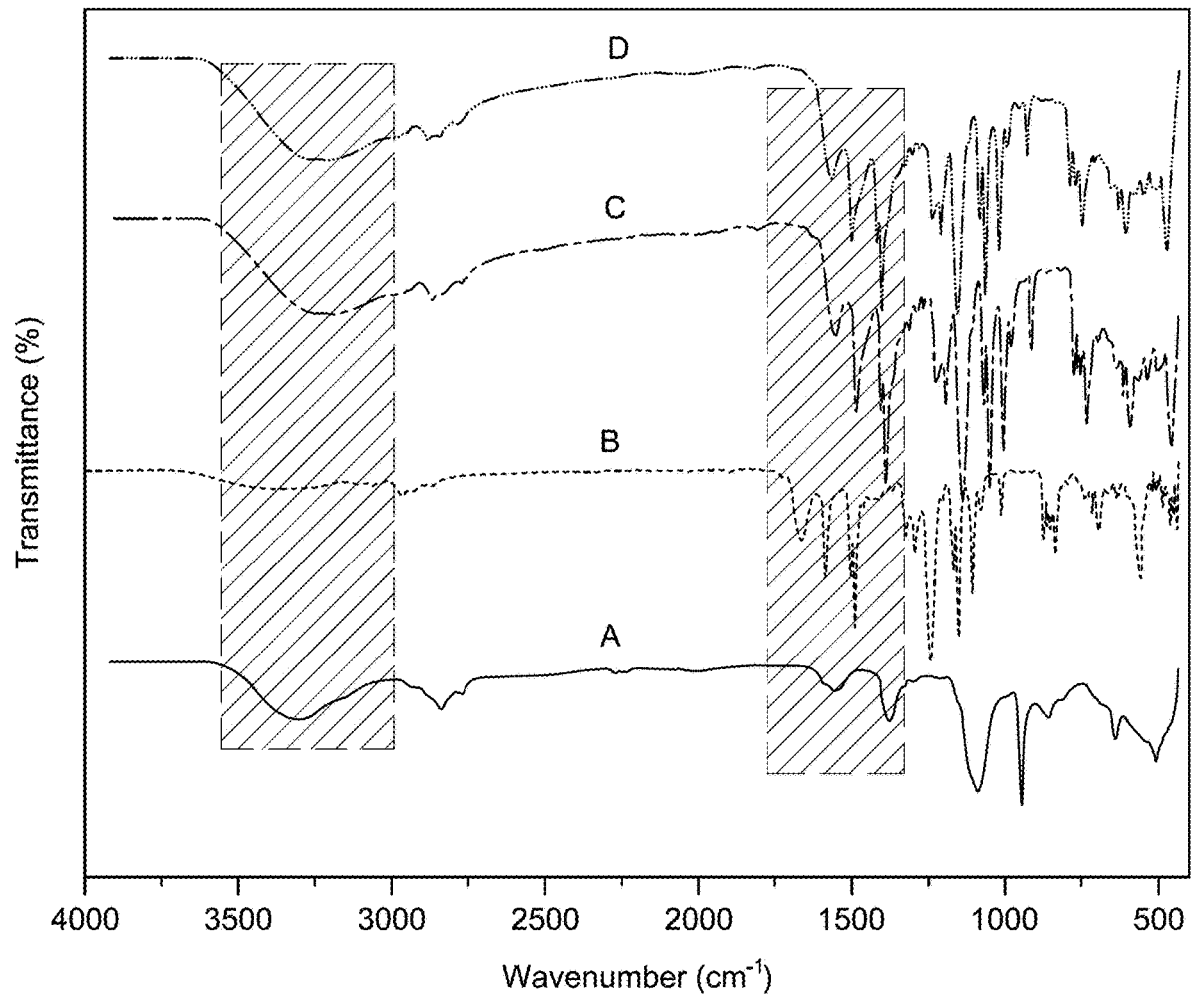
FIG. 13 illustrates a comparative Fourier transform infrared (FTIR) spectral analysis of PDMD, PsZ, DD-DAMAPS-1, and DD-DAMAPS-2, according to certain embodiments.

Fourier transform infrared (FTIR) spectra provided spectroscopic insights regarding the functional group distribution on the surface of the PsZ membrane and the poly-(DADMAC-co-DAMAPS-co-DADA) (PDMD) grafted membranes, as illustrated in FIG. 13. The active layer of the PsZ membrane, synthesized via interfacial polymerization between diethylenetriamine (DETA) and trimesoyl chloride (TMC), displayed characteristic absorption bands confirming the successful formation of amide linkages. A prominent N—H stretching vibration was observed at approximately 3300 $cm^{-1}$ [M. J. Machodi, et al., Scientific Reports 2019 9:1 2019, 9, 1, incorporated herein by reference in its entirety], and the amide carbonyl (C=O) stretching vibration corresponding to amide linkages appeared at 1665 $cm^{-1}$ [V. Freger, et al., J. Memb. Sci. 2002, 209, 283, incorporated herein by reference in its entirety]. Absorption bands at 1585 $cm^1$, 1503 $cm^{-1}$, and 1488 $cm^{-1}$ were assigned to aromatic C=C bond vibrations [I. G. Sandoval-Olvera, et al., Desalination Water Treat. 2017, 65, 199, C. Y. Tang, et al., Desalination 2009, 242, 149, and F. Shao, et al., J. Memb. Sci. 2017, 525, 9-17, incorporated herein by reference in their entirety]. In addition, aromatic C—H stretching vibrations were detected in the region between 3000 $cm^{-1}$ and 2900 $cm^{-1}$ [M. Faizan, et al., J. Mol. Struct. 2018, 1155, 695, incorporated herein by reference in its entirety].

The FTIR spectra of the polymer-functionalized membranes retained key peaks associated with the PsZ membrane while also exhibiting spectral features corresponding to the grafted PDMD terpolymer. Notably, an intensified broad band in the region between 3600-3200 $cm^{-1}$ and the emergence of new peaks in the region 1600-1250 $cm^{-1}$ were observed in the modified membranes, corresponding to the vibrational modes of the polymer backbone and side-chain functionalities. The spectral modifications confirm the successful incorporation of the poly-(DADMAC-co-DAMAPS-co-DADA) polymer into the polyamide active layer, as evidenced by the composite spectral characteristics representing contributions from both the PsZ and PDMD-modified membranes.

Figure 14:
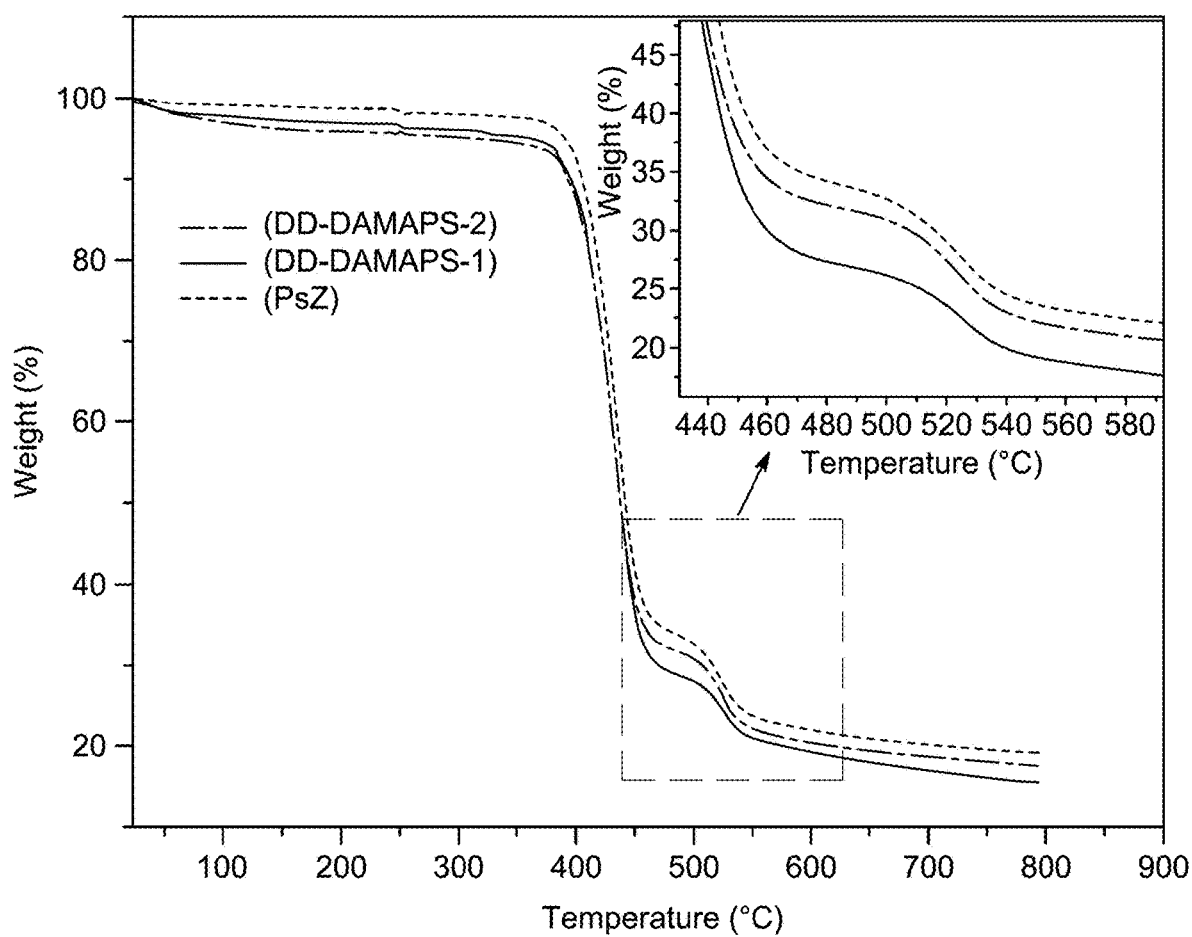
FIG. 14 illustrates a comparative thermogravimetric analysis (TGA) curve of PsZ, DD-DAMAPS-1, and DD-DAMAPS-2 membranes, according to certain embodiments.

Thermogravimetric analysis (TGA) was performed under a nitrogen atmosphere from 25° C. to 800° C. at a constant heating rate of 10° C. per minute to evaluate the influence of the grafted poly-(DADMAC-co-DAMAPS-co-DADA) polymer on the thermal stability of the membranes. The thermal decomposition profiles of the PsZ, DD-DAMAPS-1, and DD-DAMAPS-2 membranes are represented in FIG. 14. A minor weight loss was observed up to 200° C. for the DD-DAMAPS-1 and DD-DAMAPS-2 membranes, attributed to the release of moisture retained within the hydrophilic polyamide active layer grafted with the polymer. Subsequently, a significant weight loss occurred at approximately 370° C. in the modified membranes, while the PsZ membrane exhibited comparable decomposition behaviour at approximately 380° C. The earlier onset of thermal degradation in the modified membranes is indicative of the grafted poly-(DADMAC-co-DAMAPS-co-DADA) polymer influencing the thermal response. Continuous weight reduction persisted up to approximately 450° C., initiated around 370° C., with decomposition approaching completion near 540° C., following a plateau observed from 500° C.

The residual mass percentages for PsZ, DD-DAMAPS-2, and DD-DAMAPS-1 were measured to be 20%, 18%, and 15.5%, respectively. The enhanced mass loss observed in the DD-DAMAPS-1 and DD-DAMAPS-2 membranes relative to the PsZ membrane reflects the presence of the grafted polymer and its effect on the cross-linking density of the polyamide active layer. The aforementioned observations are consistent with the surface morphological trends identified via scanning electron microscopy and corroborate previously reported findings [C. Park, et al., J. Environ. Chem. Eng. 2022, 10, 108307, incorporated herein by reference in its entirety].

Collectively, the TGA data confirm that all membranes exhibited substantial thermal stability, and the incorporation of the poly-(DADMAC-co-DAMAPS-co-DADA) polymer via interfacial polymerization did not significantly compromise the overall thermal resistance. The increased weight loss in the modified membranes further affirms the successful incorporation of the polymer within the active layer structure.

Figure 15:
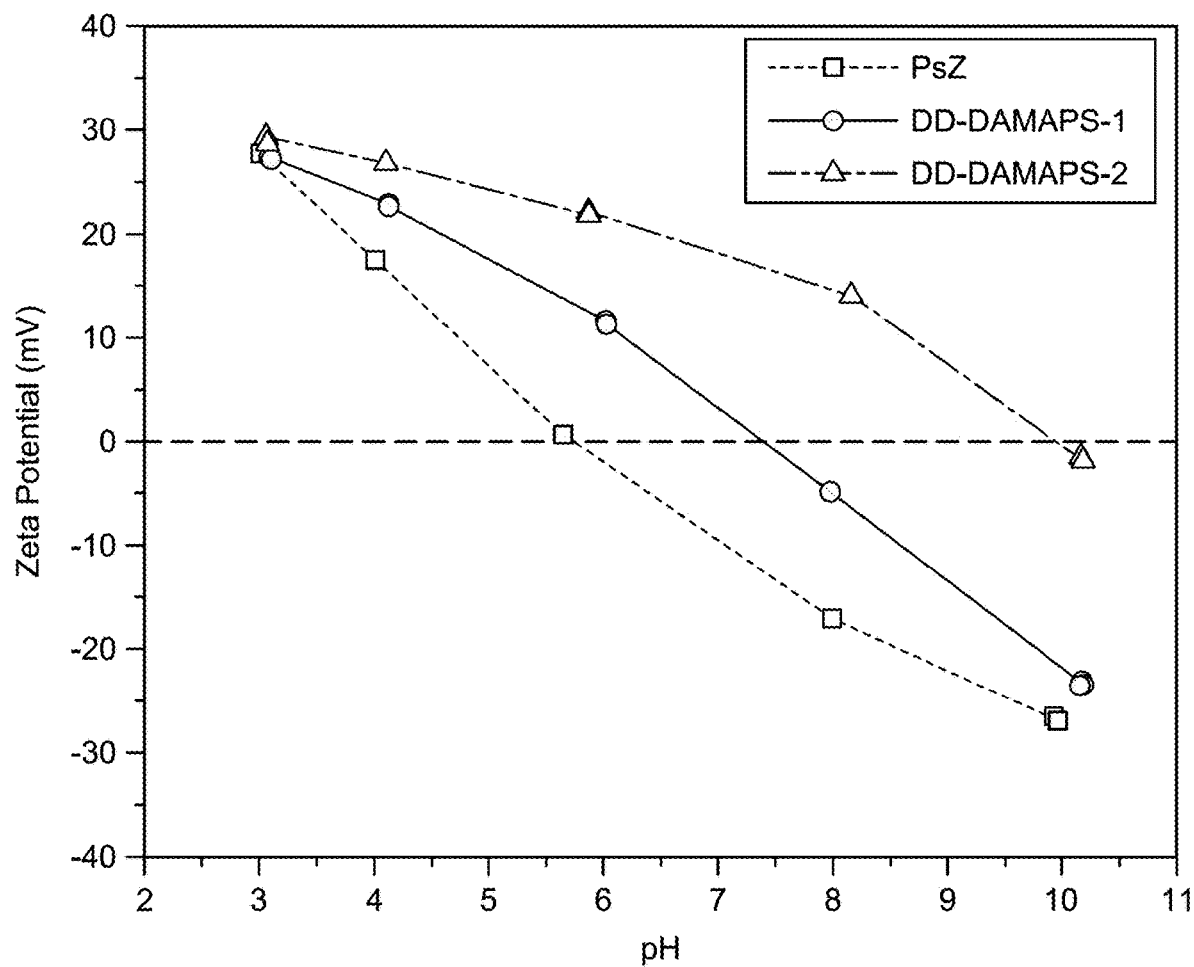
FIG. 15 illustrates a zeta potential profile of the PsZ, DD-DAMAPS-1, and DD-DAMAPS-2 membranes across various pH levels, according to certain embodiments.

The surface charge of the membranes was analyzed across a range of pH values to evaluate the impact of the poly-(DADMAC-co-DAMAPS-co-DADA) grafting, as shown in FIG. 15. The isoelectric point of the PsZ membrane was recorded at pH 5.7, whereas the isoelectric point for the DD-DAMAPS-1 membrane was observed at pH 7.4. For the DD-DAMAPS-2 membrane, the isoelectric point shifted further to pH 10.0. Over the measured pH range, the DD-DAMAPS-2 membrane demonstrated a more positively charged surface relative to the PsZ membrane. The structural analysis of the grafted poly-(DADMAC-co-DAMAPS-co-DADA) polymer revealed a cationic backbone periodically functionalized with zwitterionic groups, the zwitterionic moieties comprising equimolar quantities of permanent positive and negative charges. Despite the neutrality of the zwitterionic side chains, the dominant contribution of the positively charged polymer backbone was reflected in the measured zeta potential values, particularly as the polymer concentration increased in the modified membranes. The progression of the isoelectric point toward more alkaline values correlates with increasing content of the cationic polymer, confirming the influence of the grafted copolymer on surface charge modulation.

The isoelectric point of the DD-DAMAPS-1 membrane near neutral pH indicates that the cationic character of the poly-(DADMAC-co-DAMAPS-co-DADA) backbone effectively counterbalanced the contribution of any residual carboxylic functionalities originating from the hydrolysis of unreacted acid chloride groups in trimesoyl chloride during interfacial polymerization. The observed shift in charge characteristics validates the successful incorporation of the grafted polymer and confirms its dominant influence on the surface electrochemical properties of the polyamide active layer.

Figure 16A:
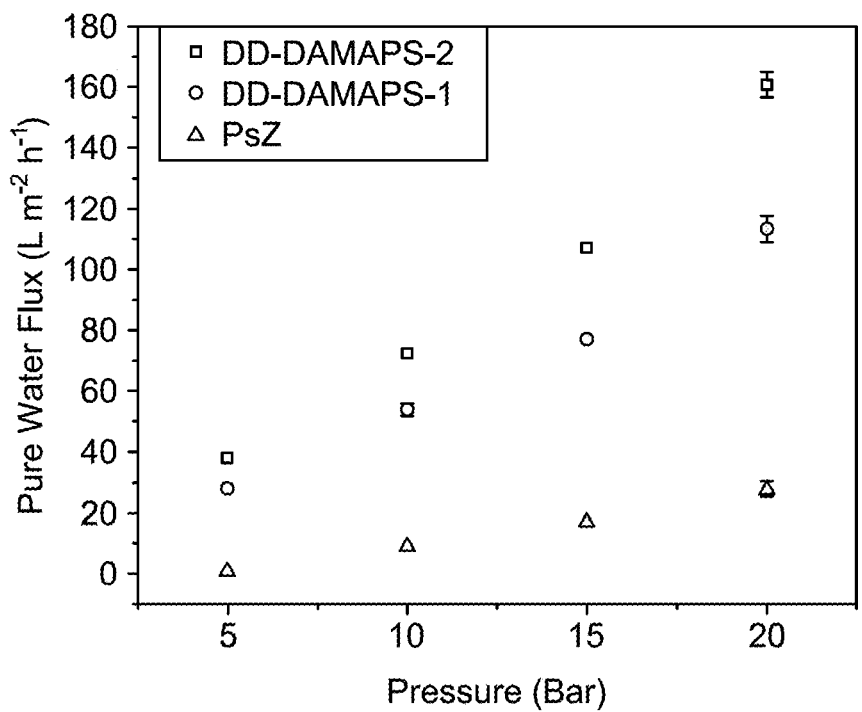
FIG. 16A illustrates a water permeation flux values of PsZ, DD-DAMAPS-1, and DD-DAMAPS-2 membranes under varying pressure, according to certain embodiments.

The incorporation of poly-(DADMAC-co-DAMAPS-co-DADA) (PDMD) into the polyamide active layer exerted a substantial influence on the water permeability characteristics of the nanofiltration (NF) membranes. The water permeation flux (WPF) of the unmodified PsZ membrane and the PDMD-grafted membranes DD-DAMAPS-1 and DD-DAMAPS-2 is illustrated in FIG. 16A. The WPF was evaluated at transmembrane pressures ranging from 5 bar to 20 bar, and a linear relationship between pressure and permeate flux was observed. At 5 bar, the WPF of the PsZ membrane was less than 1 LMH, whereas the WPF values for DD-DAMAPS-1 and DD-DAMAPS-2 were 28 LMH and 38 LMH, respectively. The same increasing trend in WPF values was maintained at higher pressure levels (10, 15, and 20 bar). A 98% enhancement in WPF was observed at 5 bar, and an 84% increase was calculated at 20 bar for DD-DAMAPS-2 compared to PsZ.

The significant improvement in water permeability is attributable to the presence of hydrophilic functionalities, specifically the cationic DADMAC and zwitterionic DAMAPS moieties, within the polyamide active layer, as well as the formation of a more porous and loosely structured polyamide matrix resulting from PDMD incorporation. The above described structural and chemical modifications facilitated the development of hydrophilic water transport channels, contributing to the increased permeability of the DD-DAMAPS membranes. The observed enhancements in WPF correlate with the findings of the contact angle analysis.

Figure 16B:
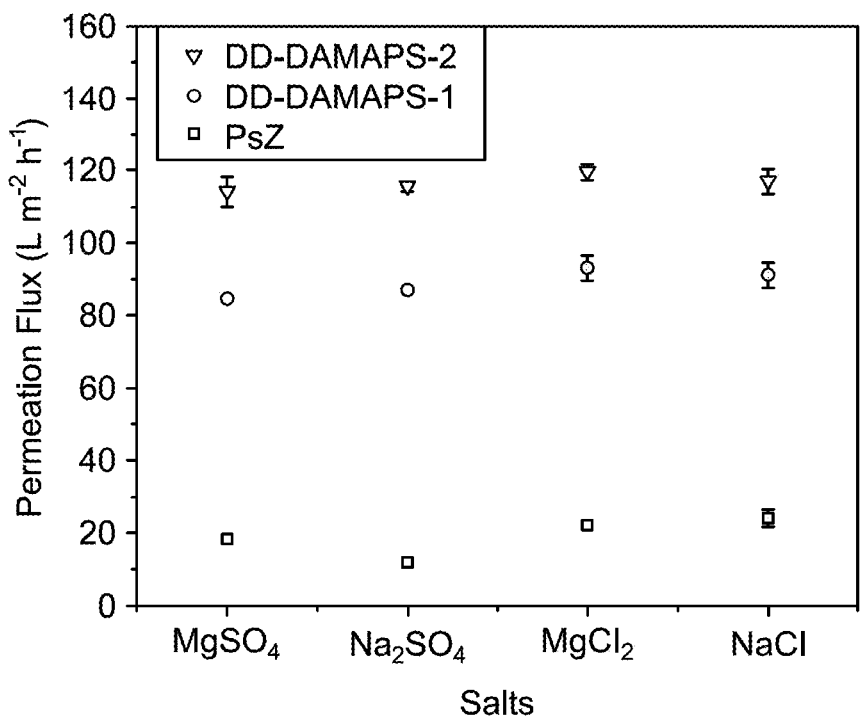
FIG. 16B illustrates a salt permeation flux of PsZ, DD-DAMAPS-1, and DD-DAMAPS-2 membranes for multiple salt types, according to certain embodiments.
Figure 16C:
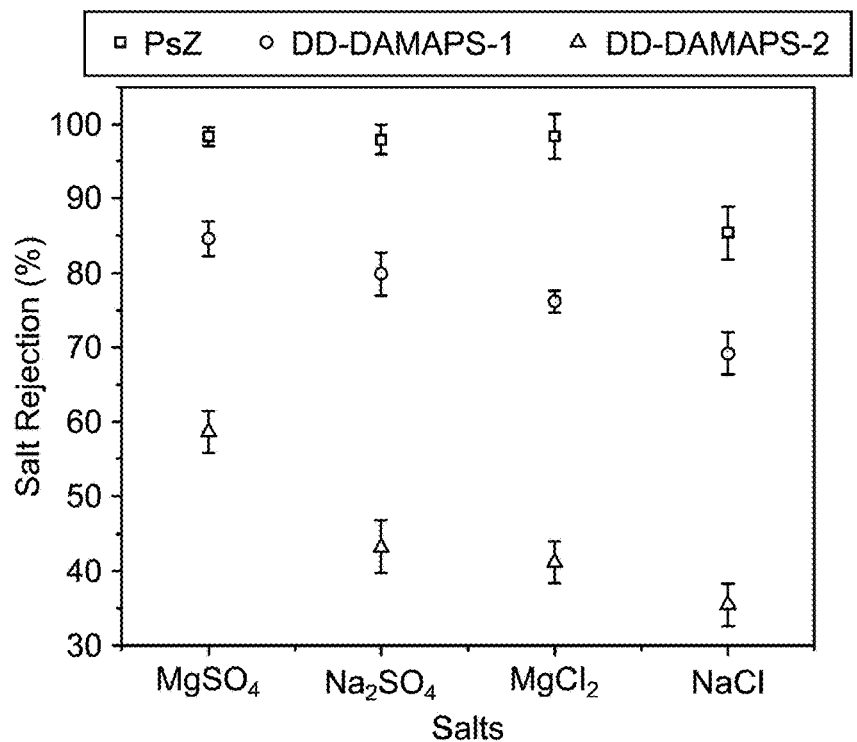
FIG. 16C illustrates salt rejection efficiencies of PsZ, DD-DAMAPS-1, and DD-DAMAPS-2 membranes, according to certain embodiments.

Salt permeation flux (SPF) was also assessed for all membrane variants at a fixed transmembrane pressure of 15 bar, using a 2000 ppm feed concentration for each tested salt species. The SPF values displayed a trend consistent with WPF behaviour, as shown in FIG. 16B. Salt rejection measurements were conducted concurrently, revealing that incorporation of poly-(DADMAC-co-DAMAPS-co-DADA) into the membrane matrix transitioned the structure from a tight NF membrane to a moderately loose NF membrane, resulting in a relative decline in salt rejection performance, as shown in FIG. 16C. The overall effect of PDMD incorporation yielded improved salt permeation, aligned with the intended functional modifications.

Figure 16D:
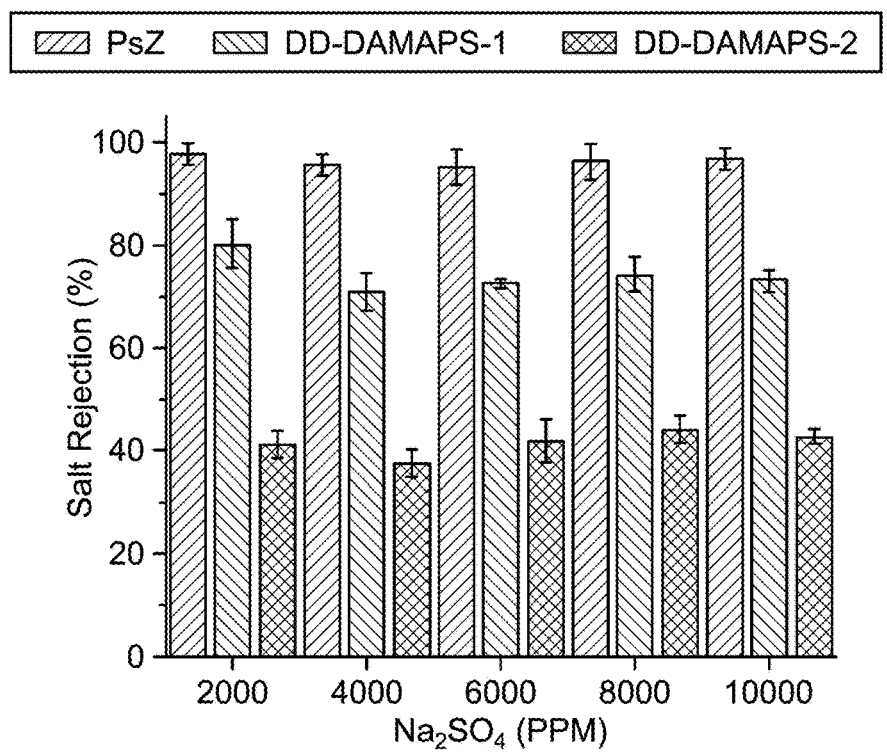
FIG. 16D illustrates $Na_2SO_4$ rejection performance of PsZ, DD-DAMAPS-1, and DD-DAMAPS-2 membranes at varying concentrations, according to certain embodiments.

A comprehensive salt rejection analysis was performed using sodium sulfate ($Na_2SO_4$) at varying feed concentrations ranging from 2000 ppm to 10,000 ppm, with results shown in FIG. 16D. The rejection trend remained consistent across all tested concentrations. The PsZ membranes demonstrated consistently high $Na_2SO_4$ rejection efficiency, ranging between 96% and 98% throughout the concentration range. The robust rejection performance of the PsZ membrane is attributed to the highly compact polyamide active layer and the strong negative surface charge, particularly near the desalting pH. The described combination of structural and electrostatic factors imparts significant resistance to penetration by sulfonate-based anions, maintaining high rejection values even at elevated salt concentrations.

The DD-DAMAPS membranes, incorporating poly-(DADMAC-co-DAMAPS-co-DADA), were engineered to enhance solute selectivity for the Eriochrome black T (EBT)/salt binary mixture. The separation of EBT from salts holds significant importance in the textile industry due to environmental and operational considerations. Elevated salt concentrations inhibit microbial degradation processes, making the removal of EBT more challenging in saline wastewater streams. Accordingly, the ability to fractionate EBT from dissolved salts is advantageous for both effluent treatment and dye recovery.

Figure 17A:
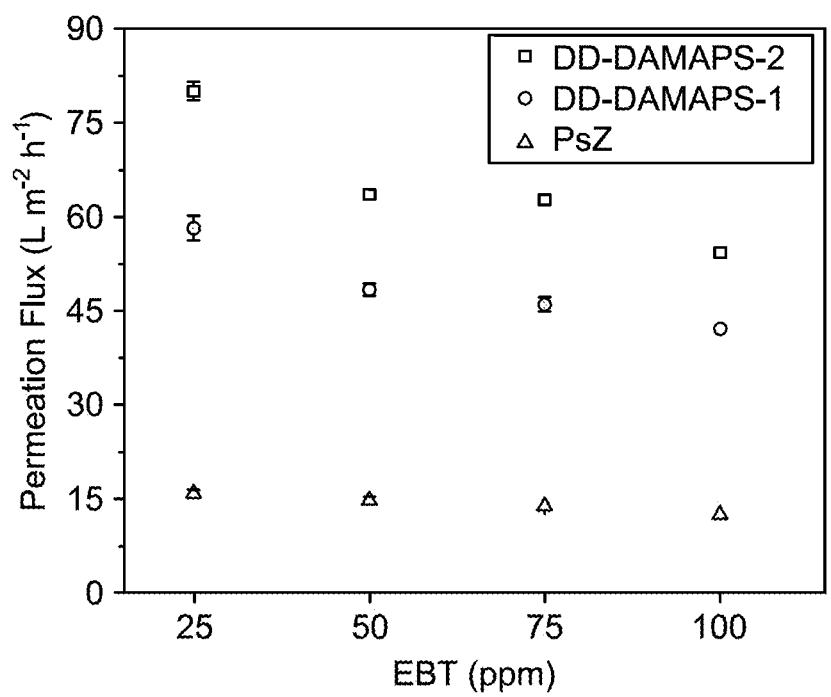
FIG. 17A illustrates the Eriochrome Black T (EBT) permeation flux of PsZ, DD-DAMAPS-1, and DD-DAMAPS-2 membranes, according to certain embodiments.
Figure 17B:
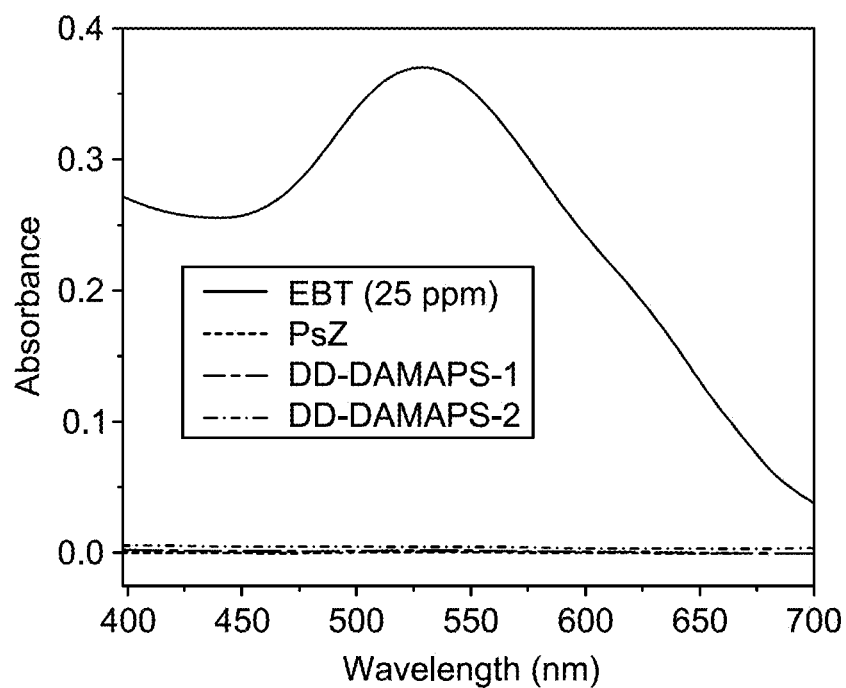
FIG. 17B illustrates the UV-VIS detection spectrum of EBT at 25 ppm concentration, according to certain embodiments.
Figure 17C:
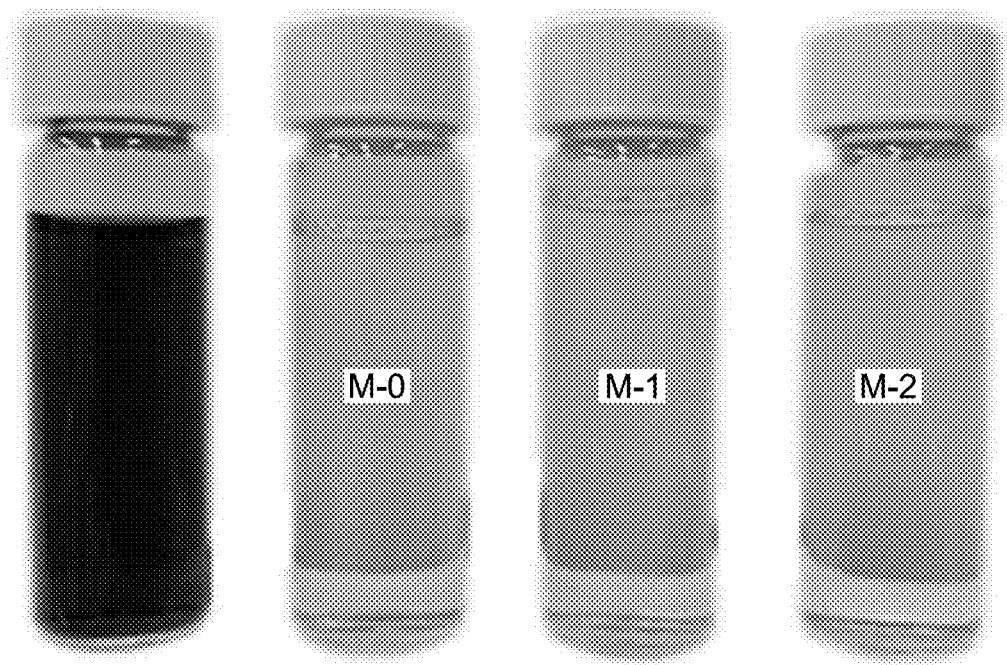
FIG. 17C illustrates the visual observation of dye rejection for membranes M-0 (PsZ), M-1 (DD-DAMAPS-1), and M-2 (DD-DAMAPS-2), according to certain embodiments.
Figure 17D:
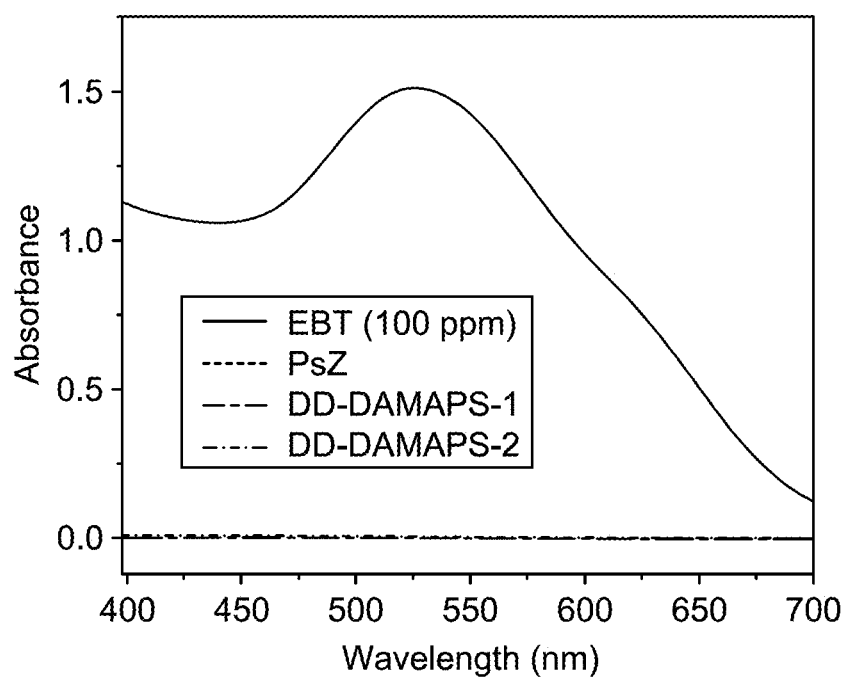
FIG. 17D illustrates the UV-VIS detection spectrum of EBT at 100 ppm concentration, according to certain embodiments.

The permeation flux of EBT-containing feed solutions was measured using varying dye concentrations of 25 ppm, 50 ppm, 75 ppm, and 100 ppm at a fixed pressure of 10 bar to assess the filtration performance of the fabricated membranes. As shown in FIG. 17A, the DD-DAMAPS membranes demonstrated enhanced water flux compared to the PsZ membrane. The observed improvement in permeate flux is attributed to the increased surface wettability imparted by the poly-(DADMAC-co-DAMAPS-co-DADA) copolymer incorporated into the polyamide active layer. EBT rejection examinations were carried out to determine the dye removal efficiency of the membranes. As illustrated in FIGS. 14B-14D, all membranes, including PsZ, DD-DAMAPS-1, and DD-DAMAPS-2, exhibited a rejection rate of approximately 99.9% across all tested feed concentrations. Visual confirmation of complete dye retention was provided by the membrane filtration image depicted in FIG. 17C. The results indicate that the DD-DAMAPS membranes possess the ability to deliver enhanced flux, increased salt permeability, and near-complete dye rejection simultaneously. The combination of these performance characteristics establishes the modified membranes as effective candidates for selective separation of organic dye species from saline solutions in textile and wastewater treatment applications.

Figure 18A:
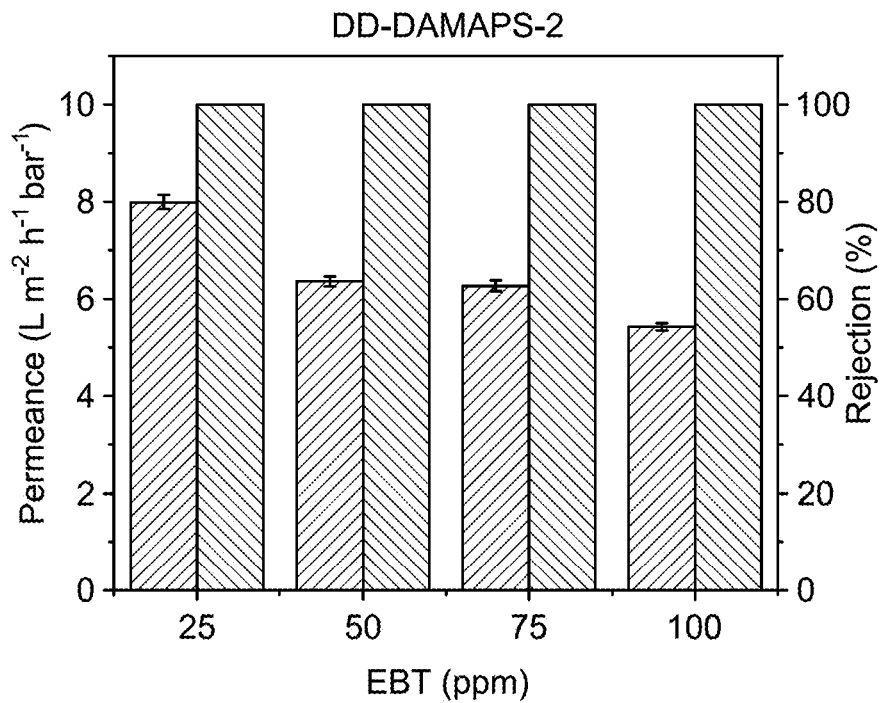
FIG. 18A illustrates EBT permeability and rejection performance of the DD-DAMAPS-2 membrane, according to certain embodiments.
Figure 18B:
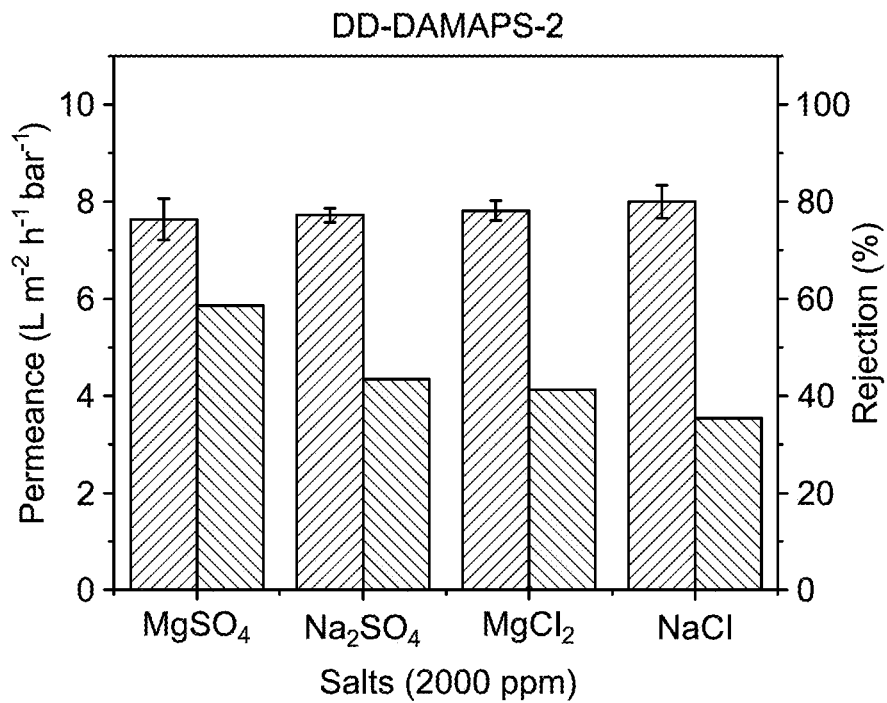
FIG. 18B illustrates salt permeability and rejection performance of the DD-DAMAPS-2 membrane for various salt types, according to certain embodiments.
Figure 19A:
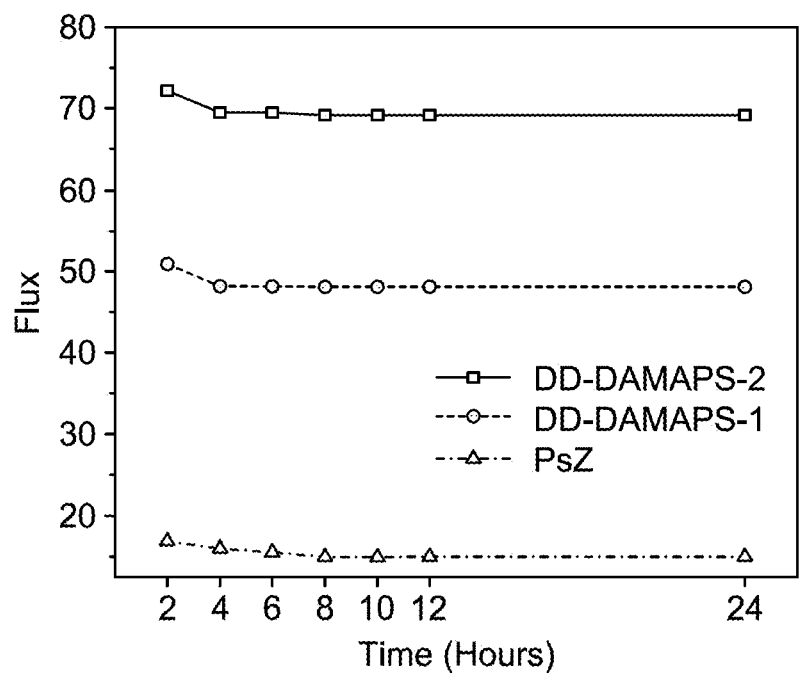
FIG. 19A illustrates the antifouling flux profile of PsZ, DD-DAMAPS-1, and DD-DAMAPS-2 membranes over a continuous 24-hour operation with mixed foulants, according to certain embodiments.
Figure 19B:
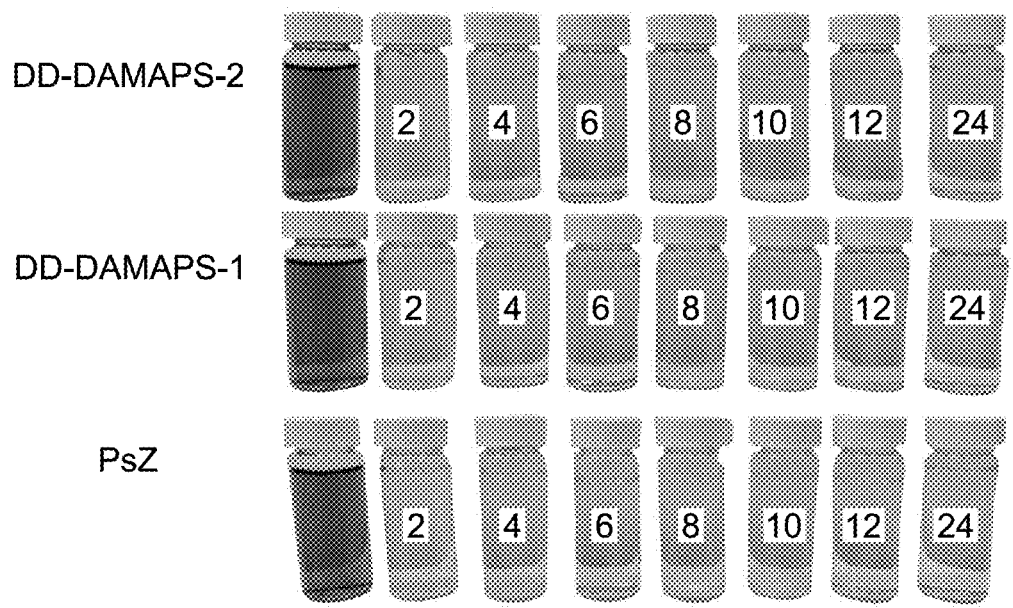
FIG. 19B illustrates the optical images of filtrates from PsZ, DD-DAMAPS-1, and DD-DAMAPS-2 membranes after fouling studies, according to certain embodiments.

The EBT separation analysis confirmed that the modified membrane DD-DAMAPS-2 achieved 99.9% rejection efficiency for EBT across all evaluated feed concentrations. The corresponding EBT permeance rate and rejection values are depicted in FIG. 18A. The DD-DAMAPS-2 membrane exhibited a permeability range of 7.9 litres per square meter per hour per bar (LMHB) to 7.7 LMHB for multiple salts at a fixed feed concentration of 2000 ppm per salt species. The observed salt rejection values were 58.7% for $MgSO_4$, 43.2% for $Na_2SO_4$, 41.2% for $MgCl_2$, and 35.5% for NaCl, as illustrated in FIG. 18B.

The DD-DAMAPS-2 membrane demonstrated a water flux of 8.3 LMHB, along with 65% salt permeance and 99.9% EBT rejection. The foregoing results substantiate the efficacy of the poly-(DADMAC-co-DAMAPS-co-DADA) grafted membrane in achieving high flux and selective solute separation performance under nanofiltration conditions, according to certain embodiments.

In general, membrane fouling constitutes a persistent and long-standing limitation to membrane performance, adversely affecting permeability, operational efficiency, and membrane lifespan. The fouling of membrane surfaces has been associated with reduced water flux, increased frequency of cleaning cycles, elevated operational costs, and premature membrane failure. As a result, considerable research attention has been directed toward incorporating zwitterionic moieties into membrane structures to enhance fouling resistance. The structure and composition of the polyamide active layer have been recognized as determinants of antifouling performance. In order to evaluate the antifouling performance, serum bovine albumin (SBA) was employed as a model protein foulant. A fouling feed solution was prepared by mixing 50 ppm SBA and 50 ppm EBT, and the prepared solution was used to assess the fouling resistance of the PsZ, DD-DAMAPS-1, and DD-DAMAPS-2 membranes. The antifouling experiment was conducted over a continuous 24-hour period, with measurements taken every two hours for the first 12 hours and a final measurement recorded after overnight operation. The corresponding results are presented in FIGS. 16A-16B. The data in FIGS. 16A-16B indicate that all membranes demonstrated effective fouling resistance. Notably, the permeation flux for the DD-DAMAPS-2 membrane remained stable after the initial reading and exhibited no significant decline over the duration of the test. In addition, the DD-DAMAPS-2 membrane maintained a higher flux relative to the PsZ membrane. Throughout the fouling test, the rejection of EBT remained consistently near 100% across all membranes tested.

The experimental findings confirm that the incorporation of poly-(DADMAC-co-DAMAPS-co-DADA) within the polyamide active layer markedly improved water permeability and fouling resistance. The DD-DAMAPS-2 membrane achieved excellent EBT rejection, high salt permeation, and enhanced antifouling performance, indicating superior solute selectivity compared to the PsZ membrane, which exhibited lower selectivity, according to certain embodiments. The filtration and antifouling data for PsZ, DD-DAMAPS-1, and DD-DAMAPS-2 membranes confirm that the in-situ incorporation of poly-(DADMAC-co-DAMAPS-co-DADA) within the polyamide active layer substantially influences the surface characteristics and separation performance of the membranes. The TMC/DETA-derived polyamide layer exhibited strong rejection of both salts and EBT due to a compact network and tight layer architecture thereof. The partially aromatic nature of the polyamide active layer contributes to reduced fouling susceptibility. The data presented herein validate that high desalination performance is achievable through linear diamine systems.

Morphological characterization via SEM revealed that the initially smooth surface of the PsZ membrane becomes crumpled upon the incorporation of poly-(DADMAC-co-DAMAPS-co-DADA) into the polyamide active layer. The integration of the aforementioned polymer disrupted the crosslinking tendency of DETA and consequently resulted in a more porous and loosely structured polyamide layer. The DD-DAMAPS-1 and DD-DAMAPS-2 membranes, therefore, demonstrated enhanced water permeability and increased salt permeation relative to the unmodified PsZ membrane.

The surface of the modified membranes exhibited enrichment in sulfonate functionalities derived from the grafted polymer, thereby contributing to high rejection efficiency for EBT, while the cationic backbone influenced partial salt rejection. Furthermore, the inclusion of the grafted polymer significantly elevated the surface roughness of the membranes, increasing the effective membrane surface area and enhancing the transport of water and solutes. In contrast, the PsZ membrane presented a smoother morphology and correspondingly lower permeability.

Figure 20:
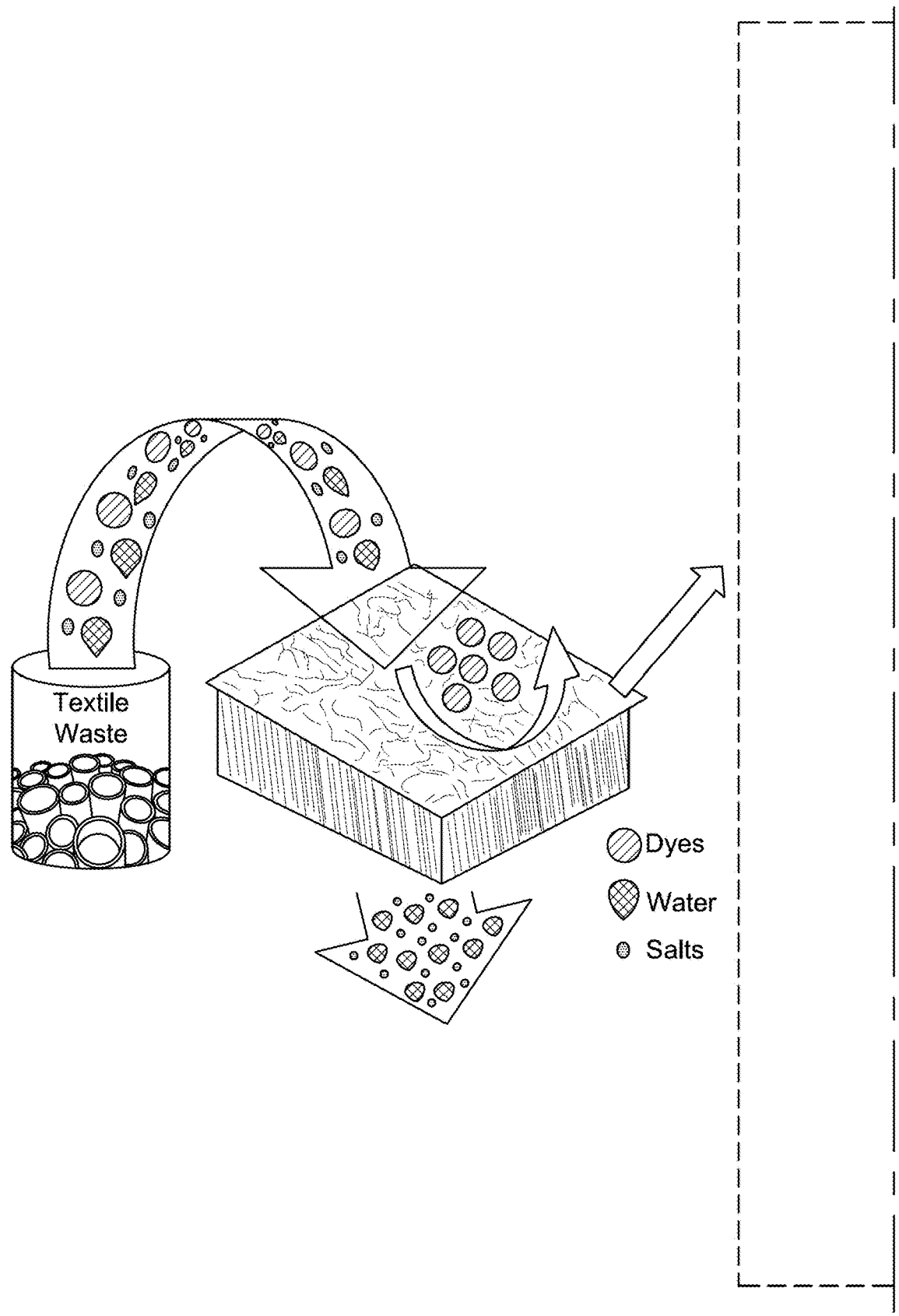
FIG. 20 illustrates a schematic representation of the proposed mechanism for selective filtration by the DD-DAMAPS membranes, according to certain embodiments.
Figure 20:
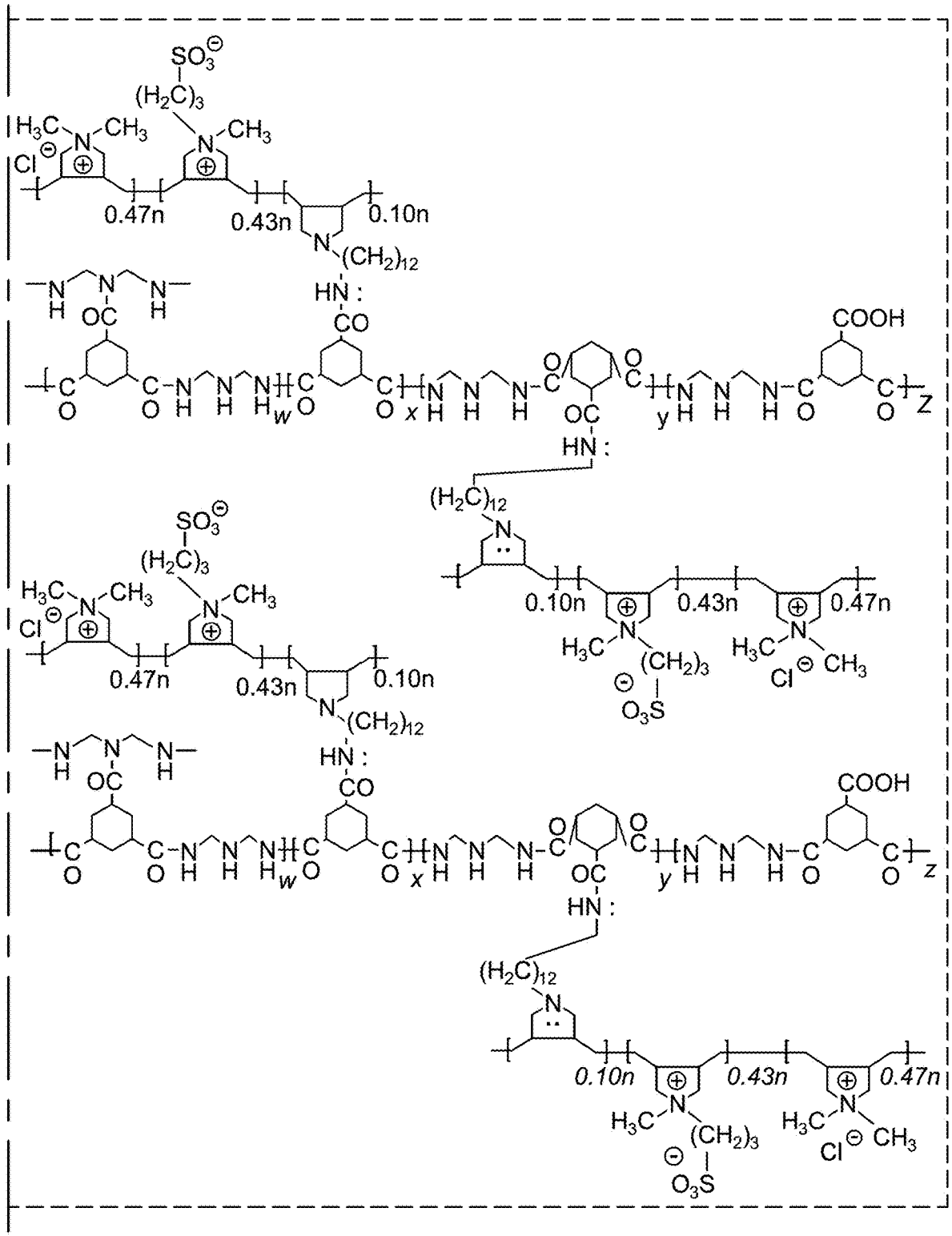

The presence of both cationic and zwitterionic functional motifs in the polymer enhanced the hydrophilicity of the membrane surface by forming a hydration layer through the crosslinked architecture of the polymer, as illustrated in FIG. 20. The increased hydrophilicity facilitated higher water flux. Additionally, the solute permeation behavior was observed to be governed by the degree of polymer crosslinking. The DD-DAMAPS-2 membrane permitted a higher level of salt permeation compared to DD-DAMAPS-1, consistent with the lower degree of crosslinking in the DD-DAMAPS-2 active layer.

The observed mechanism underlying solute selectivity in EBT/salt separation is attributable to the combination of polymer-induced hydration effects, active layer porosity, and charge-based interactions. The poly-(DADMAC-co-DAMAPS-co-DADA) polymer, featuring integrated cationic and zwitterionic moieties, represents a viable candidate for next-generation loose nanofiltration (LNF) membrane fabrication tailored for high-performance applications in dye/salt fractionation and resource recovery, according to certain embodiments.

To conclude, the PsZ tight NF membranes were synthesized by the interfacial polymerization of the diethylenetriamine and the trimesoyl chloride, which resulted in the high rejection of 97.8%, 98.2%, 98.3%, 91.3%, 85.4% for 2000 ppm of $Na_2SO_4$, $MgSO_4$, $MgCl_2$, NaCl, respectively. A cationic/zwitterionic poly-(DADMAC-co-DAMAPS-co-DADA) polymer is synthesized with free amine groups and co-polymerized during the interfacial polymerization of diethylenetriamine. The resultant DD-DAMAPS membranes, by incorporating a pseudo-zwitterionic polymer with cationic and zwitterionic motifs in the backbone, loosen the polyamide active layer of the PsZ NF membrane, improving permeation and solute selectivity applications. The DD-DAMAPS membranes became more hydrophilic, with a decrease in water contact angle from 26.6° to 13.8°, and a change in surface charge was also observed. The membrane DD-DAMAPS-2 has shown a high-water flux (8.3 L m$^{-2}$ h$^{-1}$ bar$^{-1}$), meanwhile maintaining complete dye rejection of ~99.9% (EBT) and allowing 65% to 42% salt passage (NaCl, $MgCl_2$, $Na_2SO_4$, and $MgSO_4$). The DD-DAMAPS membranes have shown desirable fouling resistance against BSA, and after 24 hours, no noticeable decline in permeation flux was observed.

Numerous modifications and variations of the present disclosure are possible in light of the above teachings. It is therefore to be understood that within the scope of the appended claims, the invention may be practiced otherwise than as specifically described herein.

The invention claimed is:

1. A membrane, comprising:
  a polymeric support, and
  an active layer comprising a polyamide grafted with a copolymer on the polymeric support, wherein the copolymer comprises reacted units of a diallyldimethylammonium chloride (DADMAC), 3-(N,N-diallyl-N-methylammonio)propanesulfonate (DAMAPS), and N,N-diallyldodecane-1,12-diamine (DADA), and wherein the copolymer is grafted to the polyamide with a linking molecule.

2. The membrane of claim 1, wherein the polymeric support is polysulfone (PS).

3. The membrane of claim 1, wherein the linking molecule is trimesoyl chloride (TMC).

4. The membrane of claim 1, wherein the copolymer comprises 0.05-0.5 wt. % of the total a weight of the membrane.

5. The membrane of claim 1, wherein the copolymer comprises 47 mol. % DADMAC, 43 mol. % DADMAPS, and 0.10 mol. % DADA.

6. A method of making the membrane of claim 1, comprising,
dissolving an amine and the copolymer in water to form an aqueous solution;
dissolving TMC in an organic solvent to form an organic mixture;
pouring the aqueous solution onto a polymeric support and then pouring the organic a mixture onto the same support to form a coated support; and
heating the coated support to form a membrane.

7. The method of claim 6, wherein the amine is one or more selected from the group consisting of diethylenetriamine (DETA) and triethylamine (TEA).

8. The method of claim 6, wherein the organic solvent is hexane.

9. The method of claim 6, wherein the polymeric support is a PS support.

10. The method of claim 6, wherein the coated support is heated at 50-70° C.

11. The method of making the membrane of claim 6, further comprising:
making the copolymer by:
dissolving DADAC, DAMAPS, DADMAC, a salt, and an initiator in water to form an aqueous solution;
heating the aqueous solution at 60-100° C. for 20-28 hours to form DADMAC-co-DAMAPS-co-DADAC; and
adding a base and a salt to the DADMAC-co-DAMAPS-co-DADAC to form the copolymer.

12. The method of claim 11, wherein the salt is sodium chloride.

13. The method of claim 11, wherein the initiator is 2,2'-azobis(2-methylpropionamidine) dihydrochloride (AMPD).

14. The method of claim 11, wherein the base is sodium hydroxide.

15. The membrane of claim 1, the surface of the membrane having a water contact angle of 12-22°.

16. The membrane of claim 1, the membrane having a water permeation flux at 5 bar of 25-40 LMH.

17. The membrane of claim 1, the membrane having a rejection rate of 95-100% for a dye.

18. The membrane of claim 17, wherein the dye is Eriochrome black T (EBT).

19. The membrane of claim 1, the membrane having a permeability rate of 40-70% for a salt.

20. The membrane of claim 19, wherein the salt is one or more selected from the group consisting of NaCl, $MgCl_2$, $Na_2SO_4$, and $MgSO_4$.

* * * * *